US011567299B2

(12) United States Patent
Chang et al.

(10) Patent No.: US 11,567,299 B2
(45) Date of Patent: Jan. 31, 2023

(54) OPTICAL IMAGE CAPTURING SYSTEM

(71) Applicant: Ability Opto-Electronics Technology Co., Ltd., Taichung (TW)

(72) Inventors: Yeong-Ming Chang, Taichung (TW); Chien-Hsun Lai, Taichung (TW); Yao-Wei Liu, Taichung (TW)

(*) Notice: Subject to any disclaimer, the term of this patent is extended or adjusted under 35 U.S.C. 154(b) by 368 days.

(21) Appl. No.: 16/882,535

(22) Filed: May 24, 2020

(65) Prior Publication Data

US 2021/0247594 A1    Aug. 12, 2021

(30) Foreign Application Priority Data

Feb. 7, 2020 (TW) ............................... 109103868

(51) Int. Cl.
*G02B 13/00* (2006.01)
*G02B 9/64* (2006.01)
*H04N 5/225* (2006.01)

(52) U.S. Cl.
CPC ........... *G02B 13/0045* (2013.01); *G02B 9/64* (2013.01); *H04N 5/2253* (2013.01); *H04N 5/2254* (2013.01)

(58) Field of Classification Search
CPC ...... G02B 13/0045; G02B 9/64; G02B 13/00; G02B 13/001; G02B 13/0015; G02B 13/002; G02B 13/005; G02B 3/00; G02B 9/00; H04N 5/2253; H04N 5/2254
See application file for complete search history.

(56) References Cited

U.S. PATENT DOCUMENTS

| | | | |
|---|---|---|---|
| 10,845,576 B2* | 11/2020 | Huang | G02B 13/006 |
| 2018/0196235 A1* | 7/2018 | Chang | G02B 13/18 |
| 2018/0329179 A1* | 11/2018 | Chang | G02B 13/146 |
| 2019/0033557 A1* | 1/2019 | Chang | G02B 13/0045 |
| 2019/0154974 A1 | 5/2019 | Chen | |
| 2019/0302424 A1* | 10/2019 | Kuo | G02B 13/18 |

(Continued)

FOREIGN PATENT DOCUMENTS

| | | |
|---|---|---|
| TW | 201825959 A | 7/2018 |
| TW | 201901232 A | 1/2019 |

(Continued)

OTHER PUBLICATIONS

Search Report for TW109103868, dated Feb. 25, 2022, Total of 1 page.

(Continued)

*Primary Examiner* — Albert H Cutler
(74) *Attorney, Agent, or Firm* — Apex Juris, PLLC; R Wylie; Tracy Heims

(57) ABSTRACT

The invention discloses a seven-piece optical lens for capturing image and a seven-piece optical module for capturing image. In order from an object side to an image side, the optical lens along the optical axis comprises a first lens with refractive power; a second lens with refractive power; a third lens with refractive power; a fourth lens with refractive power; a fifth lens with refractive power; a sixth lens with refractive power; and a seventh lens with refractive power; and at least one of the image-side surface and object-side surface of each of the seven lens elements is aspheric. The optical lens can increase aperture value and improve the imaging quality for use in compact cameras.

22 Claims, 9 Drawing Sheets

(56) References Cited

U.S. PATENT DOCUMENTS

2019/0377161 A1* 12/2019 Lin .......................... G02B 9/64
2021/0018724 A1* 1/2021 Hsu ................... G02B 13/0045

FOREIGN PATENT DOCUMENTS

TW        201940922 A     10/2019
TW         M599917 U      8/2020

OTHER PUBLICATIONS

Translation of Abstract of TW201940922, Total of 1 page.
Translation of Abstract of TW201825959, Total of 1 page.
Translation of Abstract of TWM599917, Total of 1 page.
Translation of Abstract of TW01901232, Total of 1 page.

* cited by examiner

OPTICAL IMAGE CAPTURING SYSTEM

BACKGROUND OF THE INVENTION

1. Field of the Invention

The present disclosure relates to an optical image capturing system, and more particularly to a compact optical image capturing system which can be applied to electronic products.

2. Description of the Prior Art

In recent years, with the rise of portable electronic devices having camera functionalities, the demand for an optical image capturing system gradually increased. The image sensing devices of ordinary optical systems are commonly selected from charge coupled devices (CCD) or complementary metal-oxide semiconductor sensors (CMOS sensors). As advanced semiconductor manufacturing technology enables the miniaturization of pixel sizes of the image sensing device, the development of optical image capturing systems has been directed towards developing systems with high pixel counts, thereby increasing the demand on image quality.

Traditional optical image capturing systems of a portable electronic device mainly comprise a five-lens or six-lens design structure. However, pixel counts of portable devices continue to increase, and end users require large apertures to fulfill functionalities such as micro filming and night filming. Thus, optical image capturing systems in prior arts can no longer meet such high level filming requirements.

Therefore, how to effectively increase an amount of admitted light for lenses of the optical image capturing system and further increase corresponding image quality has become a pressing issue.

SUMMARY OF THE INVENTION

An aspect of an embodiment of the present disclosure directs to an optical image capturing system and an optical image capturing lens which use combinations of refractive powers of seven pieces of optical lenses along with convex and concave surfaces of the seven pieces of optical lenses (the convex or concave surface in the disclosure denotes the geometrical shape of an image-side surface or an object-side surface of each lens at different height from an optical axis) to further increase an amount of admitted light into the optical image capturing system and improve an image quality for image formation, so as to be applied to miniaturized electronic products.

The terminologies together with their numerals for the lens parameters related to the embodiment of the present disclosure are provided in the following paragraphs for reference in subsequent descriptions:

Lens Parameters Related to Length or Height of the Lens

A maximum image height for image formation of the optical image capturing system is denoted as HOI. A height of the optical image capturing system is denoted as HOS. A distance from an object-side surface of the first lens to an image-side surface of the seventh lens is denoted as InTL. A distance from an aperture stop (aperture) to an image plane is denoted as InS. A distance from the first lens to the second lens is denoted as IN12 (for example). A central thickness of the first lens of the optical image capturing system on the optical axis is denoted as TP1 (for example).

Lens Parameters Related to a Material of the Lens

An Abbe number (dispersion coefficient) of the first lens in the optical image capturing system is denoted as NA1 (for example). A refractive index of the first lens is denoted as Nd1 (for example).

Lens Parameters Related to an Angle of View of the Lens

Angle of view is denoted as AF. Half of the angle of view is denoted as HAF. A major light angle is denoted as MRA.

Lens Parameters Related to Exit/Entrance Pupil in the Lens

An entrance pupil diameter of the optical image capturing system is denoted as HEP. The maximum effective half diameter (EHD) of any surface of a single lens refers to a vertical height between the optical axis and an intersection point, where an incident ray with a maximum angle of view of the system passes through the outermost edge of an entrance pupil and intersects the surface of the lens. For example, the maximum effective half diameter of the object-side surface of the first lens is denoted as EHD11. The maximum effective half diameter of the image-side surface of the first lens is denoted as EHD12. The maximum effective half diameter of the object-side surface of the second lens is denoted as EHD21. The maximum effective half diameter of the image-side surface of the second lens is denoted as EHD22. Maximum effective half diameters of any surface of other lenses in the optical image capturing system are denoted according to the regular pattern shown above.

Lens Parameters Related to an Arc Length of the Lens Shape and an Outline of a Surface of the Lens An outline curve length of the maximum effective half diameter of any surface of a single lens refers to an arc length of a curve, which starts from an intersection point as an initial point where the surface of the lens intersects with the optical axis of the optical image capturing system, travels along the surface outline of the lens, and ends at a point which defines the maximum effective half diameter; the arc length between the aforementioned two points is the outline curve length of the maximum effective half diameter, and is denoted as ARS. For example, a length of the maximum effective half diameter outline curve of the object-side surface of the first lens is denoted as ARS11. A length of the maximum effective half diameter outline curve of the image-side surface of the first lens is denoted as ARS12. A length of the maximum effective half diameter outline curve of the object-side surface of the second lens is denoted as ARS21. A length of the maximum effective half diameter outline curve of the image-side surface of the second lens is denoted as ARS22. Outline curve lengths of the maximum effective half diameter of any surface of other lenses in the optical image capturing system are denoted according to the regular pattern shown above.

An outline curve length of ½ entrance pupil diameter (HEP) of any surface of a single lens refers to an arc length of a curve, which starts from an intersection point as an initial point where the surface of the lens intersects with the optical axis of the optical image capturing system, travels along the surface outline of the lens, and ends at a coordinate point on the surface where a vertical height from the optical axis to the coordinate point is equivalent to ½ entrance pupil diameter; an arc length between the aforementioned two points is the outline curve length of the ½ entrance pupil diameter (HEP), and is denoted as ARE. For example, an outline curve length of the ½ entrance pupil diameter (HEP) of the object-side surface of the first lens is denoted as ARE11. An outline curve length of the ½ entrance pupil diameter (HEP) of the image-side surface of the first lens is denoted as ARE12. An outline curve length of the ½ entrance pupil diameter (HEP) of the object-side surface of the second lens is denoted as ARE21. An outline curve length of the ½ entrance pupil diameter (HEP) of the image-side surface of the second lens is denoted as ARE22. Outline curve lengths of the ½ entrance pupil diameter (HEP) of any surface of other lenses in the optical image capturing system are denoted according to the regular pattern shown above.

Lens Parameters Related to a Depth of the Lens Shape

A horizontal shift distance from an intersection point of the object-side surface of the seventh lens and the optical axis to a maximum effective half diameter position of the object-side surface of the seventh lens is denoted as InRS71 (depth at maximum effective half diameter). A horizontal shift distance from an intersection point of the image-side surface of the seventh lens and the optical axis to a maximum effective half diameter position of the image-side surface of the seventh lens is denoted as InRS72 (depth at maximum effective half diameter). Depth at maximum effective half diameter (sinkage value) of the object-side surface or image-side surface of other lenses in the optical image capturing system are denoted according to the regular pattern shown above.

Lens Parameters Related to the Lens Shape

A critical point C is a point on a surface of a specific lens, where a tangent plane to the surface at that point is perpendicular to the optical axis, and the point cannot be an intersection point with the optical axis on that specific surface of the lens. In addition, a perpendicular distance between a critical point C51 on the object-side surface of the fifth lens and the optical axis is denoted as HVT51 (for example). A perpendicular distance between a critical point C52 on the image-side surface of the fifth lens and the optical axis is denoted as HVT52 (for example). A perpendicular distance between a critical point C61 on the object-side surface of the sixth lens and the optical axis is denoted as HVT61 (for example). A perpendicular distance between a critical point C62 on the image-side surface of the sixth lens and the optical axis is denoted as HVT62 (for example). Perpendicular distances between a critical point on the object-side surface or image-side surface of other lenses such as the seventh lens are denoted according to the regular pattern shown above.

An inflection point on the object-side surface of the seventh lens and nearest to the optical axis is denoted as IF711, wherein a sinkage value of the inflection point IF711 is denoted as SGI711 (for example). The sinkage value SGI711 is a horizontal shift distance paralleling the optical axis, which is from an intersection point of the optical axis and the object-side surface of the seventh lens to an inflection point nearest to the optical axis on the object-side surface of the seventh lens. A distance perpendicular to the optical axis between the inflection point IF711 and the optical axis is denoted as HIF711 (for example). An inflection point on the image-side surface of the seventh lens which is nearest to the optical axis is denoted as IF721, and a sinkage value of the inflection point IF721 is denoted as SGI721 (for example). The sinkage value SGI721 is a horizontal shift distance paralleling the optical axis, which is from the intersection point of the optical axis and the image-side surface of the seventh lens to the inflection point nearest to the optical axis on the image-side surface of the seventh lens. A distance perpendicular to the optical axis between the inflection point IF721 and the optical axis is denoted as HIF721 (for example).

The object-side surface of the seventh lens has an inflection point IF712 which is the second nearest to the optical axis and a sinkage value of the inflection point IF712 is denoted as SGI712 (for example). The sinkage value SGI712 is a horizontal shift distance paralleling the optical axis from an intersection point of the optical axis and the object-side surface of the seventh lens to the inflection point which is the second nearest to the optical axis on the object-side surface of the seventh lens. A distance perpendicular to the optical axis between the inflection point IF712 and the optical axis is denoted as HIF712 (for example). The image-side surface of the seventh lens has an inflection point IF722 which is the second nearest to the optical axis and a sinkage value of the inflection point IF722 is denoted as SGI722 (for example). The sinkage value SGI722 is a horizontal shift distance paralleling the optical axis from an intersection point of the optical axis and the image-side surface of the seventh lens to the inflection point which is second nearest to the optical axis on the image-side surface of the seventh lens. A distance perpendicular to the optical axis between the inflection point IF722 and the optical axis is denoted as HIF722 (for example).

The object-side surface of the seventh lens has an inflection point IF713 which is the third nearest to the optical axis, and a sinkage value of the inflection point IF713 is denoted as SGI713 (for example). The sinkage value SGI713 is a horizontal shift distance paralleling the optical axis from an intersection point of the optical axis and the object-side surface of the seventh lens to the inflection point which is the third nearest to the optical axis on the object-side surface of the seventh lens. A distance perpendicular to the optical axis between the inflection point IF713 and the optical axis is denoted as HIF713 (example). The image-side surface of the seventh lens has an inflection point IF723 which is the third nearest to the optical axis, and a sinkage value of the inflection point IF723 is denoted as SGI723 (example). The sinkage value SGI723 is a horizontal shift distance paralleling the optical axis from an intersection point of the optical axis and the image-side surface of the seventh lens to the inflection point which is the third nearest to the optical axis on the image-side surface of the seventh lens. A distance perpendicular to the optical axis between the inflection point IF723 and the optical axis is denoted as HIF723 (for example).

The object-side surface of the seventh lens has an inflection point IF714 which is the fourth nearest to the optical axis and a sinkage value of the inflection point IF714 is denoted as SGI714 (for example). The sinkage value SGI714 is a horizontal shift distance paralleling the optical axis from an intersection point of the optical axis and the object-side surface of the seventh lens to the inflection point which is the fourth nearest to the optical axis on the object-side surface of the seventh lens. A distance perpendicular to the optical axis between the inflection point IF714 and the optical axis is denoted as HIF714 (for example). The image-side surface of the seventh lens has an inflection point IF724 which is the fourth nearest to the optical axis and a sinkage value of the inflection point IF724 is denoted as SGI724 (for example). The sinkage value SGI724 is a horizontal shift distance paralleling the optical axis from an intersection point of the optical axis and the image-side surface of the seventh lens to the inflection point which is the fourth nearest to the optical axis on the image-side surface of the seventh lens. A distance perpendicular to the optical axis between the inflection point IF724 and the optical axis is denoted as HIF724 (example).

Inflection points on the object-side surface or the image-side surface of other lenses and perpendicular distances between them and the optical axis, or sinkage values thereof are denoted according to the regular patterns shown above.

Lens Parameters Related to Aberration

Optical distortion for image formation in the optical image capturing system is denoted as ODT. TV distortion for image formation in the optical image capturing system is denoted as TDT. Additionally, degree of aberration offset within a range of 50% to 100% field of view of the formed image may be further illustrated. An offset of spherical aberration is denoted as DFS. An offset of coma aberration is denoted as DFC.

A transverse aberration of an edge of an aperture is denoted as STOP Transverse Aberration (STA), which assesses the performance of a specific optical image capturing system. A tangential fan or sagittal fan may be utilized to calculate the STA of any fields of view, and in particular, to calculate the STAs of the longest operation wavelength (e.g. 650 nm) and the shortest operation wavelength (e.g. 470 nm) respectively, which serve as a standard indicating a performance thereof. Coordinate directions of the aforementioned tangential fan may be further defined as positive (overhead-light) and negative (lower-light) directions. The STA of the longest operation wavelength is defined as a distance between the position of the image formed when the longest operation wavelength passing through the edge of the aperture strikes a specific field of view on the image plane and the position of the image formed via the primary light of the reference wavelength (e.g. 555 nm) on the specific field of view on the image plane. Whereas the STA of the shortest operation wavelength is defined as the distance between the position of the image formed when the shortest operation wavelength passing through an edge of the aperture strikes a specific field of view on the image plane and the position of the image formed via the primary light of the reference wavelength on the specific field of view on the image plane. The criteria for assessing whether an optical image capturing system has an excellent performance may be set as: both STAs of the incident longest operation wavelength and the incident shortest operation wavelength at 0.7 field of view on the image plane (i.e. 0.7 height of image (HOI)) must be less than 100 μm; or furthermore, even less than 80 μm.

The optical image capturing system has a maximum height of image HOI on the image plane perpendicular to the optical axis. A transverse aberration of the longest visible light operation wavelength of a positive direction tangential fan of the optical image capturing system passing through an edge of the entrance pupil and incident at the position of 0.7 HOI on the image plane is denoted as PLTA. A transverse aberration of the shortest visible light operation wavelength of the positive direction tangential fan of the optical image capturing system passing through the edge of the entrance pupil and incident at the position of 0.7 HOI on the image plane is denoted as PSTA. A transverse aberration of the longest visible light operation wavelength of a negative direction tangential fan of the optical image capturing system passing through the edge of the entrance pupil and incident at the position of 0.7 HOI on the image plane is denoted as NLTA. A transverse aberration of the shortest visible light operation wavelength of a negative direction tangential fan of the optical image capturing system passing through the edge of the entrance pupil and incident at the position of 0.7 HOI on the image plane is denoted as NSTA. A transverse aberration of the longest visible light operation wavelength of a sagittal fan of the optical image capturing system passing through the edge of the entrance pupil and incident at the position of 0.7 HOI on the image plane is denoted as SLTA. A transverse aberration of the shortest visible light operation wavelength of the sagittal fan of the optical image capturing system passing through the edge of the entrance pupil and incident at the position of 0.7 HOI on the image plane is denoted as SSTA.

The disclosure provides an optical image capturing system, the optical image capturing system being capable to focus on visible light and infrared light (dual-mode) simultaneously while achieving certain specified performance for each mode. Furthermore, the object-side surface or the image-side surface of the seventh lens of the optical image capturing system is configured with inflection points, such that angle of incidence from each field of view to the seventh lens may be adjusted effectively, and in particular, the optical distortion as well as the TV distortion may also be corrected. Additionally, surfaces of the seventh lens may possess a better capability for adjusting an optical path, so as to enhance image quality.

An optical image capturing system is provided in accordance with the present disclosure. In sequence from an object side to an image side, a first lens, a second lens, a third lens, a fourth lens, a fifth lens, a sixth lens, a seventh lens, and an image plane are included. The first lens has refractive power. Focal lengths of the first, second, third, fourth, fifth, sixth, and seventh lens are f1, f2, f3, f4, f5, f6, and f7 respectively. The focal length of the optical image capturing system is f. The entrance pupil diameter of the optical image capturing system is HEP. The distance on the optical axis from an object-side surface of the first lens to the image plane is HOS. A distance from the object-side surface of the first lens to the image-side surface of the seventh lens is denoted as InTL. Half of the maximum angle of view of the optical image capturing system is HAF. The optical image capturing system has a maximum height of image HOI on the image plane perpendicular to the optical axis. An outline curve starting from an intersection point of the optical axis and any surface of any one of those lenses, travelling along the outline of the surface, and ending at a coordinate point on the surface which has a vertical height of ½ entrance pupil diameter from the optical axis is defined, and the length of the outline curve is denoted as ARE. Conditions as follows are satisfied: $1 \leq f/HEP \leq 10$, and $0.9 \leq 2(ARE/HEP) \leq 2.0$.

Another optical image capturing system is further provided in accordance with the present disclosure. In sequence from an object side to an image side, a first lens, a second lens, a third lens, a fourth lens, a fifth lens, a sixth lens, a seventh lens, and an image plane are included. The first, second, third, fourth, fifth and sixth lens have refractive powers. The seventh lens has refractive power, and the object-side surface and the image-side surface of the seventh lens may be aspheric surfaces. At least one surface of at least one of the first, second, third, fourth, fifth, sixth, and seventh lens may possess at least one inflection point. Focal lengths of the first, second, third, fourth, fifth, sixth and seventh lenses are f1, f2, f3, f4, f5, and f6, and f7 respectively. The focal length of the optical image capturing system is f. The entrance pupil diameter of the optical image capturing system is HEP. The distance on the optical axis from an object-side surface of the first lens to the image plane is HOS. A distance from the object-side surface of the first lens to the image-side surface of the seventh lens is denoted as InTL. Half of the maximum angle of view of the optical image capturing system is HAF. The optical image capturing system has a maximum height of image HOI on the image plane perpendicular to the optical axis. An outline curve starting from an intersection point of the optical axis and any surface of any one of those lenses, travelling along the outline of the surface, and ending at a coordinate point on the surface which has a vertical height of ½ entrance pupil diameter from the optical axis is defined, and the length of the outline curve is denoted as ARE. Conditions as follows are satisfied: 1≤f/HEP≤10, 0.5≤HOS/HOI≤1.8, and 0.9≤2(ARE/HEP)≤2.0.

Yet another optical image capturing system is provided in accordance with the present disclosure. In sequence from an object side to an image side, a first lens, a second lens, a third lens, a fourth lens, a fifth lens, a sixth lens, a seventh lens, and an image plane are included. The first, second, third, fourth, fifth, sixth, and seventh lens have refractive powers. Among at least two of the first, second, third, fourth, fifth, sixth, and seventh lens, at least one inflection point is present on at least one surface of the at least two lenses. Focal lengths of the first, second, third, fourth, fifth, sixth and seventh lenses are f1, f2, f3, f4, f5, and f6, and f7 respectively. The focal length of the optical image capturing system is f. The entrance pupil diameter of the optical image capturing system is HEP. The distance on the optical axis from an object-side surface of the first lens to the image plane is HOS. A distance from the object-side surface of the first lens to the image-side surface of the seventh lens is denoted as InTL. Half of the maximum angle of view of the optical image capturing system is HAF. The optical image capturing system has a maximum height of image HOI on the image plane perpendicular to the optical axis. An outline curve starting from an intersection point of the optical axis and any surface of any one of those lenses, travelling along the outline of the surface, and ending at a coordinate point on the surface which has a vertical height of ½ entrance pupil diameter from the optical axis is defined, and the length of the outline curve is denoted as ARE. Conditions as follows are satisfied: 1≤f/HEP≤10, 0.5≤HOS/HOI≤1.8, and 0.9≤2(ARE/HEP)≤2.0.

Lengths of an outline curve of any surface of a single lens within a range of maximum effective half diameter affects a capability for correcting surface aberration and optical path difference between rays in each field of view. A longer outline curve length may lead to a better capability of aberration correction, but the difficulty of production may simultaneously become higher. Hence, the length of an outline curve of any surface of a single lens within the range of the maximum effective half diameter has to be controlled, and especially, the proportional relationship between the length of the outline curve (ARS) of the surface within the range of the maximum effective half diameter and the central thickness (TP) of the lens to which the surface belongs on the optical axis (that is, the ARS/TP value) has to be controlled. For example, the length of the maximum effective half diameter outline curve of the object-side surface of the first lens is denoted as ARS11, and a central thickness of the first lens on the optical axis is denoted as TP1, wherein a ratio between the length and the thickness is denoted as ARS11/TP1. A length of the maximum effective half diameter outline curve of the image-side surface of the first lens is denoted as ARS12, and a ratio between the ARS12 and TP1 is denoted as ARS12/TP1. A length of the maximum effective half diameter outline curve of the object-side surface of the second lens is denoted as ARS21, and a central thickness of the second lens on the optical axis is TP2, wherein a ratio between the length and the thickness is denoted as ARS21/TP2. A length of the maximum effective half diameter outline curve of the image-side surface of the second lens is denoted as ARS22, wherein a ratio between ARS22 and TP2 is denoted as ARS22/TP2. Proportional relationships between the lengths of the maximum effective half diameter outline curve of any surface of other lenses and central thicknesses (TP) of other lenses to which the surfaces belong on the optical axis are denoted according to the regular pattern shown above.

An outline curve length of ½ entrance pupil diameter within a range of height (HEP) of any surface of a single lens specifically affects a capability of correcting the aberration in a shared region of each field of view on the surface and a capability of correcting the optical path difference among each field of view. Longer outline curve lengths may lead to a better capability of aberration correction, but the difficulty in production of such lens may simultaneously become higher. Hence, an outline curve length of ½ entrance pupil diameter within a range of height (HEP) of any surface of a single lens has to be controlled, and especially, a proportional relationship between the outline curve length (ARE) of ½ entrance pupil diameter within a range of height (HEP) of any surface of a single lens and a central thickness (TP) on the optical axis (that is, the ARE/TP value) has to be controlled. For example, an outline curve length of the ½ entrance pupil diameter height (HEP) of the object-side surface of the first lens is denoted as ARE11, and a central thickness of the first lens on the optical axis is denoted as TP1, wherein a ratio thereof is denoted as ARE11/TP1. An outline curve length of the ½ entrance pupil diameter height (HEP) of the image-side surface of the first lens is denoted as ARE12, wherein a ratio of the ARE12 to TP1 is denoted as ARE12/TP1. An outline curve length of the ½ entrance pupil diameter height (HEP) of the object-side surface of the second lens is denoted as ARE21, and a central thickness of the second lens on the optical axis is denoted as TP2, wherein the ratio thereof is denoted as ARE21/TP2. An outline curve length of the ½ entrance pupil diameter height (HEP) of the image-side surface of the second lens is denoted as ARE22, wherein a ratio of the ARE22 to TP2 is denoted as ARE22/TP2. Proportional relationships of outline curve lengths of the ½ entrance pupil diameter height (HEP) on any surface of other lenses of the optical image capturing system to central thicknesses (TP) on the optical axis of other lenses to which the surfaces belong are denoted according to the regular pattern shown above.

A height of optical system (HOS) may be appropriately reduced so as to achieve a miniaturization of the optical image capturing system when |f1|>|f7|.

When a relationship of |f2|+|f3|+|f4|+|f5|+|f6|>|f1|+|f7| is met, at least one of the second to the sixth lens may have a weak positive refractive power or a weak negative refractive power. The aforementioned weak refractive power indicates that an absolute value of the focal length of a specific lens is greater than 10. When at least one of the second lens to the sixth lens has the weak positive refractive power, the positive refractive power of the first lens may be shared, so as to prevent unnecessary aberration from appearing too early. On the contrary, when at least one of the second lens to the sixth lens has the weak negative refractive power, the aberration of the optical image capturing system may be corrected and fine-tuned.

In addition, the seventh lens may have a negative refractive power with a concave image-side surface. In this manner, a back focal length may be reduced to maintain a miniaturized optical image capturing system. Additionally, at least one surface of the seventh lens may possess at least one inflection point, which is capable of effectively reducing an incident angle of the off-axis FOV rays, thereby further correcting an off-axis FOV aberration.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The detailed structure, operating principle and effects of the present disclosure will now be described in more detail hereinafter with reference to the accompanying drawings that show various embodiments of the present disclosure as follows.

DETAILED DESCRIPTION

Figure 1A:
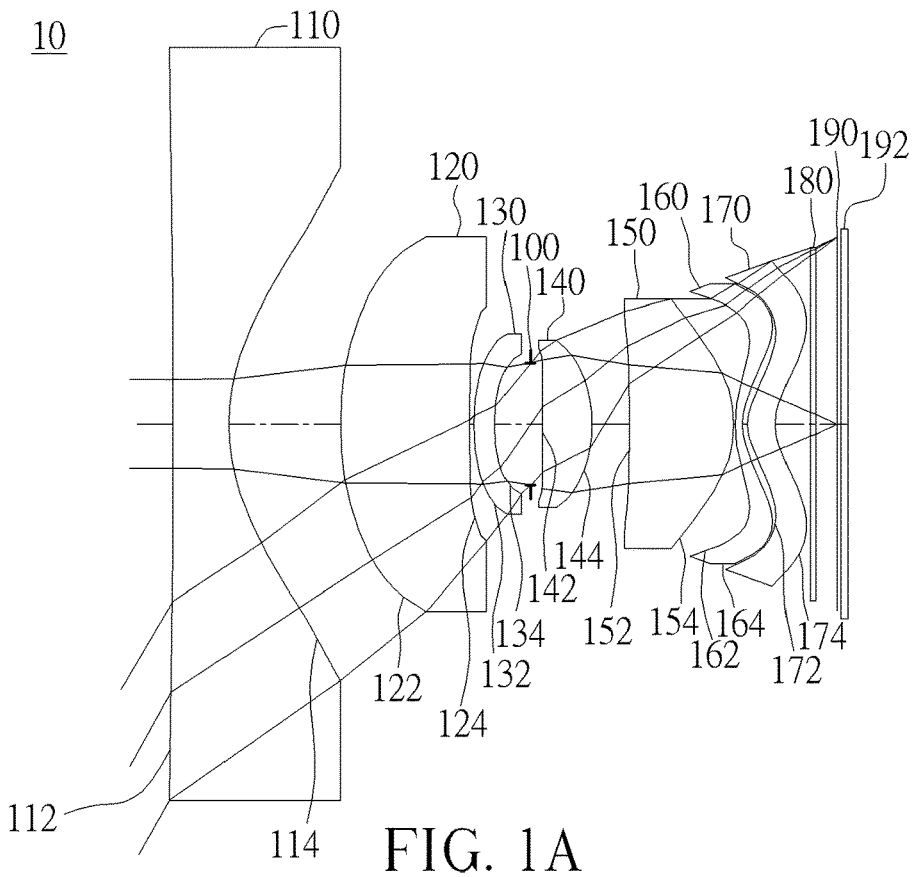
FIG. 1A is a schematic view of an optical image capturing system according to a first embodiment of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in sequence from an object side to an image side, includes a first lens, a second lens, a third lens, a fourth lens, a fifth lens, a sixth lens, and a seventh lens, all with refractive power, along with an image plane. The optical image capturing system may further include an image sensing device, which is configured on the image plane. An image height of subsequent embodiments is approximately 3.91 mm.

The optical image capturing system may utilize three sets of operation wavelengths which are 486.1 nm, 587.5 nm and 656.2 nm respectively, wherein the 587.5 nm wavelength is served as a primary reference wavelength and a reference wavelength for obtaining technical features. The optical image capturing system may also utilize five sets of operation wavelengths which are 470 nm, 510 nm, 555 nm, 610 nm and 650 nm respectively, wherein the 555 nm wavelength is served as the primary reference wavelength and the reference wavelength for obtaining technical features.

A ratio of the focal length f of the optical image capturing system to the focal length fp of each lens with positive refractive power is denoted as PPR. A ratio of the focal length f of the optical image capturing system to the focal length fn of each lens with negative refractive power is denoted as NPR. A sum of the PPR of all lenses with positive refractive powers is denoted as ΣPPR, and a sum of the NPR of all lenses with negative refractive powers is denoted as ΣNPR. A total refractive power and a total length of the optical image capturing system may be easier to control when the following conditions are met: 0.5≤ΣPPR/|ΣNPR|≤15; preferably, the following condition may be met: 1.0≤ΣPPR/|ΣNPR|≤3.0.

The optical image capturing system may further include an image sensing device, which is configured on the image plane. Half of a diagonal of an effective sensing field of the image sensing device (i.e. the image height or the so-called maximum image height of the optical image capturing system) is denoted as HOI. A distance on the optical axis from the object-side surface of the first lens to the image plane is denoted as HOS, which meets the following conditions: HOS/HOI≤10 and 0.5≤HOS/f≤10. Preferably, the following conditions may be met: 1≤HOS/HOI≤5 and 1≤HOS/f≤7. As a result, the optical image capturing system may remain miniaturized, so as to be applicable to a light-weight and portable electronic product.

In addition, in the optical image capturing system of the disclosure, at least one aperture may be configured depending on requirements so as to reduce stray light and improve image quality.

In the optical image capturing system of the disclosure, the aperture may be configured as a front-set aperture or middle-set aperture, wherein the front-set aperture is disposed between a photographed object and the first lens, and the middle-set aperture is disposed between the first lens and the image plane. If the aperture is the front-set aperture, a longer distance between the exit pupil and the image plane of the optical image capturing system may be provided, such that more optical elements may be accommodated in the optical image capturing system, and an efficiency of the image sensing device in receiving images may be improved. If the aperture is the middle-set aperture, an angle of field of view (FOV) of the optical image capturing system may be expanded, such that the optical image capturing system has the same advantage as wide-angle cameras. A distance from the aforementioned apertures to the image plane is denoted as InS, which meets the following conditions: 0.2≤InS/HOS≤1.1. Hence, the optical image capturing system may simultaneously be miniaturized while equipped with wide-angle features.

In the optical image capturing system of the present disclosure, the distance from the object-side surface of the first lens to the image-side surface of the seventh lens is denoted as InTL. A sum of central thicknesses of all lenses with refractive power on the optical axis is denoted as ΣTP. The following condition is met: 0.1≤ΣTP/InTL≤0.9. In this manner, a suitable contrast ratio for image formation in the optical image capturing system and a suitable yield rate of manufacturing the lenses may be simultaneously achieved, and an appropriate back focal length may be provided so as to accommodate other optical elements in the optical image capturing system.

A curvature radius of the object-side surface of the first lens is denoted as R1, a curvature radius of the image-side surface of the first lens is denoted as R2, and the following conditions are met: 0.001≤|R1/R2|≤20. Preferably, the following condition may be met: 0.01≤|R1/R2|<10.

A curvature radius of the object-side surface of the seventh lens is denoted as R13. A curvature radius of the image-side surface of the seventh lens is denoted as R14. The following condition is met: −7<(R11−R12)/(R11+R12)<50. Such configuration is beneficial for correcting astigmatism generated by the optical image capturing system.

A distance between the first lens and the second lens on the optical axis is denoted as IN12. The following condition is met: 0<IN12/f≤3.0. Hence, chromatic aberration of the lens may be mitigated, such that performance thereof is improved.

A distance between the sixth lens and the seventh lens on the optical axis is denoted as IN67. The following condition is met: IN67/f≤0.8. Hence, chromatic aberration of the lens may be mitigated, such that performance thereof is improved.

A central thicknesses of the first lens and the second lens on the optical axis are denoted as TP1 and TP2, respectively, which meets the following condition: 0.1≤(TP1+IN12)/TP2≤10. Hence, a sensitivity formed via the optical image capturing system may be easier to control, and performance of the optical image capturing system may be improved.

Central thicknesses of the sixth lens and the seventh lens on the optical axis are denoted as TP6 and TP7, respectively, and a distance between the aforementioned two lenses on the optical axis is denoted as IN67. The following condition is met: 0.1≤(TP7+IN67)/TP6≤10. Hence, a sensitivity formed via the optical image capturing system may be easier to control, and a total height of the optical image capturing system may be reduced.

Central thicknesses of the third lens, the fourth lens and the fifth lens on the optical axis are denoted as TP3, TP4 and TP5, respectively; a distance between the third lens and the fourth lens on the optical is denoted as IN34, and a distance between the fourth lens and the fifth lens on the optical is denoted as IN45. A distance from an object-side surface of the first lens to an image-side surface of the seventh lens is denoted as InTL. The following condition is met: 0.1≤TP4/(IN34+TP4+IN45)<1. Hence, an aberration generated in a process of the incident light travelling inwardly into the optical image capturing system may be easier to gradually correct layer upon layer, and the total height of the optical image capturing system may be reduced.

In the optical image capturing system of the present disclosure, a perpendicular distance between a critical point C71 on the object-side surface of the seventh lens and the optical axis is denoted as HVT71. A perpendicular distance to the optical axis between a critical point C72 on the image-side surface of the seventh lens and the optical axis is denoted as HVT72. A horizontal shift distance in parallel with the optical axis between an intersection of the object-side surface of the seventh lens on the optical axis and the critical point C71 is denoted as SGC71. A horizontal shift distance in parallel with the optical axis between an intersection of the image-side surface of the seventh lens on the optical axis and the critical point C72 is denoted as SGC72. The following conditions may be satisfied: 0 mm≤HVT71≤3 mm; 0 mm≤HVT72≤6 mm; 0≤HVT71/HVT72; 0 mm≤|SGC71|≤0.5 mm; 0 mm<|SGC72|≤2 mm; and 0<|SGC72|/(|SGC72|+TP7)≤0.9. Hence, an off-axis FOV aberration may be effectively corrected.

In the optical image capturing system of the present disclosure, the following conditions are satisfied: 0.2≤HVT72/HOI≤0.9. Preferably, the following conditions are satisfied: 0.3≤HVT72/HOI≤0.8. Hence, an aberration of a peripheral field of view of the optical image capturing system may be corrected.

In the optical image capturing system of the present disclosure, the following conditions are satisfied: 0≤HVT72/HOS≤0.5. Preferably, the following conditions are satisfied: 0.2≤HVT72/HOS≤0.45. Hence, an aberration of a peripheral field of view of the optical image capturing system may be corrected.

In the optical image capturing system of the present disclosure, a horizontal shift distance in parallel with the optical axis from an inflection point which is nearest to the optical axis on the object-side surface of the seventh lens to an intersection point on the optical axis of the object-side surface of the seventh lens is denoted as SGI711. A horizontal shift distance in parallel with the optical axis from an inflection point which is nearest to the optical axis on the image-side surface of the seventh lens to an intersection point on the optical axis of the image-side surface of the seventh lens is denoted as SGI721. The following conditions are met: 0<SGI711/(SGI711+TP7)≤0.9 and 0<SGI721/(SGI721+TP7)≤0.9. Preferably, the following conditions may be met: 0.1≤SGI711/(SGI711+TP7)≤0.6 and 0.1≤SGI721/(SGI721+TP7)≤0.6.

A horizontal shift distance in parallel with the optical axis from the inflection point which is the second nearest to the optical axis on the object-side surface of the seventh lens to an intersection point on the optical axis of the object-side surface of the seventh lens is denoted as SGI712. A horizontal shift distance in parallel with the optical axis from the inflection point which is the second nearest to the optical axis on the image-side surface of the seventh lens to an intersection point on the optical axis of the image-side surface of the seventh lens is denoted as SGI722. The following conditions are met: 0<SGI712/(SGI712+TP7) ≤0.9 and 0<SGI722/(SGI722+TP7)≤0.9. Preferably, the following conditions may be met: 0.1≤SGI712/(SGI712+TP7) ≤0.6 and 0.1≤SGI722/(SGI722+TP7)≤0.6.

A perpendicular distance to the optical axis between the inflection point which is nearest to the optical axis on the object-side surface of the seventh lens and the optical axis is denoted as HIF711. A perpendicular distance to the optical axis between the inflection point which is nearest to the optical axis on the image-side surface of the seventh lens and an intersection point on the optical axis of the image-side surface of the seventh lens is denoted as HIF721. The following conditions are met: 0.001 mm≤|HIF711|≤5 mm; 0.001 mm≤|HIF721|≤5 mm. Preferably, the following conditions may be met: 0.1 mm≤|HIF711|≤3.5 mm; 1.5 mm≤|HIF721|≤3.5 mm.

A perpendicular distance to the optical axis between the inflection point which is the second nearest to the optical axis on the object-side surface of the seventh lens and the optical axis is denoted as HIF712. A perpendicular distance to the optical axis between an intersection point on the optical axis of the image-side surface of the seventh lens and the inflection point which is the second nearest to the optical axis on the image-side surface of the seventh lens is denoted as HIF722. The following conditions are met: 0.001 mm≤|HIF712|≤5 mm; 0.001 mm≤|HIF722|≤5 mm. Preferably, the following conditions are met: 0.1 mm≤|HIF722|≤3.5 mm; 0.1 mm≤|HIF712|≤3.5 mm.

A perpendicular distance to the optical axis between the inflection point which is the third nearest to the optical axis on the object-side surface of the seventh lens and the optical axis is denoted as HIF713. A perpendicular distance to the optical axis between an intersection point on the optical axis of the image-side surface of the seventh lens and the inflection point which is the third nearest to the optical axis on the image-side surface of the seventh lens is denoted as HIF723. The following conditions are met: 0.001 mm≤|HIF713|≤5 mm and 0.001 mm≤|HIF723|≤5 mm; preferably, the following conditions may be met: 0.1 mm≤|HIF723|≤3.5 mm and 0.1 mm≤|HIF713|≤3.5 mm.

A perpendicular distance to the optical axis between the inflection point which is the fourth nearest to the optical axis on the object-side surface of the seventh lens and the optical axis is denoted as HIF714. A perpendicular distance to the optical axis between an intersection point on the optical axis of the image-side surface of the seventh lens and the inflection point which is the fourth nearest to the optical axis on the image-side surface of the seventh lens is denoted as HIF724. The following conditions are met: 0.001 mm≤|HIF714|≤5 mm and 0.001 mm≤|HIF724|≤5 mm; preferably, the following conditions may be met: 0.1 mm≤|HIF724|≤3.5 mm and 0.1 mm≤|HIF714|≤3.5 mm.

In one embodiment of the optical image capturing system of the present disclosure, a chromatic aberration of the optical image capturing system may be easier to correct via alternately arranging lenses with a large Abbe number and a small Abbe number.

An equation of the aforementioned aspheric surface is:

$$z=ch2/[1+[1-(k+1)c2h2]0.5]+A4h4+A6h6+A8h8+ A10h10+A12h12+A14h14+A16h16+A18\,h18+ A20h20+\ldots \qquad (1),$$

wherein z is a position value of the position at a height h along the optical axis which refers to the surface apex, k is the conic coefficient, c is the reciprocal of curvature radius, and A4, A6, A8, A10, A12, A14, A16, A18 as well as A20 are high-order aspheric coefficients.

In the optical image capturing system provided by the present disclosure, a material of lens may be glass or plastic. If a plastic material is adopted, a manufacture cost as well as a weight of the lens may be reduced effectively. If a glass material is adopted, a heat effect may be controlled, and a design space for configuring the lenses with their respective refractive powers of the optical image capturing system may also be increased. Additionally, the object-side surface and the image-side surface of the first to the seventh lens in the optical image capturing system may be aspheric surfaces, which provide more controlled variables, such that the number of lenses used may be less than the number of lenses used when traditional glass lenses are selected; in addition, the aberration may be mitigated as well. Hence, the total height of the optical image capturing system may be reduced effectively.

In addition, in the optical image capturing system provided by the present disclosure, if the surface of a lens is a convex surface, in principle the surface of the lens adjacent to the optical axis is a convex surface. If the surface of a lens is a concave surface, in principle the surface of the lens adjacent to the optical axis is a concave surface.

The optical image capturing system of the present disclosure may be further applied to an optical system with an automatic-focus feature depending on requirements. Having features of both aberration correction and an ability to form high-quality images, the optical image capturing system may have even broader applications.

The optical image capturing system of the present disclosure may further include a driving module depending on requirements, wherein the driving module may be coupled to the lenses to enable lens movement. The aforementioned driving module may be a voice coil motor (VCM) which is used to drive the lenses to focus, or may be an optical image stabilization (OIS) element which is used to reduce a frequency of through-focus occurrence resulting from lens vibration when shooting photo or video.

At least one lens among the first, second, third, fourth, fifth, sixth, and seventh lenses of the optical image capturing system of the present disclosure may be set as a light filtering element which filters wavelength less than 500 nm depending on requirements. The light filtering element may be made by coating a film on at least one surface of the lens specifically having a filtering function, or by forming the lens itself with a material which may filter out light with short wavelengths.

An image-side surface of the optical image capturing system of the present disclosure may further be set as a flat surface or a curved surface depending on requirements. When the image-side surface is a curved surface (such as a spherical surface with a curvature radius), an incident angle for focusing light at the image-side surface may be reduced, which may in turn help reducing a total length (TTL) of the miniaturized optical image capturing system while increase relative illuminance.

Specific embodiments are presented below in detail with reference to figures based on the description above.

First Embodiment

Figure 1B:
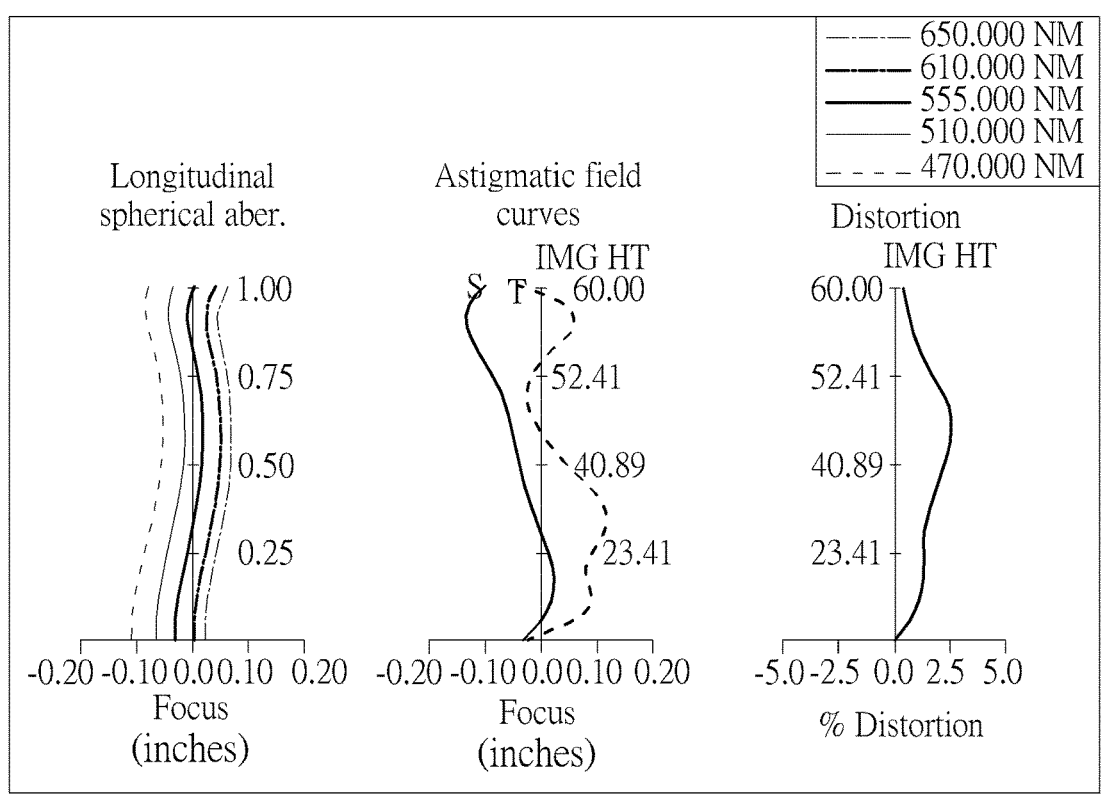
FIG. 1B is a curve diagram illustrating spherical aberration, astigmatism and optical distortion of the optical image capturing system in sequence from left to right according to the first embodiment of the present disclosure.
Figure 1C:
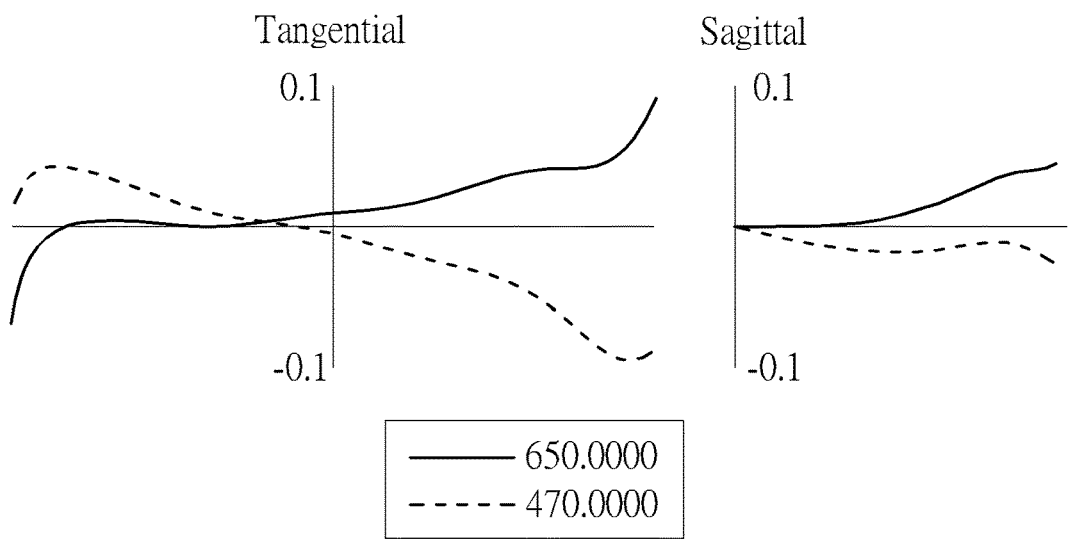
FIG. 1C is a transverse aberration diagram of the longest operation wavelength and the shortest operation wavelength for a tangential fan and a sagittal fan, of which the longest operation wavelength and the shortest operation wavelength pass through an edge of aperture at a position of 0.7 field of view on the image plane, according to the first embodiment of the present disclosure.

Please refer to FIGS. 1A and 1B, wherein FIG. 1A is a schematic view of the optical image capturing system according to the first embodiment of the present disclosure; FIG. 1B is a curve diagram illustrating the spherical aberration, astigmatism and optical distortion of the optical image capturing system in sequence from left to right according to the first embodiment of the present disclosure; FIG. 1C is a transverse aberration diagram of the longest operation wavelength and the shortest operation wavelength for tangential fan and sagittal fan, of which the longest operation wavelength and the shortest operation wavelength pass through the edge of the aperture at the position of 0.7 field of view on the image plane according to the first embodiment of the present disclosure. As shown in FIG. 1A, it may be seen that, in the order from the object side to the image side, the optical image capturing system includes a first lens 110, a second lens 120, a third lens 130, an aperture 100, a fourth lens 140, a fifth lens 150, a sixth lens 160, a seventh lens 170, an infrared filter 180, an image plane 190, and an image sensing device 192.

First lens 110 has negative refractive power and is made of plastic materials. The first lens 110 has a concave object-side surface 112 and a concave image-side surface 114, wherein both surfaces are aspheric. The object-side surface 112 thereof has an inflection point. The image-side surface 114 thereof has two inflection points. The outline curve length of the maximum effective half diameter of the object-side surface of the first lens is denoted as ARS11. The outline curve length of the maximum effective half diameter of the image-side surface of the first lens is denoted as ARS12. The outline curve length of ½ entrance pupil diameter (HEP) of the object-side surface of the first lens is denoted as ARE11, and the length of outline curve of ½ entrance pupil diameter (HEP) of the image-side surface of the first lens is denoted as ARE12. The central thickness of the first lens on the optical axis is denoted as TP1.

A horizontal shift distance in parallel with the optical axis from an inflection point which is nearest to the optical axis on the object-side surface of the first lens to an intersection point on the optical axis of the object-side surface of the first lens is denoted as SGI111. A horizontal shift distance in parallel with the optical axis from an inflection point which is nearest to the optical axis on the image-side surface of the first lens to an intersection point on the optical axis of the image-side surface of the first lens is denoted as SGI121. The following conditions are met: SGI111=−0.1110 mm, SGI121=2.7120 mm, TP1=2.2761 mm, |SGI111|/(|SGI111|+TP1)=0.0465, and |SGI121|/(|SGI121|+TP1)=0.5437.

A horizontal shift distance in parallel with the optical axis from the inflection point which is the second nearest to the optical axis on the object-side surface of the first lens to an intersection point on the optical axis of the object-side surface of the first lens is denoted as SGI112. A horizontal shift distance in parallel with the optical axis from the inflection point which is the second nearest to the optical axis on the image-side surface of the first lens to an intersection point on the optical axis of the image-side surface of the first lens is denoted as SGI122. The following conditions are met: SGI112=0 mm, SGI122=4.2315 mm, |SGI112|/(|SGI112|+TP1)=0, and |SGI122|/(|SGI122|+TP1)=0.6502.

A perpendicular distance to the optical axis from the inflection point which is nearest to the optical axis on the object-side surface of the first lens to an intersection point on the optical axis of the object-side surface of the first lens is denoted as HIF111. A perpendicular distance to the optical axis from the inflection point which is nearest to the optical axis on the image-side surface of the first lens to an intersection point on the optical axis of the image-side surface of the first lens is denoted as HIF121. The following conditions are met: HIF111=12.8432 mm, HIF111/HOI=1.7127, HIF121=7.1744 mm, and HIF121/HOI=0.9567.

A perpendicular distance to the optical axis between the inflection point which is the second nearest to the optical axis on the object-side surface of the first lens and the optical axis is denoted as HIF112. A perpendicular distance to the optical axis between an intersection point on the optical axis of the image-side surface of the first lens and the inflection point which is the second nearest to the optical axis on the image-side surface of the first lens is denoted as HIF122. The following conditions are met: HIF112=0 mm, HIF112/HOI=0, HIF122=9.8592 mm, and HIF122/HOI=1.3147.

Second lens 120 has positive refractive power and is made of plastic materials. The second lens 120 has a convex object-side surface 122 and a concave image-side surface 124, wherein both surfaces are aspheric. The outline curve length of the maximum effective half diameter of the object-side surface of the second lens is denoted as ARS21, and the outline curve length of the maximum effective half diameter of the image-side surface of the second lens is denoted as ARS22. The outline curve length of ½ entrance pupil diameter (HEP) of the object-side surface of the second lens is denoted as ARE21, and the outline curve length of ½ entrance pupil diameter (HEP) of the image-side surface of the second lens is denoted as ARE22. The central thickness of the second lens on the optical axis is denoted as TP2.

A horizontal shift distance in parallel with the optical axis from an inflection point which is nearest to the optical axis on the object-side surface of the second lens to an intersection point on the optical axis of the object-side surface of the second lens is denoted as SGI211. A horizontal shift distance in parallel with the optical axis from an inflection point which is nearest to the optical axis on the image-side surface of the second lens to an intersection point on the optical axis of the image-side surface of the second lens is denoted as SGI221.

A perpendicular distance to the optical axis from the inflection point which is nearest to the optical axis on the object-side surface of the second lens to an intersection point on the optical axis of the object-side surface of the second lens is denoted as HIF211. A perpendicular distance to the optical axis from the inflection point which is nearest to the optical axis on the image-side surface of the second lens to an intersection point on the optical axis of the image-side surface of the second lens is denoted as HIF221.

The third lens 130 has negative refractive power and is made of plastic materials. The third lens 130 has a convex object-side surface 132 and a concave image-side surface 134, wherein both surfaces are aspheric. The outline curve length of the maximum effective half diameter of the object-side surface of the third lens is denoted as ARS31, and the outline curve length of the maximum effective half diameter of the image-side surface of the third lens is denoted as ARS32. The outline curve length of ½ entrance pupil diameter (HEP) of the object-side surface of the third lens is denoted as ARE31, and the outline curve length of ½ entrance pupil diameter (HEP) of the image-side surface of the third lens is denoted as ARE32. The central thickness of the third lens on the optical axis is denoted as TP3.

A horizontal shift distance in parallel with the optical axis from an inflection point which is nearest to the optical axis on the object-side surface of the third lens to an intersection point on the optical axis of the object-side surface of the third lens is denoted as SGI311. A horizontal shift distance in parallel with the optical axis from an inflection point which is nearest to the optical axis on the image-side surface of the third lens to an intersection point on the optical axis of the image-side surface of the third lens is denoted as SGI321.

A horizontal shift distance in parallel with the optical axis from an inflection point which is second nearest to the optical axis on the object-side surface of the third lens to an intersection point on the optical axis of the object-side surface of the third lens is denoted as SGI312. A horizontal shift distance in parallel with the optical axis from an inflection point which is second nearest to the optical axis on the image-side surface of the third lens to an intersection point on the optical axis of the image-side surface of the third lens is denoted as SGI322.

A perpendicular distance to the optical axis from the inflection point which is nearest to the optical axis on the object-side surface of the third lens to the optical axis is denoted as HIF311. A perpendicular distance to the optical axis from the inflection point which is nearest to the optical axis on the image-side surface of the third lens to the optical axis is denoted as HIF321.

A perpendicular distance to the optical axis from the inflection point which is second nearest to the optical axis on the object-side surface of the third lens to the optical axis is denoted as HIF312. A perpendicular distance to the optical axis from the inflection point which is second nearest to the optical axis on the image-side surface of the third lens to an intersection point on the optical axis of the image-side surface of the third lens is denoted as HIF322.

The fourth lens 140 has positive refractive power and is made of plastic materials. The fourth lens 140 has a convex object-side surface 142 and a convex image-side surface 144, wherein both surfaces are aspheric, and the object-side surface 142 thereof has an inflection point. The outline curve length of the maximum effective half diameter of the object-side surface of the fourth lens is denoted as ARS41, and the outline curve length of the maximum effective half diameter of the image-side surface of the fourth lens is denoted as ARS42. The outline curve length of ½ entrance pupil diameter (HEP) of the object-side surface of the fourth lens is denoted as ARE41, and the outline curve length of ½ entrance pupil diameter (HEP) of the image-side surface of the fourth lens is denoted as ARE42. The central thickness of the fourth lens on the optical axis is denoted as TP4.

A horizontal shift distance in parallel with the optical axis from an inflection point which is nearest to the optical axis on the object-side surface of the fourth lens to an intersection point on the optical axis of the object-side surface of the fourth lens is denoted as SGI411. A horizontal shift distance in parallel with the optical axis from an inflection point which is nearest to the optical axis on the image-side surface of the fourth lens to an intersection point on the optical axis of the image-side surface of the fourth lens is denoted as SGI421. The following conditions are met: SGI411=0.0018 mm and |SGI411|/(|SGI411|+TP4)=0.0009.

A horizontal shift distance in parallel with the optical axis from an inflection point which is second nearest to the optical axis on the object-side surface of the fourth lens to an intersection point on the optical axis of the object-side surface of the fourth lens is denoted as SGI412. A horizontal shift distance in parallel with the optical axis from an inflection point which is second nearest to the optical axis on the image-side surface of the fourth lens to an intersection point on the optical axis of the image-side surface of the fourth lens is denoted as SGI422.

A perpendicular distance to the optical axis from the inflection point which is nearest to the optical axis on the object-side surface of the fourth lens to the optical axis is denoted as HIF411. A perpendicular distance to the optical axis from the inflection point which is nearest to the optical axis on the image-side surface of the fourth lens to the optical axis is denoted as HIF421. The following conditions are met: HIF411=0.7191 mm, HIF411/HOI=0.0959.

A perpendicular distance to the optical axis from the inflection point which is second nearest to the optical axis on the object-side surface of the fourth lens to the optical axis is denoted as HIF412. A perpendicular distance to the optical axis from the inflection point which is second nearest to the optical axis on the image-side surface of the fourth lens to the optical axis is denoted as HIF422.

The fifth lens 150 has positive refractive power and is made of plastic materials. The fifth lens 150 has a concave object-side surface 152 and a convex image-side surface 154, wherein both surfaces are aspheric; the object-side surface 152 and the image-side surface 154 of the fifth lens 150 each has an inflection point. The outline curve length of the maximum effective half diameter of the object-side surface of the fifth lens is denoted as ARS51, and the outline curve length of the maximum effective half diameter of the image-side surface of the fifth lens is denoted as ARS52. The outline curve length of ½ entrance pupil diameter (HEP) of the object-side surface of the fifth lens is denoted as ARE51, and the outline curve length of ½ entrance pupil diameter (HEP) of the image-side surface of the fifth lens is denoted as ARE52. The central thickness of the fifth lens on the optical axis is denoted as TP5.

A horizontal shift distance in parallel with the optical axis from an inflection point which is nearest to the optical axis on the object-side surface of the fifth lens to an intersection point on the optical axis of the object-side surface of the fifth lens is denoted as SGI511. A horizontal shift distance in parallel with the optical axis from an inflection point which is nearest to the optical axis on the image-side surface of the fifth lens to an intersection point on the optical axis of the image-side surface of the fifth lens is denoted as SGI521. The following conditions are met: SGI511=−0.1246 mm, SGI521=−2.1477 mm, |SGI511|/(|SGI511|+TP5)=0.0284, and |SGI521|/(|SGI521|+TP5)=0.3346.

A horizontal shift distance in parallel with the optical axis from an inflection point which is second nearest to the optical axis on the object-side surface of the fifth lens to an intersection point on the optical axis of the object-side surface of the fifth lens is denoted as SGI512. A horizontal shift distance in parallel with the optical axis from an inflection point which is second nearest to the optical axis on the image-side surface of the fifth lens to an intersection point on the optical axis of the image-side surface of the fifth lens is denoted as SGI522.

A perpendicular distance to the optical axis from the inflection point which is nearest to the optical axis on the object-side surface of the fifth lens to the optical axis is denoted as HIF511. A perpendicular distance to the optical axis from the inflection point which is nearest to the optical axis on the image-side surface of the fifth lens to the optical axis is denoted as HIF521. The following conditions are met: HIF511=3.8179 mm, HIF521=4.5480 mm, HIF511/HOI=0.5091, and HIF521/HOI=0.6065.

A perpendicular distance to the optical axis from the inflection point which is second nearest to the optical axis on the object-side surface of the fifth lens to the optical axis is denoted as HIF512. A perpendicular distance to the optical axis from the inflection point which is second nearest to the optical axis on the image-side surface of the fifth lens to the optical axis is denoted as HIF522.

The sixth lens 160 has negative refractive power and is made of plastic materials. The sixth lens 160 has a convex object-side surface 162 and a concave image-side surface 164, wherein the object-side surface 162 and the image-side surface 164 of the sixth lens 160 each has an inflection point. The outline curve length of the maximum effective half diameter of the object-side surface of the sixth lens is denoted as ARS61, and the outline curve length of the maximum effective half diameter of the image-side surface of the sixth lens is denoted as ARS62. The outline curve length of ½ entrance pupil diameter (HEP) of the object-side surface of the sixth lens is denoted as ARE61, and the outline curve length of ½ entrance pupil diameter (HEP) of the image-side surface of the sixth lens is denoted as ARE62. The central thickness of the sixth lens on the optical axis is denoted as TP6.

A horizontal shift distance in parallel with the optical axis from an inflection point which is nearest to the optical axis on the object-side surface of the sixth lens to an intersection point on the optical axis of the object-side surface of the sixth lens is denoted as SGI611. A horizontal shift distance in parallel with the optical axis from an inflection point which is nearest to the optical axis on the image-side surface of the sixth lens to an intersection point on the optical axis of the image-side surface of the sixth lens is denoted as SGI621. The following conditions are met: SGI611=0.3208 mm, SGI621=0.5937 mm, |SGI611|/(|SGI611|+TP6)=0.5167, and |SGI621|/(|SGI621|+TP6)=0.6643.

A perpendicular distance to the optical axis from the inflection point which is nearest to the optical axis on the object-side surface of the sixth lens to the optical axis is denoted as HIF611. A perpendicular distance to the optical axis from the inflection point which is nearest to the optical axis on the image-side surface of the sixth lens to the optical axis is denoted as HIF621. The following conditions are met: HIF611=1.9655 mm, HIF621=2.0041 mm, HIF611/HOI=0.2621 and HIF621/HOI=0.2672.

The seventh lens 170 has positive refractive power and is made of plastic materials. The seventh lens 170 has a convex object-side surface 172 and a concave image-side surface 174. In this manner, the back focal length may be reduced to maintain a miniaturized optical image capturing system. Additionally, the object-side surface 172 and the image-side surface 174 of the seventh lens 170 each has an inflection point. The outline curve length of the maximum effective half diameter of the object-side surface of the seventh lens is denoted as ARS71, and the outline curve length of the maximum effective half diameter of the image-side surface of the seventh lens is denoted as ARS72. The outline curve length of ½ entrance pupil diameter (HEP) of the object-side surface of the seventh lens is denoted as ARE71, and the outline curve length of ½ entrance pupil diameter (HEP) of the image-side surface of the seventh lens is denoted as ARE72. The central thickness of the seventh lens on the optical axis is denoted as TP7.

A horizontal shift distance in parallel with the optical axis from an inflection point which is nearest to the optical axis on the object-side surface of the seventh lens to an intersection point on the optical axis of the object-side surface of the seventh lens is denoted as SGI711. A horizontal shift distance in parallel with the optical axis from an inflection point which is nearest to the optical axis on the image-side surface of the seventh lens to an intersection point on the optical axis of the image-side surface of the seventh lens is denoted as SGI721. The following conditions are met: SGI711=0.5212 mm, SGI721=0.5668 mm, |SGI711|/(|SGI711|+TP7)=0.3179, and |SGI721|/(|SGI721|+TP7)=0.3364.

A perpendicular distance to the optical axis from the inflection point which is nearest to the optical axis on the object-side surface of the seventh lens to the optical axis is denoted as HIF711. A perpendicular distance to the optical axis from the inflection point which is nearest to the optical axis on the image-side surface of the seventh lens to the optical axis is denoted as HIF721. The following conditions are met: HIF711=1.6707 mm, HIF721=1.8616 mm, HIF711/HOI=0.2228, and HIF721/HOI=0.2482.

Features of the present embodiment as described below and features relevant to inflection points of the present embodiment are based on the primary reference wavelength of 555 nm.

The infrared filter 180 is made of glass materials and configured between the seventh lens 170 and the image plane 190. Additionally, the infrared filter 180 does not affect the focal length of the optical image capturing system.

In the optical image capturing system of the present embodiment, the focal length of the optical image capturing system is f, the entrance pupil diameter of the optical image capturing system is HEP, and half of the maximum angle of view of the optical image capturing system is HAF. The detailed parameters are shown as follows: f=4.3019 mm, f/HEP=1.2, HAF=59.9968 deg. and tan(HAF)=1.7318.

In the optical image capturing system of the present embodiment, the focal length of the first lens 110 is f1, and the focal length of the seventh lens 170 is P. The following conditions are met: f1=−14.5286 mm, |f/f1|=0.2961, f7=8.2933, |f1|>f7, and |f1/f7|=1.7519.

In the optical image capturing system of the present embodiment, the focal length of the second lens 120, the third lens 130, the fourth lens 140, the fifth lens 150 and the sixth lens 160 is f2, f3, f4, f5 and f6, respectively. The following conditions are met: |f2|+|f3|+|f4|+|f5|+|f6|=144.7494, |f1|+|f7|=22.8219, and |f2|+|f3|+|f4|+|f5|+|f6|+|f6|>|f1|+|f7|.

The ratio of the focal length f of the optical image capturing system to a focal length fp of each of lenses with positive refractive powers is denoted as PPR. The ratio of the focal length f of the optical image capturing system to a focal length fn of each of lenses with negative refractive powers is denoted as NPR. In the optical image capturing system of the present embodiment, the sum of the PPR of all lenses with positive refractive power is ΣPPR=f/f2+f/f4+f/f5+f/f7=1.7384, and the sum of the NPR of all lenses with negative refractive power is ΣNPR=f/f1+f/f3+f/f6=−0.9999, wherein ΣPPR/|ΣNPR|=1.7386. The following conditions are also met: |f/f2|=0.1774, —|f/f3|=0.0443, |f/f4|=0.4411, |f/f5|=0.6012, |f/f6|=0.6595, and |f/f7|=0.5187.

In the optical image capturing system of the present embodiment, a distance from the object-side surface 112 of the first lens to the image-side surface 174 of the seventh lens is denoted as InTL. A distance from the object-side surface 112 of the first lens to the image plane 190 is denoted as HOS. A distance from the aperture 100 to the image plane 190 is denoted as InS. Half of a diagonal length of an effective sensing field of the image sensing device 192 is denoted as HOI. A distance from the image-side surface 174 of the seventh lens to the image plane 190 is denoted as BFL. The following conditions are met: InTL+BFL=HOS, HOS=26.9789 mm, HOI=7.5 mm, HOS/HOI=3.5977, HOS/f=6.2715, InS=12.4615 mm, and InS/HOS=0.4619.

In the optical image capturing system of the present embodiment, the sum of central thicknesses of all lenses with refractive power on the optical axis is denoted as ΣTP. The following conditions are met: ΣTP=16.0446 mm, and ΣTP/InTL=0.6559. In this manner, a suitable contrast ratio for image formation in the optical image capturing system and a suitable yield rate of manufacturing the lenses may be simultaneously achieved, and an appropriate back focal length may be provided so as to accommodate other optical elements in the optical image capturing system.

In the optical image capturing system of the present embodiment, the curvature radius of the object-side surface 112 of the first lens is denoted as R1. The curvature radius of the image-side surface 114 of the first lens is denoted as R2. The following condition is met: |R1/R2|=129.9952.

In the optical image capturing system of the present embodiment, the curvature radius of the object-side surface 172 of the seventh lens is denoted as R13. The curvature radius of the image-side surface 174 of the seventh lens is denoted as R14. The following condition is satisfied: (R13−R14)/(R13+R14)=−0.0806. Hence, the astigmatism generated by the optical image capturing system may be easier to correct.

In the optical image capturing system of the present embodiment, the sum of the focal lengths of all lenses with positive refractive power is denoted as ΣPP, which meets the following conditions: ΣPP=f2+f4+f5+f7=49.4535 mm and f4/(f2+f4+f5+f7)=0.1972. Therefore, the positive refractive power of the fourth lens 140 may be distributed to other lenses with positive refractive power appropriately, so as to suppress noticeable aberrations generated in the process of the incident light travelling inwardly into the optical image capturing system.

In the optical image capturing system of the present embodiment, the sum of the focal lengths of all lenses with negative refractive power is denoted as ΣNP, which meets the following conditions: ΣNP=f1+f3+f6=−118.1178 mm, and f1/(f1+f3+f6)=0.1677. Therefore, the negative refractive power of the first lens 110 may be distributed to other lenses with negative refractive power appropriately, so as to suppress noticeable aberrations generated in the process of the incident light travelling inwardly into the optical image capturing system.

In the optical image capturing system of the present embodiment, the distance between the first lens 110 and the second lens 120 on the optical axis is denoted as IN12. The following conditions are satisfied: IN12=4.5524 mm, and IN12/f=1.0582. Hence, the chromatic aberration of the lenses may be mitigated, so as to improve the performance thereof.

In the optical image capturing system of the present embodiment, central thicknesses of the first lens 110 and the second lens 120 on the optical axis are denoted as TP1 and TP2 respectively. The following conditions are satisfied: TP1=2.2761 mm, TP2=0.2398 mm, and (TP1+IN12)/TP2=1.3032. Hence, the sensitivity formed via the optical image capturing system may be easier to control, and the performance thereof may be improved.

In the optical image capturing system of the present embodiment, central thicknesses of the sixth lens 160 and the seventh lens 170 on the optical axis are denoted as TP6 and TP7, respectively. The distance between the aforementioned two lenses on the optical axis is denoted as IN67. The following conditions are satisfied: TP6=0.3000 mm; TP7=1.1182 mm; and (TP7+IN67)/TP6=4.4322. Hence, the sensitivity formed via the optical image capturing system may be easier to control, and the total height of the optical image capturing system may be reduced.

In the optical image capturing system of the present embodiment, central thicknesses of the third lens 130, the fourth lens 140, and the fifth lens 150 on the optical axis are denoted as TP3, TP4 and TP5, respectively. The distance between the third lens 130 and the fourth lens 140 on the optical axis is denoted as IN34. The distance between the fourth lens 140 and the fifth lens 150 on the optical axis is denoted as IN45. The distance from the object-side surface 112 of the first lens to the image-side surface 174 of the seventh lens is denoted as InTL. The following conditions are satisfied: TP3=0.8369 mm, TP4=2.0022 mm, TP5=4.2706 mm, IN34=1.9268 mm, IN45=1.5153 mm, and TP4/(IN34+TP4+IN45)=0.3678. Hence, the aberration generated in a process of the incident light travelling inwardly into the optical image capturing system may be easier to gradually correct layer upon layer, and the total height of the optical image capturing system may be reduced.

In the optical image capturing system of the present embodiment, a horizontal shift distance in parallel with the optical axis from a maximum effective half diameter position to an intersection point of the optical axis and the object-side surface 162 of the sixth lens is denoted as InRS61. A horizontal shift distance in parallel with the optical axis from a maximum effective half diameter position to an intersection point of the optical axis and the image-side surface 164 of the sixth lens is denoted as InRS62. The central thickness of the sixth lens 160 is denoted as TP6. The following conditions are satisfied:

InRS61=−0.7823 mm, InRS62=−0.2166 mm, and |InRS62|/TP6=0.722. Hence, the configuration is beneficial for manufacturing and forming the lenses, and for effectively reducing a size of the optical image capturing system.

In the optical image capturing system of the present embodiment, a perpendicular distance to the optical axis between a critical point C61 on the object-side surface 162 of the sixth lens and the optical axis is denoted as HVT61. A perpendicular distance to the optical axis between a critical point C62 on the image-side surface 164 of the sixth lens and the optical axis is denoted as HVT62. The following conditions are satisfied: HVT61=3.3498 mm, HVT62=3.9860 mm, and HVT61/HVT62=0.8404.

In the optical image capturing system of the present embodiment, a horizontal shift distance in parallel with the optical axis from a maximum effective half diameter position to an intersection point of the optical axis and the object-side surface 172 of the seventh lens is denoted as InRS71. A horizontal shift distance in parallel with the optical axis from a maximum effective half diameter position to an intersection point of the optical axis and the image-side surface 174 of the seventh lens is denoted as InRS72. The central thickness of the seventh lens 170 is denoted as TP7. The following conditions are satisfied: InRS71=−0.2756 mm, InRS72=−0.0938 mm, and |InRS72|/TP7=0.0839. Hence, the configuration is beneficial for manufacturing and forming the lenses, and for effectively reducing a size of the optical image capturing system.

In the optical image capturing system of the present embodiment, the perpendicular distance to the optical axis between the critical point C71 on the object-side surface 172 of the seventh lens and the optical axis is denoted as HVT71. The perpendicular distance to the optical axis between the critical point C72 on the image-side surface 174 of the seventh lens and the optical axis is denoted as HVT72. The following conditions are satisfied: HVT71=3.6822 mm, HVT72=4.0606 mm, and HVT71/HVT72=0.9068. Hence, the off-axis FOV aberration may be effectively corrected.

In the optical image capturing system of the present embodiment, the following condition is satisfied: HVT72/HOI=0.5414. Hence, the aberration of the peripheral field of view of the optical image capturing system may be corrected.

In the optical image capturing system of the present embodiment, the following condition is satisfied: HVT72/HOS=0.1505. Hence, the aberration of the peripheral field of view of the optical image capturing system may be corrected.

In the optical image capturing system of the present embodiment, an Abbe number of the second lens is denoted as NA2, an Abbe number of the third lens is denoted as NA3, an Abbe number of the seventh lens is denoted as NA7, and the following condition is satisfied: 1≤NA7/NA2. Hence, the chromatic aberration of the optical image capturing system may be easier to correct.

In the optical image capturing system of the present embodiment, the TV distortion and optical distortion when images are formed in the optical image capturing system are TDT and ODT, respectively. The following conditions are satisfied: |TDT|=2.5678% and |ODT|=2.1302%.

In the optical image capturing system of the present embodiment, the transverse aberration of the shortest visible operation wavelength of a positive direction tangential fan passing through the edge of the aperture and incident at the position of 0.7 field of view on the image plane is denoted as PSTA, which is 0.00040 mm. The transverse aberration of the longest visible operation wavelength of a positive direction tangential fan passing through the edge of the aperture and incident at the position of 0.7 field of view on the image plane is denoted as PLTA, which is −0.009 mm. The transverse aberration of the shortest visible operation wavelength of the negative direction tangential fan passing through the edge of the aperture and incident at the position of 0.7 field of view on the image plane is denoted as NSTA, which is −0.002 mm. The transverse aberration of the longest operation wavelength of the negative direction tangential fan passing through the edge of the aperture and incident at the position of 0.7 field of view on the image plane is denoted as NLTA, which is −0.016 mm. The transverse aberration of the shortest visible operation wavelength of the sagittal fan passing through the edge of the aperture and incident at the position of 0.7 field of view on the image plane is denoted as SSTA, which is 0.018 mm. The transverse aberration of the longest visible operation wavelength of the sagittal fan passing through the edge of the aperture and incident at the position of 0.7 field of view on the image plane is denoted as SLTA, which is 0.016 mm.

TABLE 1

Table 1 and Table 2 below should be incorporated into the reference of the present embodiment.
Lens parameters of the first embodiment
f(focal length) = 4.3019 mm, f/HEP = 1.2, HAF(half angle of view) = 59.9968 deg

| Surface No. | | Curvature Radius | Thickness (mm) | Material | Refractive Index | Abbe No. | Focal Distance |
|---|---|---|---|---|---|---|---|
| 0 | Object | Plane | At infinity | | | | |
| 1 | Lens 1 | −1079.499964 | 2.276 | Plastic | 1.565 | 58.00 | −14.53 |
| 2 | | 8.304149657 | 4.552 | | | | |
| 3 | Lens 2 | 14.39130913 | 5.240 | Plastic | 1.650 | 21.40 | 24.25 |
| 4 | | 130.0869482 | 0.162 | | | | |
| 5 | Lens 3 | 8.167310118 | 0.837 | Plastic | 1.650 | 21.40 | −97.07 |
| 6 | | 6.944477468 | 1.450 | | | | |
| 7 | Aperture | Plane | 0.477 | | | | |
| 8 | Lens 4 | 121.5965254 | 2.002 | Plastic | 1.565 | 58.00 | 9.75 |
| 9 | | −5.755749302 | 1.515 | | | | |
| 10 | Lens 5 | −86.27705938 | 4.271 | Plastic | 1.565 | 58.00 | 7.16 |
| 11 | | −3.942936258 | 0.050 | | | | |
| 12 | Lens 6 | 4.867364751 | 0.300 | Plastic | 1.650 | 21.40 | −6.52 |
| 13 | | 2.220604983 | 0.211 | | | | |
| 14 | Lens 7 | 1.892510651 | 1.118 | Plastic | 1.650 | 21.40 | 8.29 |
| 15 | | 2.224128115 | 1.400 | | | | |
| 16 | Infrared filter | Plane | 0.200 | BK_7 | 1.517 | 64.2 | |

TABLE 1-continued

Table 1 and Table 2 below should be incorporated into the reference of the present embodiment.
Lens parameters of the first embodiment
f(focal length) = 4.3019 mm, f/HEP = 1.2, HAF(half angle of view) = 59.9968 deg

| Surface No. | Curvature Radius | Thickness (mm) | Material | Refractive Index | Abbe No. | Focal Distance |
|---|---|---|---|---|---|---|
| 17 | | Plane | 0.917 | | | |
| 18 | Image plane | Plane | | | | |

Reference wavelength (d-line) = 555 nm

TABLE 2 aspheric coefficients of the first embodiment
Table 2: aspheric coefficients

| Surface No. | 1 | 2 | 3 | 4 | 5 | 6 | 8 |
|---|---|---|---|---|---|---|---|
| k | 2.500000E+01 | −4.711931E−01 | 1.531617E+00 | −1.153034E+01 | −2.915013E+00 | 4.886991E+00 | −3.459463E+01 |
| A4 | 5.236918E−06 | −2.117558E−04 | 7.146736E−05 | 4.353586E−04 | 5.793768E−04 | −3.756697E−04 | −1.292614E−03 |
| A6 | −3.014384E−08 | −1.838670E−06 | 2.334364E−06 | 1.400287E−05 | 2.112652E−04 | 3.901218E−04 | −1.602381E−05 |
| A8 | −2.487400E−10 | 9.605910E−09 | −7.479362E−08 | −1.688929E−07 | −1.344586E−05 | −4.925422E−05 | −8.452359E−06 |
| A10 | 1.170000E−12 | −8.256000E−11 | 1.701570E−09 | 3.829807E−08 | 1.000482E−06 | 4.139741E−06 | 7.243999E−07 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 | 14 | 15 |
|---|---|---|---|---|---|---|---|
| k | −7.549291E+00 | −5.000000E+01 | −1.740728E+00 | −4.709650E+00 | −4.509781E+00 | −3.427137E+00 | −3.215123E+00 |
| A4 | −5.583548E−03 | 1.240671E−04 | 6.467538E−04 | −1.872317E−03 | −8.967310E−04 | −3.189453E−03 | −2.815022E−03 |
| A6 | 1.947110E−04 | −4.949077E−05 | −4.981838E−05 | −1.523141E−05 | −2.688331E−05 | −1.058126E−05 | 1.884580E−05 |
| A8 | −1.486947E−05 | 2.088854E−06 | 9.129031E−07 | −2.169414E−06 | −8.324958E−07 | 1.760103E−06 | −1.017223E−08 |
| A10 | −6.501246E−08 | −1.438383E−08 | 7.108550E−09 | −2.308304E−08 | −6.184250E−09 | −4.730294E−08 | 3.660000E−12 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

The values pertaining to the outline curve lengths may be obtained according to data in TABLE 1 and TABLE 2

First embodiment (primary reference wavelength used = 555 nm)

| ARE | 1/2(HEP) | ARE value | ARE−1/2(HEP) | 2(ARE/HEP) % | TP | ARE/TP (%) |
|---|---|---|---|---|---|---|
| 11 | 1.792 | 1.792 | −0.00044 | 99.98% | 2.276 | 78.73% |
| 12 | 1.792 | 1.806 | 0.01319 | 100.74% | 2.276 | 79.33% |
| 21 | 1.792 | 1.797 | 0.00437 | 100.24% | 5.240 | 34.29% |
| 22 | 1.792 | 1.792 | −0.00032 | 99.98% | 5.240 | 34.20% |
| 31 | 1.792 | 1.808 | 0.01525 | 100.85% | 0.837 | 216.01% |
| 32 | 1.792 | 1.819 | 0.02705 | 101.51% | 0.837 | 217.42% |
| 41 | 1.792 | 1.792 | −0.00041 | 99.98% | 2.002 | 89.50% |
| 42 | 1.792 | 1.825 | 0.03287 | 101.83% | 2.002 | 91.16% |
| 51 | 1.792 | 1.792 | −0.00031 | 99.98% | 4.271 | 41.96% |
| 52 | 1.792 | 1.845 | 0.05305 | 102.96% | 4.271 | 43.21% |
| 61 | 1.792 | 1.818 | 0.02587 | 101.44% | 0.300 | 606.10% |
| 62 | 1.792 | 1.874 | 0.08157 | 104.55% | 0.300 | 624.67% |
| 71 | 1.792 | 1.898 | 0.10523 | 105.87% | 1.118 | 169.71% |
| 72 | 1.792 | 1.885 | 0.09273 | 105.17% | 1.118 | 168.59% |

| ARS | EHD | ARS value | ARS−EHD | (ARS/EHD) % | TP | ARS/TP (%) |
|---|---|---|---|---|---|---|
| 11 | 15.095 | 15.096 | 0.001 | 100.01% | 2.276 | 663.24% |
| 12 | 10.315 | 11.377 | 1.062 | 110.29% | 2.276 | 499.86% |
| 21 | 7.531 | 8.696 | 1.166 | 115.48% | 5.240 | 165.96% |
| 22 | 4.759 | 4.881 | 0.122 | 102.56% | 5.240 | 93.15% |
| 31 | 3.632 | 4.013 | 0.382 | 110.51% | 0.837 | 479.55% |
| 32 | 2.815 | 3.159 | 0.344 | 112.23% | 0.837 | 377.47% |
| 41 | 2.967 | 2.971 | 0.004 | 100.13% | 2.002 | 148.38% |
| 42 | 3.402 | 3.828 | 0.426 | 112.53% | 2.002 | 191.20% |

TABLE 1 and TABLE 2-continued

| First embodiment (primary reference wavelength used = 555 nm) | | | | | |
|---|---|---|---|---|---|
| 51 | 4.519 | 4.523 | 0.004 | 100.10% | 4.271 | 105.91% |
| 52 | 5.016 | 5.722 | 0.706 | 114.08% | 4.271 | 133.99% |
| 61 | 5.019 | 5.823 | 0.805 | 116.04% | 0.300 | 1941.14% |
| 62 | 5.629 | 6.605 | 0.976 | 117.34% | 0.300 | 2201.71% |
| 71 | 5.634 | 6.503 | 0.869 | 115.43% | 1.118 | 581.54% |
| 72 | 6.488 | 7.152 | 0.664 | 110.24% | 1.118 | 639.59% |

Table 1 is the detailed structural data for the first embodiment in FIG. 1, wherein the unit of the curvature radius, the central thickness, the distance and the focal length is millimeters (mm), and surfaces 0-18 illustrate the surfaces in order from the object side to the image plane of the optical image capturing system. Table 2 shows the aspheric coefficients of the first embodiment, wherein k is the conic coefficient in the aspheric surface curve equation, and A1-A20 are the first to the twentieth order aspheric surface coefficients respectively. In addition, the tables of following embodiments exactly correspond to their respective schematic views and the diagrams of aberration curves, and the definitions of parameters therein are identical to those in the Table 1 and the Table 2 of the first embodiment, so that the repetitive details are not stated here.

Second Embodiment

Figure 2A:
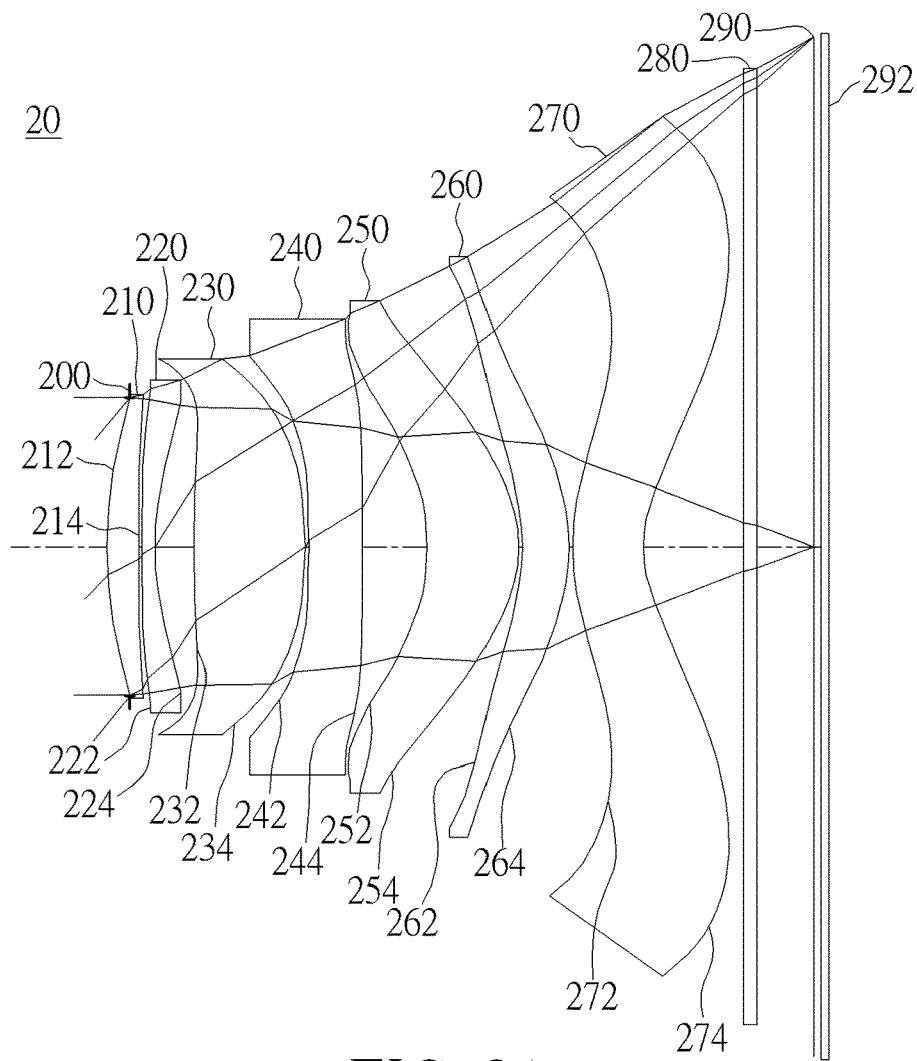
FIG. 2A is a schematic view of the optical image capturing system according to a second embodiment of the present disclosure.
Figure 2B:
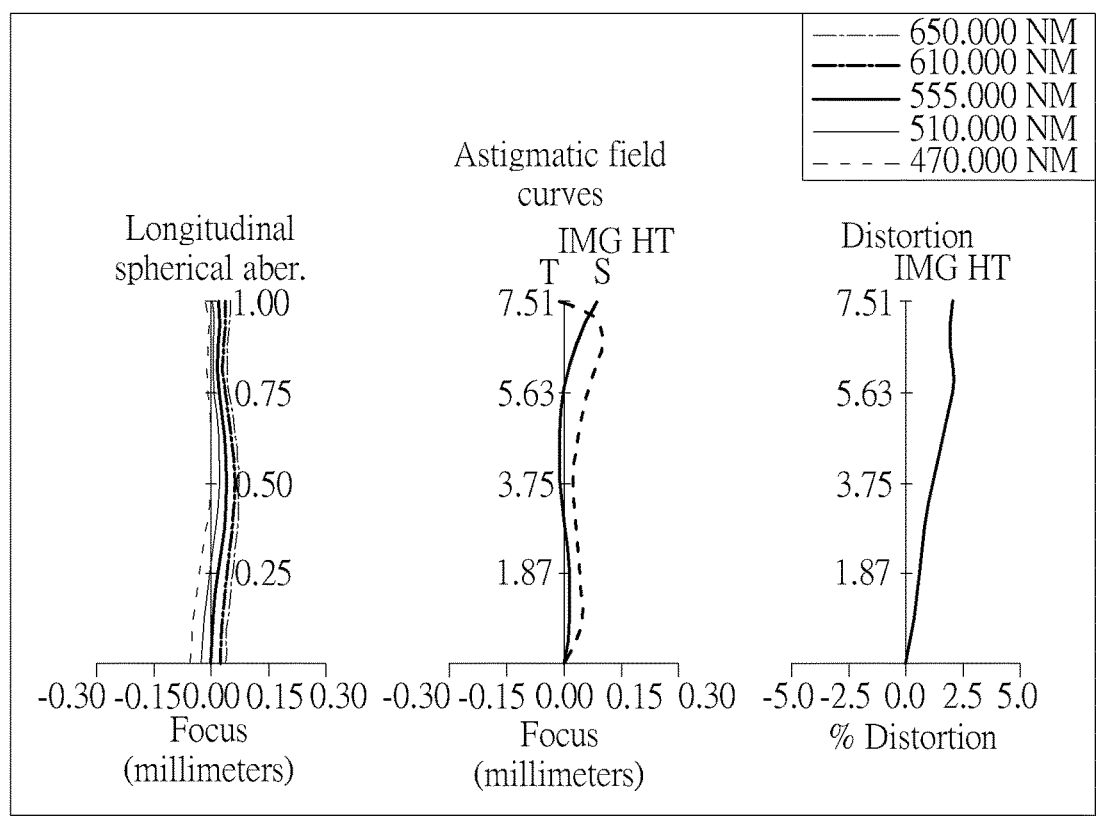
FIG. 2B is a curve diagram illustrating the spherical aberration, astigmatism and optical distortion of the optical image capturing system in sequence from left to right according to the second embodiment of the present disclosure.
Figure 2C:
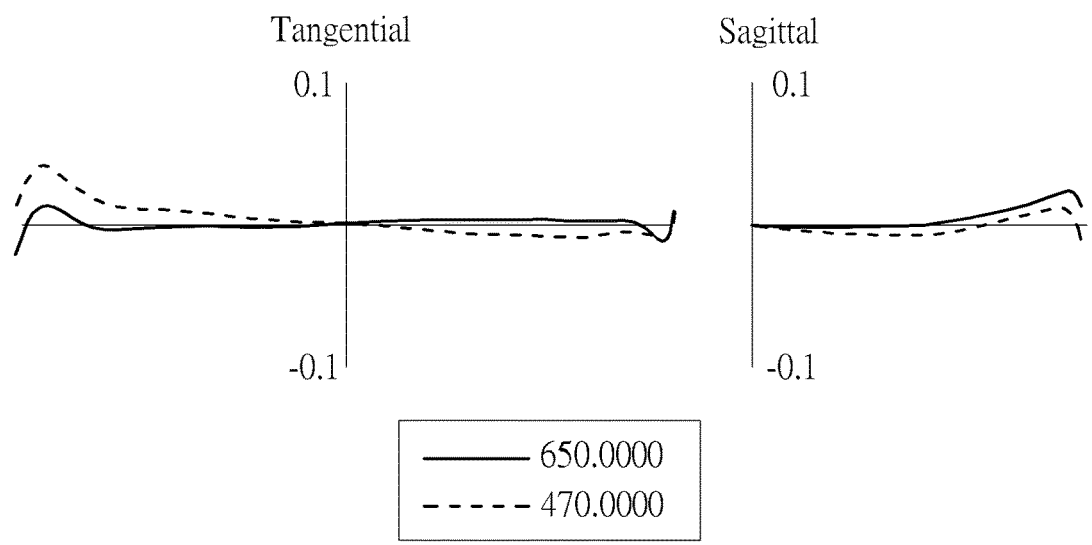
FIG. 2C is a transverse aberration diagram of the longest operation wavelength and the shortest operation wavelength for the tangential fan and the sagittal fan, of which the longest operation wavelength and the shortest operation wavelength pass through the edge of aperture at the position of 0.7 field of view on the image plane, according to the second embodiment of the present disclosure.

Please refer to FIGS. 2A and 2B, wherein FIG. 2A is a schematic view of the optical image capturing system according to the second embodiment of the present disclosure. FIG. 2B is a curve diagram illustrating the spherical aberration, astigmatism and optical distortion of the optical image capturing system in sequence from left to right according to the second embodiment of the present disclosure. FIG. 2C is a transverse aberration diagram at the position of 0.7 field of view on the image plane according to the second embodiment of the present disclosure. As shown in FIG. 2A, in the order from an object side to an image side, the optical image capturing system includes an aperture 200, a first lens 210, a second lens 220, a third lens 230, a fourth lens 240, a fifth lens 250, a sixth lens 260, a seventh lens 270, an infrared filter 280, an image plane 290, and an image sensing device 292.

The first lens 210 has positive refractive power and is made of plastic material. The first lens 210 has a convex object-side surface 212 and a concave image-side surface 214, wherein both surfaces are aspheric. The object-side surface 212 and the image-side surface 214 each have one inflection point.

The second lens 220 has negative refractive power and is made of plastic material. The second lens 220 has a convex object-side surface 222 and a concave image-side surface 224, wherein both surfaces are aspheric. The object-side surface 222 and the image-side surface 224 each have one inflection point.

The third lens 230 has positive refractive power and is made of plastic material. The third lens 230 has a convex object-side surface 232 and a concave image-side surface 234, wherein both surfaces are aspheric. The object-side surface 232 has one inflection point.

The fourth lens 240 has negative refractive power and is made of plastic material. The fourth lens 240 has a concave object-side surface 242 and a convex image-side surface 244, wherein both surfaces are aspheric. The object-side surface 242 has one inflection point and the image-side surface 244 has two inflection points.

The fifth lens 250 has positive refractive power and is made of plastic material. The fifth lens 250 has a convex object-side surface 252 and a concave image-side surface 254, wherein both surfaces are aspheric. The object-side surface 252 and the image-side surface 254 each have one inflection point.

The sixth lens 260 has positive refractive power and is made of plastic material. The sixth lens 260 has a concave object-side surface 262 and a convex image-side surface 264, wherein both surfaces are aspheric. The object-side surface 262 and the image-side surface 264 each have two inflection points. Hence, the optical image capturing system is capable of effectively adjusting an incident angle of rays into the sixth lens 260 from each field of view, thereby correcting aberration.

The seventh lens 270 has negative refractive power and is made of plastic material. The seventh lens 270 has a convex object-side surface 272 and a concave image-side surface 274. In this manner, the back focal length may be reduced to maintain a miniaturized optical image capturing system. Additionally, the object-side surface 272 and the image-side surface 274 each have one inflection point. In this manner, the optical image capturing system is capable of effectively reducing an incident angle of the off-axis FOV rays, thereby further correcting an off-axis FOV aberration.

The infrared filter 280 is made of glass material and is configured between the seventh lens 270 and the image plane 290. The infrared filter 280 does not affect the focal length of the optical image capturing system.

TABLE 3

TABLE 3 and TABLE 4 below should be incorporated into the reference of the present embodiment.
Lens parameters of the second embodiment
f(focal length) = 6.1538 mm, f/HEP = 1.4, HAF(half angle of view) = 49.9999 deg

| Surface No. | | Curvature Radius | Thickness (mm) | Material | Refractive Index | Abbe No. | Focal Distance |
|---|---|---|---|---|---|---|---|
| 0 | Object | 1E+18 | 1E+18 | | | | |
| 1 | Aperture | 1E+18 | −0.334 | | | | |
| 2 | Lens 1 | 6.450400783 | 0.470 | Glass | 2.001 | 29.13 | 5.828 |
| 3 | | −62.83852368 | 0.050 | | | | |
| 4 | Lens 2 | −300.1979324 | 0.200 | Plastic | 1.583 | 30.20 | −7.661 |

TABLE 3-continued

TABLE 3 and TABLE 4 below should be incorporated into the reference of the present embodiment.
Lens parameters of the second embodiment
f(focal length) = 6.1538 mm, f/HEP = 1.4, HAF(half angle of view) = 49.9999 deg

| Surface No. | | Curvature Radius | Thickness (mm) | Material | Refractive Index | Abbe No. | Focal Distance |
|---|---|---|---|---|---|---|---|
| 5 | | 4.562688048 | 0.583 | | | | |
| 6 | Lens 3 | 21.7287835 | 1.636 | Plastic | 1.565 | 58.00 | 8.385 |
| 7 | | −5.917507151 | 0.050 | | | | |
| 8 | Lens 4 | −19.78096616 | 0.799 | Plastic | 1.661 | 20.40 | −27.518 |
| 9 | | 257.5088701 | 0.967 | | | | |
| 10 | Lens 5 | −2.918494618 | 1.351 | Plastic | 1.565 | 58.00 | 6.051 |
| 11 | | −1.84078898 | 0.050 | | | | |
| 12 | Lens 6 | −3.046498613 | 0.694 | Plastic | 1.565 | 54.50 | 104.296 |
| 13 | | −3.136061902 | 0.050 | | | | |
| 14 | Lens 7 | 3.413448149 | 1.055 | Plastic | 1.661 | 20.40 | −8.981 |
| 15 | | 1.905237308 | 1.400 | | | | |
| 16 | Infrared filter | 1E+18 | 0.200 | BK_7 | 1.517 | 64.2 | |
| 17 | | 1E+18 | 0.916 | | | | |
| 18 | Image plane | 1E+18 | 0.028 | | | | |

Reference wavelength (d-line) = 555 nm

TABLE 4 aspheric coefficients of the second embodiment
Table 4: aspheric coefficients

| Surface No. | 2 | 3 | 4 | 5 | 6 | 7 | 8 |
|---|---|---|---|---|---|---|---|
| k | 8.592067E−03 | −5.000000E+01 | −5.000000E+01 | −2.621055E+00 | −4.102250E−01 | 5.682361E−01 | 1.656907E+01 |
| A4 | −1.804998E−03 | 1.315829E−02 | 1.725199E−02 | −5.775971E−03 | −1.572264E−03 | −8.810532E−03 | −1.084299E−02 |
| A6 | 7.720162E−04 | −3.415541E−03 | −6.925912E−03 | 4.727184E−06 | −3.560335E−04 | 5.998256E−04 | −3.954749E−05 |
| A8 | −2.726380E−04 | 3.881414E−04 | 1.319779E−03 | 1.256034E−04 | −1.989598E−05 | −8.776895E−05 | −6.774485E−05 |
| A10 | 1.950868E−05 | −1.361557E−05 | −8.588894E−05 | −2.250497E−05 | −1.431487E−05 | 1.224441E−06 | 1.028965E−05 |
| A12 | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 | 14 | 15 |
|---|---|---|---|---|---|---|---|
| k | −5.000000E+01 | −3.037213E+00 | −3.071622E+00 | −6.686955E+00 | −2.126259E+00 | −5.568998E+00 | −3.771665E+00 |
| A4 | −1.958976E−03 | −8.201802E−03 | −5.682403E−03 | 3.702756E−03 | 4.953290E−04 | −3.260494E−03 | −3.329339E−03 |
| A6 | −6.728220E−04 | 4.852005E−04 | 2.310304E−04 | −1.138177E−04 | 1.796575E−04 | −6.174505E−05 | 9.267181E−05 |
| A8 | 6.518929E−05 | 7.751649E−05 | 1.594305E−06 | −8.651840E−06 | −3.947078E−06 | 6.604382E−06 | −1.601549E−06 |
| A10 | −6.324080E−07 | −4.188113E−06 | 3.553474E−07 | 3.045670E−07 | −9.559590E−08 | −1.448456E−07 | 6.192544E−09 |
| A12 | 0.000000E+00 | 0.000000E+00 | 0.000000E+00 | 0.000000E+00 | 0.000000E+00 | 0.000000E+00 | 0.000000E+00 |

In the second embodiment, the form of the aspheric surface equation therein is presented as that in the first embodiment. In addition, the definition of parameters in the following tables is equivalent to that in the first embodiment, so that the repetitive details are not stated here.

The following conditional values may be obtained according to the data in Table 3 and Table 4.

| Second embodiment (primary reference wavelength = 555 nm) | | | | | |
|---|---|---|---|---|---|
| |f/f1| | |f/f2| | |f/f3| | |f/f4| | |f/f5| | |f/f6| |
| 1.0559 | 0.8032 | 0.7339 | 0.2236 | 1.0169 | 0.0590 |
| |f/f7| | ΣPPR | ΣNPR | ΣPPR/|ΣNPR| | IN12/f | IN67/f |
| 0.6852 | 2.0724 | 2.5054 | 0.8272 | 0.0081 | 0.0081 |
| |f1/f2| | |f2/f3| | (TP1 + IN12)/TP2 | | (TP7 + IN67)/TP6 | |
| 0.7607 | 0.9137 | 2.5995 | | 1.5923 | |
| HOS | InTL | HOS/HOI | InS/HOS | ODT % | TDT % |
| 10.5000 | 7.9553 | 1.4000 | 0.9682 | 2.0367 | 0.5336 |
| HVT11 | HVT12 | HVT21 | HVT22 | HVT31 | HVT32 |
| 0.0000 | 0.5881 | 0.2230 | 2.3878 | 1.6686 | 0.0000 |
| HVT61 | HVT62 | HVT71 | HVT72 | HVT72/HOI | HVT72/HOS |
| 0.0000 | 0.0000 | 3.1920 | 4.3765 | 0.5835 | 0.4168 |
| PSTA | PLTA | NSTA | NLTA | SSTA | SLTA |
| 0.009 mm | 0.010 mm | 0.013 mm | −0.020 mm | −0.009 mm | 0.014 mm |

The values pertaining to the outline curve lengths may be obtained according to data in Table 3 and Table 4:

| Second embodiment (primary reference wavelength = 555 nm) | | | | | | |
|---|---|---|---|---|---|---|
| ARE | 1/2(HEP) | ARE value | ARE-1/2(HEP) | 2(ARE/HEP) % | TP | ARE/TP (%) |
| 11 | 2.198 | 2.229 | 0.03078 | 101.40% | 0.470 | 474.26% |
| 12 | 2.198 | 2.199 | 0.00074 | 100.03% | 0.470 | 467.87% |
| 21 | 2.198 | 2.202 | 0.00414 | 100.19% | 0.200 | 1100.96% |
| 22 | 2.198 | 2.232 | 0.03408 | 101.55% | 0.200 | 1115.93% |
| 31 | 2.198 | 2.202 | 0.00429 | 100.20% | 1.636 | 134.57% |
| 32 | 2.198 | 2.323 | 0.12514 | 105.69% | 1.636 | 141.96% |
| 41 | 2.198 | 2.262 | 0.06471 | 102.94% | 0.799 | 283.23% |
| 42 | 2.198 | 2.201 | 0.00295 | 100.13% | 0.799 | 275.50% |
| 51 | 2.198 | 2.364 | 0.16576 | 107.54% | 1.351 | 174.96% |
| 52 | 2.198 | 2.446 | 0.24854 | 111.31% | 1.351 | 181.09% |
| 61 | 2.198 | 2.251 | 0.05356 | 102.44% | 0.694 | 324.31% |
| 62 | 2.198 | 2.315 | 0.11711 | 105.33% | 0.694 | 333.47% |
| 71 | 2.198 | 2.248 | 0.05038 | 102.29% | 1.055 | 213.02% |
| 72 | 2.198 | 2.332 | 0.13389 | 106.09% | 1.055 | 220.93% |
| ARS | EHD | ARS value | ARS-EHD | (ARS/EHD)% | TP | ARS/TP (%) |
| 11 | 2.198 | 2.229 | 0.03077 | 101.40% | 0.470 | 474.26% |
| 12 | 2.248 | 2.250 | 0.00136 | 100.06% | 0.470 | 478.76% |
| 21 | 2.337 | 2.344 | 0.00701 | 100.30% | 0.200 | 1171.81% |
| 22 | 2.464 | 2.500 | 0.03566 | 101.45% | 0.200 | 1249.90% |
| 31 | 2.485 | 2.525 | 0.04062 | 101.63% | 1.636 | 154.33% |
| 32 | 2.779 | 3.188 | 0.40867 | 114.70% | 1.636 | 194.82% |
| 41 | 2.842 | 3.075 | 0.23340 | 108.21% | 0.799 | 385.01% |
| 42 | 3.396 | 3.419 | 0.02241 | 100.66% | 0.799 | 427.98% |
| 51 | 3.466 | 3.726 | 0.26091 | 107.53% | 1.351 | 275.85% |
| 52 | 3.670 | 4.283 | 0.61287 | 116.70% | 1.351 | 317.01% |
| 61 | 4.223 | 4.387 | 0.16377 | 103.88% | 0.694 | 631.92% |
| 62 | 4.376 | 4.666 | 0.28942 | 106.61% | 0.694 | 672.09% |
| 71 | 5.169 | 5.508 | 0.33912 | 106.56% | 1.055 | 521.93% |
| 72 | 6.463 | 7.089 | 0.62587 | 109.68% | 1.055 | 671.70% |

The following values may be obtained according to the data in Table 3 and Table 4.

| Values related to inflection point of second embodiment (primary reference wavelength = 555 nm) | | | | | | | | |
|---|---|---|---|---|---|---|---|---|
| HIF111 | 1.8562 | HIF111/HOI | 0.2475 | SGI111 | 0.2541 | \|SGI111\|/(\|SGI111\| + TP1) | 0.3510 |
| HIF121 | 0.3285 | HIF121/HOI | 0.0438 | SGI121 | −0.0007 | \|SGI121\|/(\|SGI121\| + TP1) | 0.0015 |
| HIF211 | 0.1278 | HIF211/HOI | 0.0170 | SGI211 | −0.0000 | \|SGI211\|/(\|SGI211\| + TP2) | 0.0001 |
| HIF221 | 1.6734 | HIF221/HOI | 0.2231 | SGI221 | 0.2504 | \|SGI221\|/(\|SGI221\| + TP2) | 0.5559 |
| HIF311 | 1.1220 | HIF311/HOI | 0.1496 | SGI311 | 0.0257 | \|SGI311\|/(\|SGI311\| + TP3) | 0.0155 |
| HIF411 | 2.6880 | HIF411/HOI | 0.3584 | SGI411 | −0.7635 | \|SGI411\|/(\|SGI411\| + TP4) | 0.4887 |
| HIF421 | 0.3835 | HIF421/HOI | 0.0511 | SGI421 | 0.0002 | \|SGI421\|/(\|SGI421\| + TP4) | 0.0003 |
| HIF422 | 2.6856 | HIF422/HOI | 0.3581 | SGI422 | −0.1763 | \|SGI422\|/(\|SGI422\| + TP4) | 0.1808 |
| HIF511 | 2.1492 | HIF511/HOI | 0.2866 | SGI511 | −0.7465 | \|SGI511\|/(\|SGI511\| + TP5) | 0.3559 |
| HIF521 | 2.7761 | HIF521/HOI | 0.3702 | SGI521 | −1.4515 | \|SGI521\|/(\|SGI521\| + TP5) | 0.5180 |
| HIF611 | 1.5701 | HIF611/HOI | 0.2093 | SGI611 | −0.2926 | \|SGI611\|/(\|SGI611\| + TP6) | 0.2965 |
| HIF612 | 2.7324 | HIF612/HOI | 0.3643 | SGI612 | −0.5899 | \|SGI612\|/(\|SGI612\| + TP6) | 0.4594 |
| HIF621 | 2.3536 | HIF621/HOI | 0.3138 | SGI621 | −0.7337 | \|SGI621\|/(\|SGI621\| + TP6) | 0.5138 |
| HIF622 | 3.9351 | HIF622/HOI | 0.5247 | SGI622 | −1.3788 | \|SGI622\|/(\|SGI622\| + TP6) | 0.6651 |
| HIF711 | 1.5856 | HIF711/HOI | 0.2114 | SGI711 | 0.2844 | \|SGI711\|/(\|SGI711\| + TP7) | 0.2123 |
| H1F721 | 1.6853 | HIF721/HOI | 0.2247 | SGI721 | 0.5114 | \|SGI721\|/(\|SGI721\| + TP7) | 0.3264 |

Third Embodiment

Figure 3A:
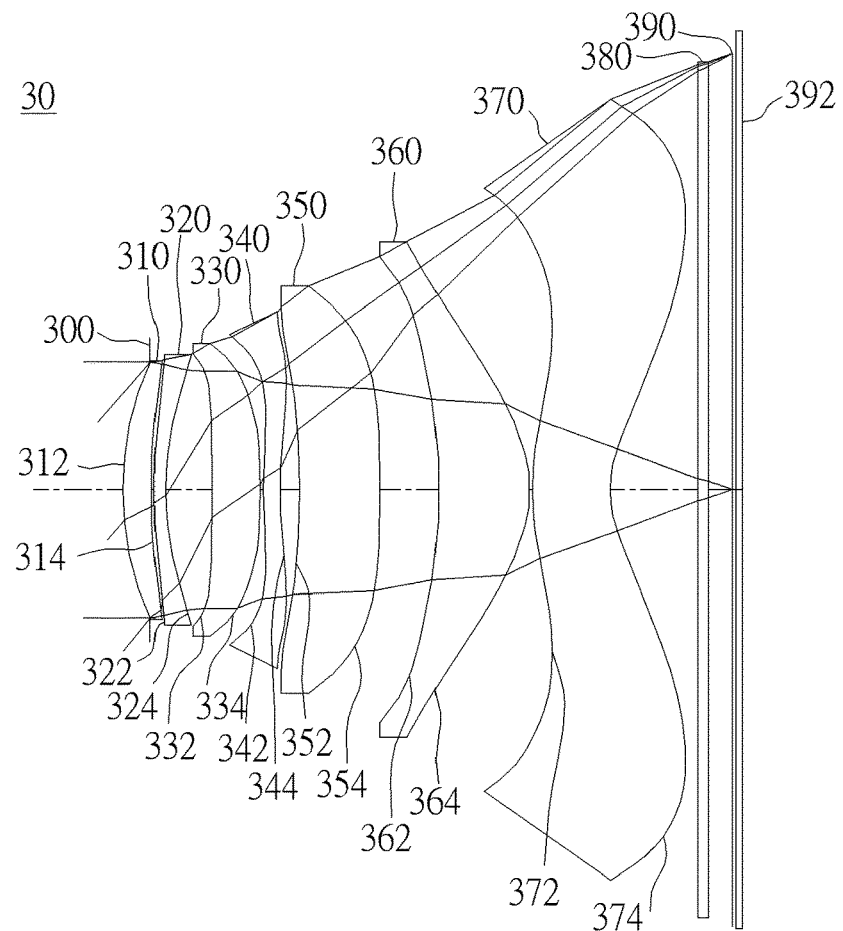
FIG. 3A is a schematic view of the optical image capturing system according to a third embodiment of the present disclosure.
Figure 3B:
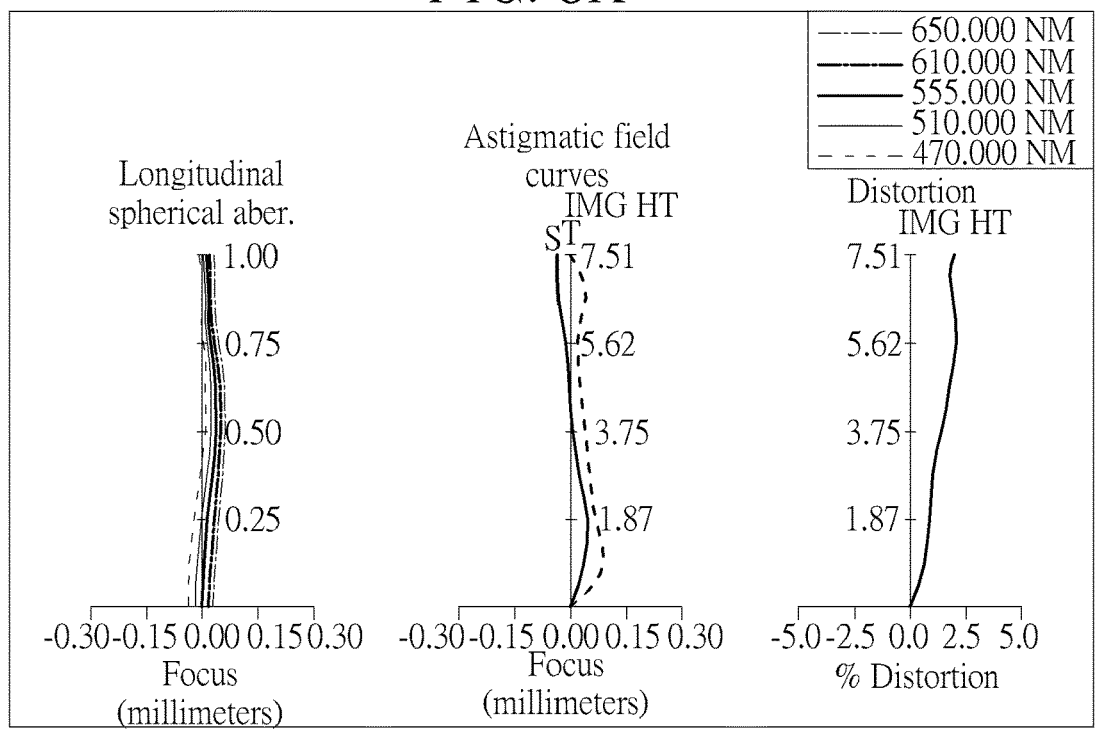
FIG. 3B is a curve diagram illustrating the spherical aberration, astigmatism and optical distortion of the optical image capturing system in sequence from left to right according to the third embodiment of the present disclosure.
Figure 3C:
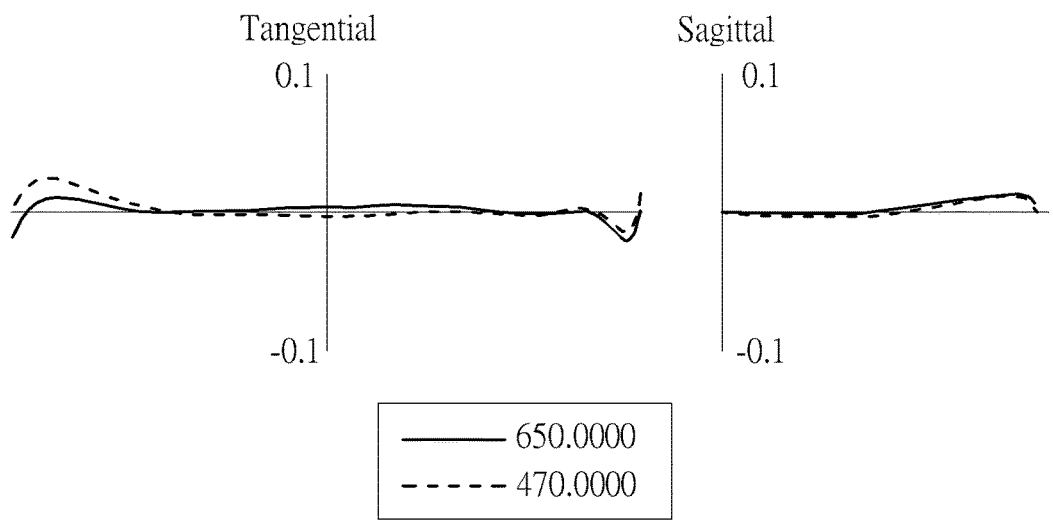
FIG. 3C is a transverse aberration diagram of the longest operation wavelength and the shortest operation wavelength for the tangential fan and the sagittal fan, of which the longest operation wavelength and the shortest operation wavelength pass through the edge of aperture at the position of 0.7 field of view on the image plane, according to the third embodiment of the present disclosure.

Please refer to FIGS. 3A and 3B, wherein FIG. 3A is a schematic view of the optical image capturing system according to the third embodiment of the present disclosure. FIG. 3B is a curve diagram illustrating the spherical aberration, astigmatism and optical distortion of the optical image capturing system in sequence from left to right according to the third embodiment of the present disclosure. FIG. 3C is a transverse aberration diagram at the position of 0.7 field of view on the image plane according to the third embodiment of the present disclosure. As shown in FIG. 3A, in the order from an object side to an image side, the optical image capturing system includes an aperture 300, a first lens 310, a second lens 320, a third lens 330, a fourth lens 340, a fifth lens 350, a sixth lens 360, a seventh lens 370, an infrared filter 380, an image plane 390 and an image sensing device 392.

The first lens 310 has positive refractive power and is made of glass material. The first lens 310 has a convex object-side surface 312 and a concave image-side surface 314, wherein both surfaces are aspheric.

The second lens 320 has negative refractive power and is made of plastic material. The second lens 320 has a convex object-side surface 322 and a concave image-side surface 324, wherein both surfaces are aspheric. The object-side surface 322 and the image-side surface 324 each have one inflection point.

The third lens 330 has positive refractive power and is made of plastic material. The third lens 330 has a concave object-side surface 332 and a convex image-side surface 334, wherein both surfaces are aspheric.

The fourth lens 340 has negative refractive power and is made of plastic material. The fourth lens 340 has a convex object-side surface 342 and a concave image-side surface 344, wherein both surfaces are aspheric. The object-side surface 342 and the image-side surface 344 each have two inflection points.

The fifth lens 350 has positive refractive power and is made of plastic material. The fifth lens 350 has a concave object-side surface 352 and a convex image-side surface 354, wherein both surfaces are aspheric. The object-side surface 352 has one inflection point.

The sixth lens 360 has positive refractive power and is made of plastic material. The sixth lens 360 has a concave object-side surface 362 and a convex image-side surface 364, wherein both surfaces are aspheric. The image-side surface 364 has two inflection points. Hence, the optical image capturing system is capable of effectively adjusting an incident angle of rays into the sixth lens 360 from each field of view, thereby correcting aberration.

The seventh lens 370 has negative refractive power and is made of plastic material. The seventh lens 370 has a convex object-side surface 372 and a concave image-side surface 374. In this manner, the back focal length may be reduced to maintain a miniaturized optical image capturing system. Additionally, the object-side surface 372 and the image-side surface 374 each have one inflection point. In this manner, the optical image capturing system is capable of effectively reducing an incident angle of the off-axis FOV rays, thereby further correcting an off-axis FOV aberration.

The infrared filter 380 is made of glass material and is configured between the seventh lens 370 and the image plane 390. The infrared filter 380 does not affect the focal length of the optical image capturing system.

Table 5 and Table 6 below should be incorporated into the reference of the present embodiment.

TABLE 5

Lens parameters of the third embodiment
f(focal length) = 6.1581 mm, f/HEP = 1.4, HAF(half angle of view) = 50.0000 deg

| Surface No. | | Curvature Radius | Thickness (mm) | Material | Refractive Index | Abbe No. | Focal Distance |
|---|---|---|---|---|---|---|---|
| 0 | Object | 1E+18 | 1E+18 | | | | |
| 1 | Aperture | 1E+18 | −0.468 | | | | |
| 2 | Lens 1 | 5.4014152 | 0.493 | Glass | 2.001 | 2.00 | 8.440 |
| 3 | | 14.13623705 | 0.050 | | | | |
| 4 | Lens 2 | 11.65854746 | 0.200 | Plastic | 1.661 | 20.40 | −15.818 |
| 5 | | 5.499580028 | 0.794 | | | | |
| 6 | Lens 3 | −84.78586346 | 0.833 | Plastic | 1.565 | 58.00 | 18.681 |
| 7 | | −9.446244016 | 0.050 | | | | |
| 8 | Lens 4 | 10.1705759 | 0.293 | Plastic | 1.661 | 20.40 | −72.195 |
| 9 | | 8.299728444 | 0.335 | | | | |
| 10 | Lens 5 | −23.89336668 | 1.397 | Plastic | 1.565 | 54.50 | 143.696 |
| 11 | | −18.86523306 | 0.998 | | | | |
| 12 | Lens 6 | −8.597997285 | 1.567 | Plastic | 1.565 | 58.00 | 5.103 |
| 13 | | −2.306859354 | 0.050 | | | | |
| 14 | Lens 7 | 4.262214926 | 1.343 | Plastic | 1.661 | 20.40 | −6.083 |
| 15 | | 1.816246036 | 1.500 | | | | |
| 16 | Infrared filter | 1E+18 | 0.200 | BK_7 | 1.517 | 64.2 | |
| 17 | | 1E+18 | 0.370 | | | | |
| 18 | Image plane | 1E+18 | 0.027 | | | | |

Reference wavelength (d-line) = 555 nm

TABLE 6 aspheric coefficients of the third embodiment
Table 6: aspheric coefficients

| Surface No. | 2 | 3 | 4 | 5 | 6 | 7 | 8 |
|---|---|---|---|---|---|---|---|
| k | 0.000000E+00 | 0.000000E+00 | −2.799209E+00 | 1.294944E+00 | 3.276487E+01 | −3.144359E+00 | 1.269966E+01 |
| A4 | 0.000000E+00 | 0.000000E+00 | −4.884782E−04 | −1.533054E−03 | −1.747309E−03 | −9.580182E−03 | −1.523385E−02 |
| A6 | 0.000000E+00 | 0.000000E+00 | −4.825840E−04 | −6.351386E−04 | −1.033894E−03 | −1.078936E−04 | −4.207936E−04 |
| A8 | 0.000000E+00 | 0.000000E+00 | 1.359708E−04 | 1.236536E−04 | 1.303549E−04 | −1.977229E−05 | −1.265021E−04 |
| A10 | 0.000000E+00 | 0.000000E+00 | −1.551034E−05 | −1.888967E−05 | −3.838865E−05 | −1.232249E−05 | 5.999883E−06 |
| A12 | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 | 14 | 15 |
|---|---|---|---|---|---|---|---|
| k | −4.759874E+00 | 5.000000E+01 | 2.536329E+01 | −2.381337E+00 | −2.568091E+00 | −1.570552E+01 | −4.442539E+00 |
| A4 | −7.183073E−03 | −5.634744E−03 | −3.499732E−03 | 2.234887E−03 | −8.913811E−04 | −9.767228E−04 | −2.465185E−03 |
| A6 | −4.915479E−04 | 2.803615E−04 | 4.190059E−05 | −6.143953E−05 | −2.202309E−05 | −3.113810E−04 | 6.284646E−05 |

TABLE 6-continued aspheric coefficients of the third embodiment
Table 6: aspheric coefficients

| A8  | 3.522344E−05 | 5.018122E−05  | −3.938402E−05 | −1.630222E−05 | 1.301054E−05  | 1.832144E−05  | −1.043603E−06 |
|-----|--------------|---------------|---------------|---------------|---------------|---------------|---------------|
| A10 | 3.043159E−06 | −2.265976E−06 | 2.050014E−06  | 5.750782E−07  | −4.448378E−07 | −3.421652E−07 | 2.025937E−09  |
| A12 | 0.000000E+00 | 0.000000E+00  | 0.000000E+00  | 0.000000E+00  | 0.000000E+00  | 0.000000E+00  | 0.000000E+00  |

In the third embodiment, the form of the aspheric surface equation therein is presented as that in the first embodiment. In addition, the definition of parameters in the following tables is equivalent to that in the first embodiment, so that the repetitive details are not stated here.

The following values for the conditional expressions may be obtained from the data in Table 5 and Table 6.

Third embodiment (primary reference wavelength = 555 nm)

| |f/f1| | |f/f2| | |f/f3| | |f/f4| | |f/f5| | |f/f6| |
|---|---|---|---|---|---|
| 0.7296 | 0.3893 | 0.3296 | 0.0853 | 0.0429 | 1.2068 |
| |f/f7| | ΣPPR | ΣNPR | ΣPPR/ΣNPR | IN12/f | IN67/f |
| 1.0124 | 2.3514 | 1.4445 | 1.6278 | 0.0081 | 0.0081 |
| |f1/f2| | |f2/f3| | (TP1 + IN12)/TP2 | | (TP7 + IN67)/TP6 | |
| 0.5336 | 0.8467 | 2.7164 | | 0.8892 | |
| HOS | InTL | HOS/HOI | InS/HOS | ODT % | TDT % |
| 10.5000 | 8.4037 | 1.4000 | 0.9554 | 2.0363 | 0.3470 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 0.0000 | 2.7877 | 4.5960 | 0.6128 | 0.4377 |
| PSTA | PLTA | NSTA | NLTA | SSTA | SLTA |
| 0.013 mm | 0.001 mm | 0.004 mm | −0.017 mm | −0.001 mm | 0.005 mm |

The values pertaining to the outline curve lengths may be obtained from the data in Table 5 and Table 6:

Third embodiment (primary reference wavelength = 555 nm)

| ARE | 1/2(HEP) | ARE value | ARE−1/2(HEP) | 2(ARE/HEP) % | TP | ARE/TP (%) |
|---|---|---|---|---|---|---|
| 11 | 2.199 | 2.265 | 0.06545 | 102.98% | 0.493 | 459.13% |
| 12 | 2.199 | 2.208 | 0.00864 | 100.39% | 0.493 | 447.61% |
| 21 | 2.199 | 2.207 | 0.00790 | 100.36% | 0.200 | 1103.61% |
| 22 | 2.199 | 2.244 | 0.04498 | 102.05% | 0.200 | 1122.15% |
| 31 | 2.199 | 2.230 | 0.03093 | 101.41% | 0.833 | 267.65% |
| 32 | 2.199 | 2.306 | 0.10710 | 104.87% | 0.833 | 276.79% |
| 41 | 2.199 | 2.234 | 0.03467 | 101.58% | 0.293 | 761.62% |
| 42 | 2.199 | 2.203 | 0.00391 | 100.18% | 0.293 | 751.14% |
| 51 | 2.199 | 2.212 | 0.01292 | 100.59% | 1.397 | 158.40% |
| 52 | 2.199 | 2.220 | 0.02095 | 100.95% | 1.397 | 158.97% |
| 61 | 2.199 | 2.215 | 0.01570 | 100.71% | 1.567 | 141.36% |
| 62 | 2.199 | 2.385 | 0.18536 | 108.43% | 1.567 | 152.19% |
| 71 | 2.199 | 2.223 | 0.02330 | 101.06% | 1.343 | 165.45% |
| 72 | 2.199 | 2.328 | 0.12822 | 105.83% | 1.343 | 173.26% |

| ARS | EHD | ARS value | ARS−EHD | (ARS/EHD) % | TP | ARS/TP (%) |
|---|---|---|---|---|---|---|
| 11 | 2.199 | 2.265 | 0.06545 | 102.98% | 0.493 | 459.13% |
| 12 | 2.216 | 2.224 | 0.00824 | 100.37% | 0.493 | 450.90% |
| 21 | 2.234 | 2.241 | 0.00774 | 100.35% | 0.200 | 1120.69% |
| 22 | 2.308 | 2.355 | 0.04751 | 102.06% | 0.200 | 1177.68% |
| 31 | 2.332 | 2.397 | 0.06530 | 102.80% | 0.833 | 287.64% |
| 32 | 2.504 | 2.768 | 0.26399 | 110.54% | 0.833 | 332.22% |
| 41 | 2.620 | 2.792 | 0.17204 | 106.57% | 0.293 | 951.78% |
| 42 | 3.051 | 3.064 | 0.01360 | 100.45% | 0.293 | 1044.64% |
| 51 | 3.155 | 3.179 | 0.02347 | 100.74% | 1.397 | 227.60% |
| 52 | 3.494 | 3.902 | 0.40769 | 111.67% | 1.397 | 279.38% |
| 61 | 4.039 | 4.254 | 0.21477 | 105.32% | 1.567 | 271.48% |
| 62 | 4.308 | 4.872 | 0.56435 | 113.10% | 1.567 | 310.96% |
| 71 | 5.112 | 5.501 | 0.38918 | 107.61% | 1.343 | 409.52% |
| 72 | 6.788 | 7.637 | 0.84914 | 112.51% | 1.343 | 568.48% |

The following values may be obtained according to the data in Table 5 and Table 6.

| Values related to inflection point of third embodiment (primary reference wavelength = 555 nm) | | | | | | | |
|---|---|---|---|---|---|---|---|
| HIF211 | 1.8679 | HIF211/HOI | 0.2490 | SGI211 | 0.1336 | \|SGI211\|/(\|SGI211\| + TP2) | 0.4005 |
| HIF221 | 1.9254 | HIF221/HOI | 0.2567 | SGI221 | 0.3215 | \|SGI221\|/(\|SGI221\| + TP2) | 0.6165 |
| HIF411 | 0.7589 | HIF411/HOI | 0.1012 | SGI411 | 0.0237 | \|SGI411\|/(\|SGI411\| + TP4) | 0.0748 |
| HIF412 | 2.5988 | HIF412/HOI | 0.3465 | SGI412 | −0.5022 | \|SGI412\|/(\|SGI412\| + TP4) | 0.6313 |
| HIF421 | 1.0518 | HIF421/HOI | 0.1402 | SGI421 | 0.0563 | \|SGI421\|/(\|SGI421\| + TP4) | 0.1610 |
| HIF422 | 2.6000 | HIF422/HOI | 0.3467 | SGI422 | 0.0117 | \|SGI422\|/(\|SGI422\| + TP4) | 0.0385 |
| HIF511 | 2.2485 | HIF511/HOI | 0.2998 | SGI511 | −0.2041 | \|SGI511\|/(\|SGI511\| + TP5) | 0.1275 |
| HIF621 | 2.7868 | HIF621/HOI | 0.3716 | SGI621 | −1.2260 | \|SGI621\|/(\|SGI621\| + TP6) | 0.4390 |
| HIF622 | 3.9885 | HIF622/HOI | 0.5318 | SGI622 | −1.9715 | \|SGI622\|/(\|SGI622\| + TP6) | 0.5572 |
| HIF711 | 1.4269 | HIF711/HOI | 0.1903 | SGI711 | 0.1754 | \|SGI711\|/(\|SGI711\| + TP7) | 0.1155 |
| HIF721 | 1.6832 | HIF721/HOI | 0.2244 | SGI721 | 0.5034 | \|SGI721\|/(\|SGI721\| + TP7) | 0.2726 |

Fourth Embodiment

Figure 4A:
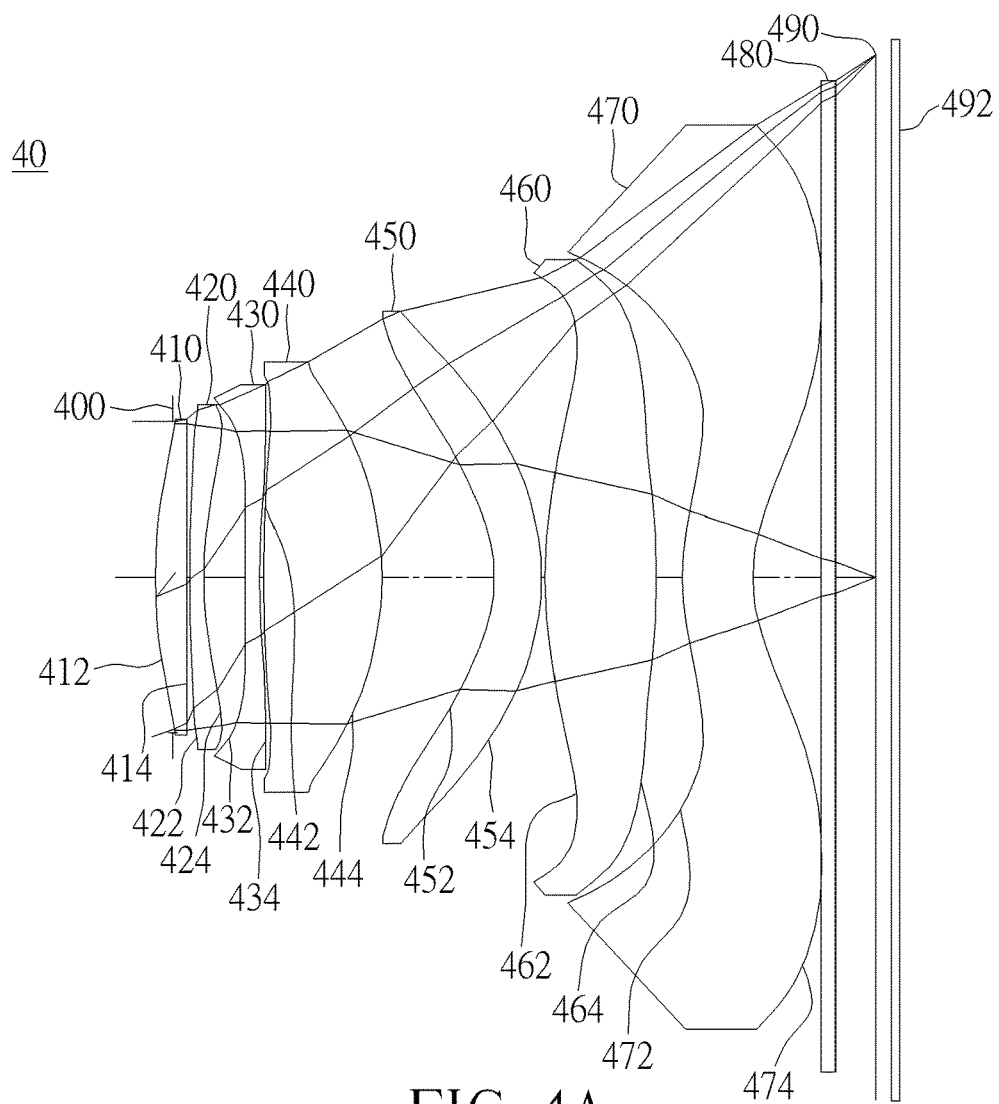
FIG. 4A is a schematic view of the optical image capturing system according to a fourth embodiment of the present disclosure.
Figure 4B:
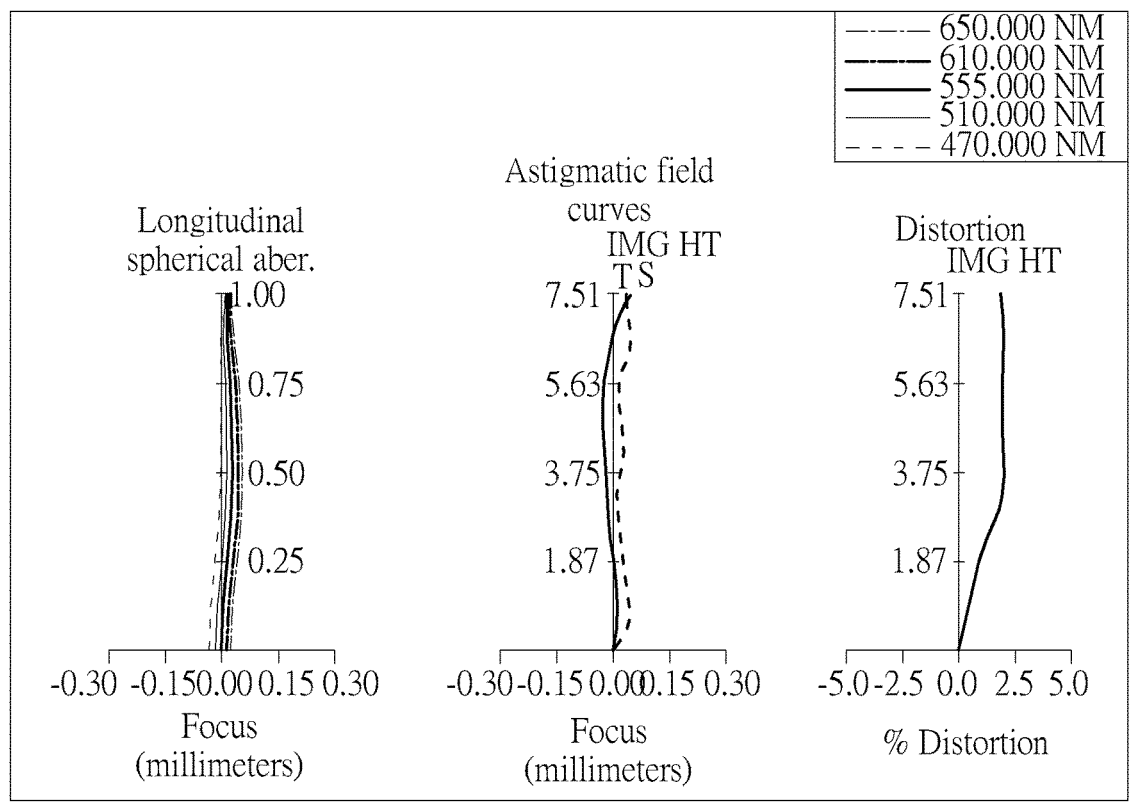
FIG. 4B is a curve diagram illustrating the spherical aberration, astigmatism and optical distortion of the optical image capturing system in sequence from left to right according to the fourth embodiment of the present disclosure.
Figure 4C:
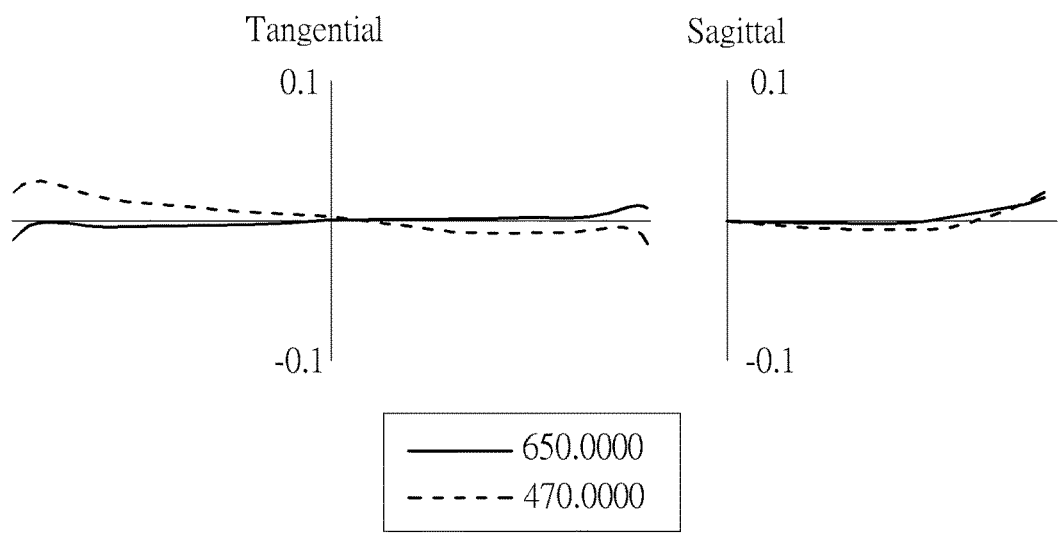
FIG. 4C is a transverse aberration diagram of the longest operation wavelength and the shortest operation wavelength for the tangential fan and the sagittal fan, of which the longest operation wavelength and the shortest operation wavelength pass through the edge of aperture at the position of 0.7 field of view on the image plane, according to the fourth embodiment of the present disclosure.

Please refer to FIGS. 4A and 4B, wherein FIG. 4A is a schematic view of the optical image capturing system according to the fourth embodiment of the present disclosure. FIG. 4B is a curve diagram illustrating the spherical aberration, astigmatism and optical distortion of the optical image capturing system in sequence from left to right according to the fourth embodiment of the present disclosure. FIG. 4C is a transverse aberration diagram at the position of 0.7 field of view on the image plane according to the fourth embodiment of the present disclosure. As shown in FIG. 4A, in the order from an object side to an image side, the optical image capturing system includes an aperture 400, a first lens 410, a second lens 420, a third lens 430, a fourth lens 440, a fifth lens 450, a sixth lens 460, a seventh lens 470, an infrared filter 480, an image plane 490 and an image sensing device 492.

The first lens 410 has positive refractive power and is made of glass material. The first lens 410 has a convex object-side surface 412 and a convex image-side surface 414, wherein both surfaces are aspheric. The object-side surface 412 has one inflection point and the image-side surface 414 has two inflection points.

The second lens 420 has negative refractive power and is made of plastic material. The second lens 420 has a concave object-side surface 422 and a concave image-side surface 424, wherein both surfaces are aspheric. The object-side surface 422 and the image-side surface 424 each have one inflection point.

The third lens 430 has negative refractive power and is made of plastic material. The third lens 430 has a convex object-side surface 432 and a concave image-side surface 434, wherein both surfaces are aspheric. The object-side surface 432 and image-side surface 434 each have one inflection point.

The fourth lens 440 has positive refractive power and is made of plastic material. The fourth lens 440 has a convex object-side surface 442 and a convex image-side surface 444, wherein both surfaces are aspheric. The object-side surface 442 and image-side surface 444 each have one inflection point.

The fifth lens 450 has negative refractive power and is made of plastic material. The fifth lens 450 has a concave object-side surface 452 and a convex image-side surface 454, wherein both surfaces are aspheric. The object-side surface 452 and the image-side surface 454 each have one inflection point.

The sixth lens 460 has positive refractive power and is made of plastic material. The sixth lens 460 has a convex object-side surface 462 and a convex image-side surface 464, wherein both surfaces are aspheric. The object-side surface 462 has one inflection point and the image-side surface 464 has two inflection points. Hence, the optical image capturing system is capable of effectively adjusting an incident angle of rays into the sixth lens 460 from each field of view, thereby correcting aberration.

The seventh lens 470 has negative refractive power and is made of plastic material. The seventh lens 470 has a convex object-side surface 472 and a concave image-side surface 474, wherein both surfaces are aspheric. The object-side surface 472 and the image-side surface 474 each have one inflection point. In this manner, the back focal length may be reduced to maintain a miniaturized optical image capturing system. Additionally, the optical image capturing system is capable of effectively reducing an incident angle of the off-axis FOV rays, thereby further correcting an off-axis FOV aberration.

The infrared filter 480 is made of glass material and is configured between the seventh lens 470 and the image plane 490. The infrared filter 480 does not affect the focal length of the optical image capturing system.

Table 7 and Table 8 below should be incorporated into the reference of the present embodiment.

TABLE 7

| Lens parameters of the fourth embodiment f(focal length) = 6.1644 mm, f/HEP = 1.4, HAF(half angle of view) = 50.0000 deg | | | | | | | |
|---|---|---|---|---|---|---|---|
| Surface No. | | Curvature Radius | Thickness (mm) | Material | Refractive Index | Abbe No. | Focal Distance |
| 0 | Object | 1E+18 | 1E+18 | | | | |
| 1 | Aperture | 1E+18 | −0.251 | | | | |
| 2 | Lens 1 | 7.571412355 | 0.454 | Glass | 2.001 | 29.13 | 6.382 |
| 3 | | −41.27187457 | 0.050 | | | | |

TABLE 7-continued

Lens parameters of the fourth embodiment
f(focal length) = 6.1644 mm, f/HEP = 1.4,
HAF(half angle of view) = 50.0000 deg

| Surface No. | | Curvature Radius | Thickness (mm) | Material | Refractive Index | Abbe No. | Focal Distance |
|---|---|---|---|---|---|---|---|
| 4 | Lens 2 | −132.7014677 | 0.200 | Plastic | 1.607 | 26.60 | −8.660 |
| 5 | | 5.515367638 | 0.601 | | | | |
| 6 | Lens 3 | 622.8272113 | 0.217 | Plastic | 1.661 | 20.40 | −21.841 |
| 7 | | 14.228786 | 0.050 | | | | |
| 8 | Lens 4 | 13.26335107 | 1.710 | Plastic | 1.565 | 58.00 | 6.767 |
| 9 | | −5.144085663 | 1.651 | | | | |
| 10 | Lens 5 | −2.216068882 | 0.695 | Plastic | 1.565 | 58.00 | −13.367 |
| 11 | | −3.487743797 | 0.050 | | | | |
| 12 | Lens 6 | 6.607556872 | 1.619 | Plastic | 1.565 | 58.00 | 6.793 |
| 13 | | −8.409463856 | 0.394 | | | | |
| 14 | Lens 7 | 3.83757219 | 1.019 | Plastic | 1.661 | 20.40 | −11.021 |
| 15 | | 2.253344506 | 1.000 | | | | |
| 16 | Infrared fdter | 1E+18 | 0.200 | BK_7 | 1.517 | 64.2 | |
| 17 | | 1E+18 | 0.570 | | | | |
| 18 | Image plane | 1E+18 | 0.022 | | | | |

Reference wavelength (d-line) = 555 nm

TABLE 8 aspheric coefficients of the fourth embodiment
Table 8: aspheric coefficients

| Surface No. | 2 | 3 | 4 | 5 | 6 | 7 | 8 |
|---|---|---|---|---|---|---|---|
| k | −6.278073E−01 | 2.422853E+00 | −5.000000E+01 | −2.416442E−01 | 5.000000E+01 | −5.501439E+00 | 1.874949E+01 |
| A4 | −2.277545E−03 | 7.714782E−03 | 1.069990E−02 | −5.854856E−03 | −1.103981E−03 | −5.635361E−04 | −4.839250E−03 |
| A6 | 3.499184E−04 | −1.673913E−03 | −3.241157E−03 | −5.990180E−04 | −1.460194E−03 | −1.425749E−03 | −5.018527E−04 |
| A8 | −1.496999E−04 | 1.374335E−04 | 5.235262E−04 | 1.160841E−04 | 4.174309E−05 | 2.739654E−04 | 1.967143E−04 |
| A10 | 9.252342E−06 | −3.529139E−06 | −2.873804E−05 | −2.377753E−05 | −5.792140E−06 | −1.732215E−05 | −1.928177E−05 |
| A12 | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 | 14 | 15 |
|---|---|---|---|---|---|---|---|
| k | −1.124814E+00 | −2.981247E+00 | −2.761212E+00 | −2.600249E+01 | −2.702717E+01 | −7.505083E+00 | −3.145962E+00 |
| A4 | −3.193301E−03 | −9.718612E−04 | −3.752995E−03 | 2.223097E−03 | 3.888841E−03 | −4.715531E−03 | −6.078340E−03 |
| A6 | 6.424620E−05 | −4.115455E−04 | 3.724618E−05 | −2.156421E−04 | −3.851072E−04 | −7.175988E−04 | 2.343833E−04 |
| A8 | −4.316656E−05 | 7.135491E−05 | −2.318903E−06 | 6.000492E−06 | 1.250473E−05 | 6.002176E−05 | −4.569162E−06 |
| A10 | 5.574504E−06 | −2.371378E−06 | 3.585883E−07 | −3.580586E−07 | −2.844868E−07 | −1.409635E−06 | 3.170213E−08 |
| A12 | 0.000000E+00 | 0.000000E+00 | 0.000000E+00 | 0.000000E+00 | 0.000000E+00 | 0.000000E+00 | 0.000000E+00 |

In the fourth embodiment, the form of the aspheric surface equation therein is presented as that in the first embodiment. In addition, the definition of parameters in the following tables is equivalent to that in the first embodiment, so that the repetitive details are not stated here.

The following values for the conditional expressions may be obtained from the data in Table 7 and Table 8.

| Fourth embodiment (primary reference wavelength = 555 nm) | | | | | |
|---|---|---|---|---|---|
| |f/f1| | |f/f2| | |f/f3| | |f/f4| | |f/f5| | |f/f6| |
| 0.9659 | 0.7118 | 0.2822 | 0.9110 | 0.4612 | 0.9074 |
| |f/f7| | ΣPPR | ΣNPR | ΣPPR/|ΣNPR| | IN12/f | IN67/f |
| 0.5593 | 3.0665 | 1.7323 | 1.7702 | 0.0081 | 0.0639 |
| |f1/f2| | |f2/f3| | (TP1 + IN12)/TP2 | | (TP7 + IN67)/TP6 | |
| 0.7369 | 0.3965 | 2.5188 | | 0.8726 | |
| HOS | InTL | HOS/HOI | InS/HOS | ODT % | TDT % |
| 10.5000 | 8.7083 | 1.4000 | 0.9761 | 2.0233 | 0.1589 |
| HVT11 | HVT12 | HVT21 | HVT22 | HVT31 | HVT32 |
| 0.0000 | 1.0899 | 0.4383 | 2.1252 | 0.4953 | 2.3654 |
| HVT61 | HVT62 | HVT71 | HVT72 | HVT72/HOI | HVT72/HOS |
| 3.3706 | 0.0000 | 2.2086 | 4.0257 | 0.5368 | 0.3834 |

-continued

| Fourth embodiment (primary reference wavelength = 555 nm) | | | | | |
|---|---|---|---|---|---|
| PSTA | PLTA | NSTA | NLTA | SSTA | SLTA |
| −0.016 mm | 0.009 mm | 0.021 mm | −0.014 mm | 0.020 mm | 0.016 mm |

The values pertaining to the outline curve lengths may be obtained from the data in Table 7 and Table 8:

| Fourth embodiment (primary reference wavelength = 555 nm) | | | | | | |
|---|---|---|---|---|---|---|
| ARE | 1/2(HEP) | ARE value | ARE-1/2(HEP) | 2(ARE/HEP) % | TP | ARE/TP (%) |
| 11 | 2.202 | 2.218 | 0.01672 | 100.76% | 0.454 | 488.87% |
| 12 | 2.202 | 2.201 | −0.00053 | 99.98% | 0.454 | 485.06% |
| 21 | 2.202 | 2.204 | 0.00215 | 100.10% | 0.200 | 1101.86% |
| 22 | 2.202 | 2.219 | 0.01740 | 100.79% | 0.200 | 1109.49% |
| 31 | 2.202 | 2.224 | 0.02233 | 101.01% | 0.217 | 1027.03% |
| 32 | 2.202 | 2.203 | 0.00185 | 100.08% | 0.217 | 1017.57% |
| 41 | 2.202 | 2.204 | 0.00223 | 100.10% | 1.710 | 128.90% |
| 42 | 2.202 | 2.293 | 0.09093 | 104.13% | 1.710 | 134.08% |
| 51 | 2.202 | 2.387 | 0.18543 | 108.42% | 0.695 | 343.40% |
| 52 | 2.202 | 2.337 | 0.13503 | 106.13% | 0.695 | 336.15% |
| 61 | 2.202 | 2.223 | 0.02104 | 100.96% | 1.619 | 137.28% |
| 62 | 2.202 | 2.208 | 0.00620 | 100.28% | 1.619 | 136.36% |
| 71 | 2.202 | 2.224 | 0.02279 | 101.04% | 1.019 | 218.33% |
| 72 | 2.202 | 2.313 | 0.11165 | 105.07% | 1.019 | 227.06% |
| ARS | EHD | ARS value | ARS-EHD | (ARS/EHD) % | TP | ARS/TP (%) |
| 11 | 2.202 | 2.218 | 0.01672 | 100.76% | 0.454 | 488.87% |
| 12 | 2.267 | 2.267 | −0.00006 | 100.00% | 0.454 | 499.61% |
| 21 | 2.389 | 2.393 | 0.00424 | 100.18% | 0.200 | 1196.55% |
| 22 | 2.473 | 2.500 | 0.02730 | 101.10% | 0.200 | 1250.05% |
| 31 | 2.483 | 2.564 | 0.08110 | 103.27% | 0.217 | 1183.98% |
| 32 | 2.777 | 2.780 | 0.00332 | 100.12% | 0.217 | 1283.80% |
| 41 | 2.810 | 2.815 | 0.00558 | 100.20% | 1.710 | 164.66% |
| 42 | 3.093 | 3.328 | 0.23568 | 107.62% | 1.710 | 194.67% |
| 51 | 3.742 | 4.125 | 0.38303 | 110.23% | 0.695 | 593.50% |
| 52 | 3.844 | 4.497 | 0.65345 | 117.00% | 0.695 | 646.96% |
| 61 | 4.337 | 4.584 | 0.24737 | 105.70% | 1.619 | 283.12% |
| 62 | 4.614 | 5.000 | 0.38624 | 108.37% | 1.619 | 308.85% |
| 71 | 4.625 | 5.484 | 0.85947 | 118.58% | 1.019 | 538.32% |
| 72 | 6.630 | 7.113 | 0.48320 | 107.29% | 1.019 | 698.17% |

The following values may be obtained according to the data in Table 7 and Table 8.

| Values related to inflection point of fourth embodiment (primary reference wavelength = 555 nm) | | | | | | | |
|---|---|---|---|---|---|---|---|
| HIF111 | 1.7010 | HIF111/HOI | 0.2268 | SGI111 | 0.1728 | \|SGI111\|/(\|SGI111\| + TP1) | 0.2758 |
| HIF121 | 0.5589 | HIF121/HOI | 0.0745 | SGI 121 | −0.0031 | \|SGI121\|/(\|SGI121\| + TP1) | 0.0067 |
| HIF122 | 1.5906 | HIF122/HOI | 0.2121 | SGI122 | −0.0032 | \|SGI122\|/(\|SGI122\| + TP1) | 0.0069 |
| HIF211 | 0.2480 | HIF211/HOI | 0.0331 | SGI211 | −0.0002 | \|SGI211\|/(\|SGI211\| + TP2) | 0.0010 |
| HIF221 | 1.4173 | HIF221/HOI | 0.1890 | SGI221 | 0.1571 | \|SGI221\|/(\|SGI221\| + TP2) | 0.4399 |
| HIF311 | 0.3047 | HIF311/HOI | 0.0406 | SGI311 | 0.0001 | \|SGI311\|/(\|SGI311\| + TP3) | 0.0003 |
| HIF321 | 1.2576 | HIF321/HOI | 0.1677 | SGI321 | 0.0496 | \|SGI321\|/(\|SGI321\| + TP3) | 0.1863 |
| HIF411 | 1.3185 | HIF411/HOI | 0.1758 | SGI411 | 0.0533 | \|SGI411\|/(\|SGI411\| + TP4) | 0.0302 |
| HIF421 | 2.6358 | HIF421/HOI | 0.3514 | SGI421 | −0.8128 | \|SGI421\|/(\|SGI421\| + TP4) | 0.3222 |
| HIF511 | 2.4481 | HIF511/HOI | 0.3264 | SGI511 | −0.9991 | \|SGI511\|/(\|SGI511\| + TP5) | 0.5897 |
| HIF521 | 3.4624 | HIF521/HOI | 0.4616 | SGI521 | −1.7294 | \|SGI521\|/(\|SGI521\| + TP5) | 0.7133 |
| HIF611 | 2.3192 | HIF611/HOI | 0.3092 | SGI611 | 0.3037 | \|SGI611\|/(\|SGI611\| + TP6) | 0.1580 |
| HIF621 | 1.4096 | HIF621/HOI | 0.1879 | SGI621 | −0.0895 | \|SGI621\|/(\|SGI621\| + TP6) | 0.0524 |
| HIF622 | 2.1447 | HIF622/HOI | 0.2860 | SGI622 | −0.1573 | \|SGI622\|/(\|SGI622\| + TP6) | 0.0885 |
| HIF711 | 1.2217 | HIF711/HOI | 0.1629 | SGI711 | 0.1574 | \|SGI711\|/(\|SGI711\| + TP7) | 0.1338 |
| HIF721 | 1.6106 | HIF721/HOI | 0.2147 | SGI721 | 0.4333 | \|SGI721\|/(\|SGI721\| + TP7) | 0.2984 |

Fifth Embodiment

Figure 5A:
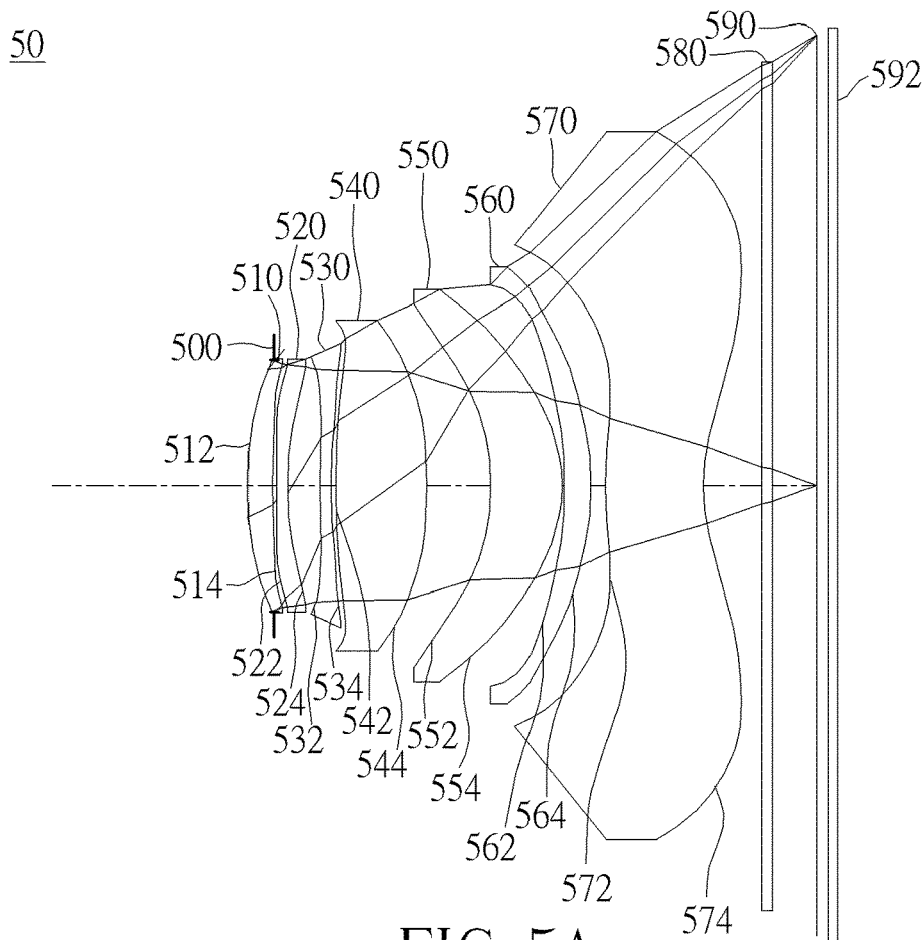
FIG. 5A is a schematic view of the optical image capturing system according to a fifth embodiment of the present disclosure.
Figure 5B:
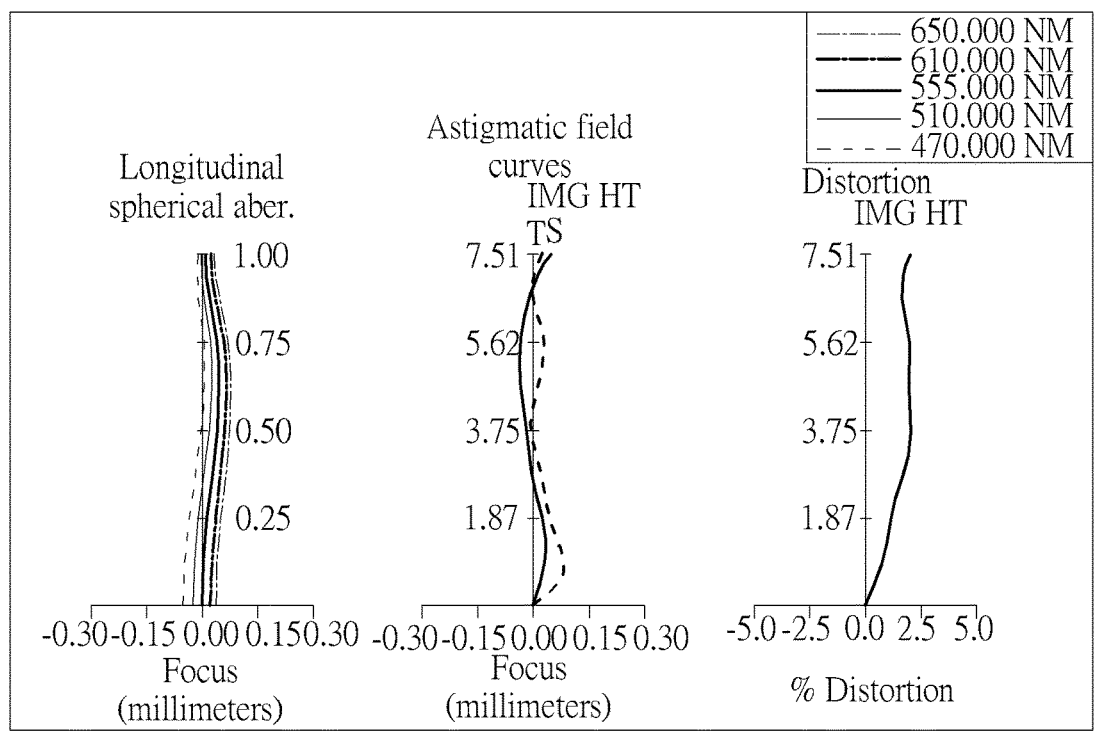
FIG. 5B is a curve diagram illustrating the spherical aberration, astigmatism and optical distortion of the optical image capturing system in the sequence from left to right according to the fifth embodiment of the present disclosure.
Figure 5C:
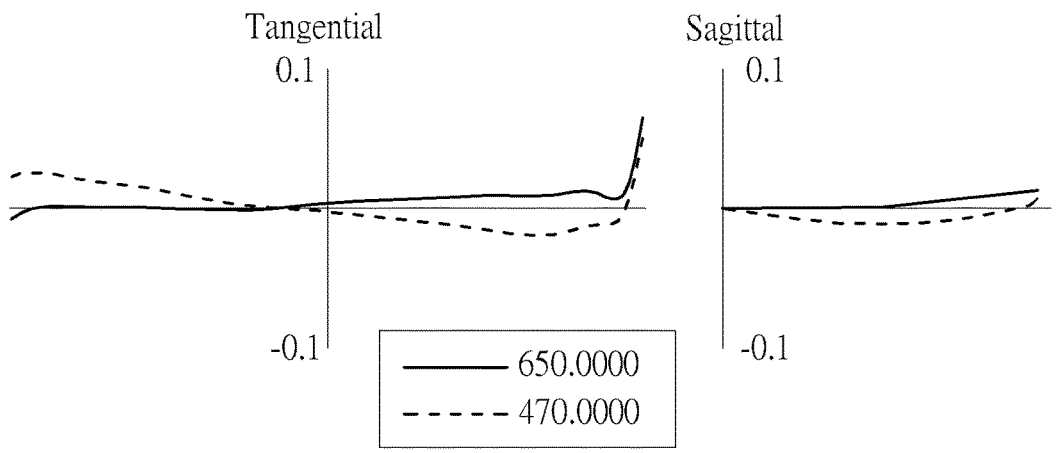
FIG. 5C is a transverse aberration diagram of the longest operation wavelength and the shortest operation wavelength for the tangential fan and the sagittal fan, of which the longest operation wavelength and the shortest operation wavelength pass through the edge of aperture at the position of 0.7 field of view on the image plane, according to the fifth embodiment of the present disclosure.

Please refer to FIGS. 5A and 5B, wherein FIG. 5A is a schematic view of the optical image capturing system according to the fifth embodiment of the present disclosure. FIG. 5B is a curve diagram illustrating the spherical aberration, astigmatism and optical distortion of the optical image capturing system in sequence from left to right according to the fifth embodiment of the present disclosure. FIG. 5C is a transverse aberration diagram at the position of 0.7 field of view on the image plane according to the fifth embodiment of the present disclosure. As shown in FIG. 5A, in the order from an object side to an image side, the optical image capturing system includes an aperture 500, a first lens 510, a second lens 520, a third lens 530, a fourth lens 540, a fifth lens 550, a sixth lens 560, a seventh lens 570, an infrared filter 580, an image plane 590 and an image sensing device 592.

The first lens 510 has positive refractive power and is made of glass material. The first lens 510 has a convex object-side surface 512 and a concave image-side surface 514, wherein both surfaces are aspheric.

The second lens 520 has negative refractive power and is made of plastic material. The second lens 520 has a concave object-side surface 522 and a concave image-side surface 524, wherein both surfaces are aspheric. The object-side surface 522 has two inflection points and the image-side surface 524 has one inflection point.

The third lens 530 has negative refractive power and is made of plastic material. The third lens 530 has a convex object-side surface 532 and a concave image-side surface 534, wherein both surfaces are aspheric. The object-side surface 532 and the image-side surface 534 each have one inflection point.

The fourth lens 540 has positive refractive power and is made of plastic material. The fourth lens 540 has a convex object-side surface 542 and a convex image-side surface 544, wherein both surfaces are aspheric. The object-side surface 542 and the image-side surface 544 each have one inflection point.

The fifth lens 550 has positive refractive power and is made of plastic material. The fifth lens 550 has a concave object-side surface 552 and a convex image-side surface 554, wherein both surfaces are aspheric. The object-side surface 552 has one inflection point.

The sixth lens 560 has negative refractive power and is made of plastic material. The sixth lens 560 has a concave object-side surface 562 and a convex image-side surface 564, wherein both surfaces are aspheric. Hence, the optical image capturing system is capable of effectively adjusting an incident angle of rays into the sixth lens 560 from each field of view, thereby correcting aberration.

The seventh lens 570 has negative refractive power and is made of plastic material. The seventh lens 570 has a convex object-side surface 572 and a concave image-side surface 574. The object-side surface 572 and the image-side surface 574 each have one inflection point. In this manner, the back focal length may be reduced to maintain a miniaturized optical image capturing system. Additionally, the optical image capturing system is capable of effectively reducing an incident angle of the off-axis FOV rays, thereby further correcting an off-axis FOV aberration.

The infrared filter 580 is made of glass material and is configured between the seventh lens 570 and the image plane 590. The infrared filter 580 does not affect the focal length of the optical image capturing system.

Table 9 and Table 10 below should be incorporated into the reference of the present embodiment.

TABLE 9

Lens parameters of the fifth embodiment
f(focal length) = 6.1550 mm, f/HEP = 1.4, HAF(half angle of view) = 50.0002 deg

| Surface No. | | Curvature Radius | Thickness (mm) | Material | Refractive Index | Abbe No. | Focal Distance |
|---|---|---|---|---|---|---|---|
| 0 | Object | 1E+18 | 1E+18 | | | | |
| 1 | Aperture | 1E+18 | −0.475 | | | | |
| 2 | Lens 1 | 5.77634861 | 0.444 | Glass | 2.001 | 29.13 | 5.961 |
| 3 | | 146.2510336 | 0.050 | | | | |
| 4 | Lens 2 | −74.39855163 | 0.200 | Plastic | 1.583 | 30.20 | −9.485 |
| 5 | | 6.01802513 | 0.563 | | | | |
| 6 | Lens 3 | 55.41525935 | 0.200 | Plastic | 1.661 | 20.40 | −32.431 |
| 7 | | 15.53253787 | 0.056 | | | | |
| 8 | Lens 4 | 15.26702094 | 1.559 | Plastic | 1.565 | 58.00 | 8.567 |
| 9 | | −6.856939129 | 1.090 | | | | |
| 10 | Lens 5 | −3.975311795 | 1.226 | Plastic | 1.565 | 58.00 | 9.568 |
| 11 | | −2.549652024 | 0.050 | | | | |
| 12 | Lens 6 | −5.173401379 | 0.441 | Plastic | 1.661 | 20.40 | −2822.140 |
| 13 | | −5.364561431 | 0.261 | | | | |
| 14 | Lens 7 | 6.913443747 | 1.672 | Plastic | 1.661 | 20.40 | −9.324 |
| 15 | | 2.956751638 | 1.000 | | | | |
| 16 | Infrared filter | 1E+18 | 0.200 | BK_7 | 1.517 | 64.2 | |
| 17 | | 1E+18 | 0.714 | | | | |
| 18 | Image plane | 1E+18 | 0.024 | | | | |

Reference wavelength (d-line) = 555 nm; shield position: none

TABLE 10 aspheric coefficients of the fifth embodiment
Table 10: aspheric coefficients

| Surface No. | 2 | 3 | 4 | 5 | 6 | 7 | 8 |
|---|---|---|---|---|---|---|---|
| k | 2.897065E−02 | 5.000000E+01 | 5.000000E+01 | 4.212522E−02 | −5.000000E+01 | −4.769290E+00 | −5.535137E+00 |
| A4 | −1.385427E−03 | 5.120093E−03 | 1.698330E−02 | 5.106749E−02 | −1.018539E−02 | −3.400065E−03 | 3.633608E−03 |
| A6 | −3.601412E−04 | 4.277908E−04 | −1.432080E−03 | −2.799867E−03 | 1.643553E−03 | 3.598361E−04 | −1.957151E−03 |
| A8 | 1.262167E−04 | −5.879816E−05 | 1.636490E−04 | 4.561104E−04 | −2.198462E−04 | 6.914823E−05 | 3.711460E−04 |
| A10 | 1.686048E−05 | 3.422139E−05 | −2.180662E−05 | −6.278586E−05 | −1.611634E−05 | −8.782517E−06 | −2.730489E−05 |
| A12 | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 | 14 | 15 |
|---|---|---|---|---|---|---|---|
| k | 1.507675E+00 | 3.715683E−01 | −1.423194E+00 | 1.264969E+00 | 9.404701E−01 | −5.000000E+01 | −6.060198E+00 |
| A4 | −2.379723E−03 | −1.096273E−03 | 6.684816E−04 | 9.439227E−03 | 7.977003E−04 | −7.352762E−03 | −4.232468E−03 |
| A6 | −6.714145E−06 | −1.481086E−04 | −1.109912E−04 | −3.919262E−04 | 1.160280E−04 | −6.052863E−04 | 1.390499E−04 |
| A8 | −8.668886E−05 | 5.092421E−05 | −3.460346E−05 | −2.715683E−06 | 4.754389E−06 | 8.557093E−05 | −2.724071E−06 |
| A10 | 9.398548E−06 | 2.588285E−06 | 1.914197E−06 | 3.581550E−07 | −9.742978E−08 | −2.965355E−06 | 9.552118E−09 |
| A12 | 0.000000E+00 | 0.000000E+00 | 0.000000E+00 | 0.000000E+00 | 0.000000E+00 | 0.000000E+00 | 0.000000E+00 |

In the fifth embodiment, the form of the aspheric surface equation therein is presented as that in the first embodiment. In addition, the definition of parameters in the following tables is equivalent to that in the first embodiment, so that the repetitive details are not stated here.

The following values for the conditional expressions may be obtained from the data in Table 9 and Table 10.

| \|f/f1\| | \|f/f2\| | \|f/f3\| | \|f/f4\| | \|f/f5\| | \|f/f6\| |
|---|---|---|---|---|---|
| 1.0325 | 0.6489 | 0.1898 | 0.7185 | 0.6433 | 0.0022 |
| \|f/f7\| | ΣPPR | ΣNPR | ΣPPR/ΣNPR | IN12/f | IN67/f |
| 0.6601 | 1.9429 | 1.9524 | 0.9952 | 0.0081 | 0.0424 |
| \|f1/f2\| | \|f2/f3\| | (TP1 + IN12)/TP2 | | (TP7 + IN67)/TP6 | |
| 0.6285 | 0.2925 | 2.4709 | | 4.3841 | |
| HOS | InTL | HOS/HOI | InS/HOS | ODT % | TDT % |
| 9.7500 | 7.8120 | 1.3000 | 0.9512 | 2.0229 | 0.4246 |
| HVT11 | HVT12 | HVT21 | HVT22 | HVT31 | HVT32 |
| 0.0000 | 0.0000 | 0.4506 | 2.1298 | 0.7036 | 0.0000 |
| HVT61 | HVT62 | HVT71 | HVT72 | HVT72/HOI | HVT72/HOS |
| 0.0000 | 0.0000 | 1.5137 | 3.4826 | 0.4643 | 0.3572 |
| PSTA | PLTA | NSTA | NLTA | SSTA | SLTA |
| 0.049 mm | 0.064 mm | 0.023 mm | −0.008 mm | 0.006 mm | 0.012 mm |

Fifth embodiment (primary reference wavelength = 555 nm)

The values pertaining to the outline curve lengths may be obtained from the data in Table 9 and Table 10:

Fifth embodiment (primary reference wavelength = 555 nm)

| ARE | 1/2(HEP) | ARE value | ARE-1/2(HEP) | 2(ARE/HEP) % | TP | ARE/TP (%) |
|---|---|---|---|---|---|---|
| 11 | 2.198 | 2.273 | 0.07529 | 103.43% | 0.444 | 511.84% |
| 12 | 2.181 | 2.214 | 0.03303 | 101.51% | 0.444 | 498.40% |
| 21 | 2.198 | 2.223 | 0.02530 | 101.15% | 0.200 | 1111.74% |
| 22 | 2.198 | 2.226 | 0.02766 | 101.26% | 0.200 | 1112.93% |
| 31 | 2.198 | 2.220 | 0.02154 | 100.98% | 0.200 | 1109.87% |
| 32 | 2.198 | 2.203 | 0.00478 | 100.22% | 0.200 | 1101.49% |
| 41 | 2.198 | 2.204 | 0.00614 | 100.28% | 1.559 | 141.40% |
| 42 | 2.198 | 2.267 | 0.06878 | 103.13% | 1.559 | 145.42% |
| 51 | 2.198 | 2.344 | 0.14552 | 106.62% | 1.226 | 191.20% |
| 52 | 2.198 | 2.418 | 0.21941 | 109.98% | 1.226 | 197.23% |
| 61 | 2.198 | 2.232 | 0.03388 | 101.54% | 0.441 | 506.17% |
| 62 | 2.198 | 2.261 | 0.06287 | 102.86% | 0.441 | 512.74% |
| 71 | 2.198 | 2.205 | 0.00722 | 100.33% | 1.672 | 131.89% |
| 72 | 2.198 | 2.254 | 0.05616 | 102.56% | 1.672 | 134.82% |

-continued

| Fifth embodiment (primary reference wavelength = 555 nm) | | | | | | |
|---|---|---|---|---|---|---|
| ARS | EHD | ARS value | ARS-EHD | (ARS/EHD) % | TP | ARS/TP (%) |
| 11 | 2.198 | 2.273 | 0.07517 | 103.42% | 0.444 | 511.84% |
| 12 | 2.181 | 2.214 | 0.03303 | 101.51% | 0.444 | 498.40% |
| 21 | 2.220 | 2.247 | 0.02615 | 101.18% | 0.200 | 1123.27% |
| 22 | 2.273 | 2.302 | 0.02850 | 101.25% | 0.200 | 1150.98% |
| 31 | 2.283 | 2.319 | 0.03539 | 101.55% | 0.200 | 1159.29% |
| 32 | 2.505 | 2.513 | 0.00796 | 100.32% | 0.200 | 1256.68% |
| 41 | 2.557 | 2.563 | 0.00656 | 100.26% | 1.559 | 164.41% |
| 42 | 2.835 | 3.026 | 0.19108 | 106.74% | 1.559 | 194.11% |
| 51 | 3.131 | 3.466 | 0.33476 | 110.69% | 1.226 | 282.72% |
| 52 | 3.322 | 4.101 | 0.77961 | 123.47% | 1.226 | 334.58% |
| 61 | 3.379 | 3.750 | 0.37065 | 110.97% | 0.441 | 850.33% |
| 62 | 3.622 | 3.936 | 0.31404 | 108.67% | 0.441 | 892.54% |
| 71 | 3.859 | 4.280 | 0.42152 | 110.92% | 1.672 | 255.97% |
| 72 | 5.881 | 6.414 | 0.53290 | 109.06% | 1.672 | 383.59% |

The following values may be obtained according to the data in Table 9 and Table 10.

| Values related to inflection point of fifth embodiment (primary reference wavelength = 555 nm) | | | | | | |
|---|---|---|---|---|---|---|
| HIF211 | 0.2587 | HIF211/HOI | 0.0345 | SGI211 | −0.0004 | \|SGI211\|/(\|SGI211\| + TP2) 0.0019 |
| HIF212 | 2.1612 | HIF212/HOI | 0.2882 | SGI212 | 0.2223 | \|SGI212\|/(\|SGI212\| + TP2) 0.5264 |
| HIF221 | 1.5704 | HIF221/HOI | 0.2094 | SGI221 | 0.2089 | \|SGI221\|/(\|SGI221\| + TP2) 0.5108 |
| HIF311 | 0.3956 | HIF311/HOI | 0.0528 | SGI311 | 0.0012 | \|SGI311\|/(\|SGI311\| + TP3) 0.0058 |
| HIF321 | 2.4629 | HIF321/HOI | 0.3284 | SGI321 | 0.1675 | \|SGI321\|/(\|SGI321\| + TP3) 0.4558 |
| HIF411 | 1.9752 | HIF411/HOI | 0.2634 | SGI411 | 0.1258 | SGI411//(/SGI411\| + TP4) 0.0747 |
| HIF421 | 2.7062 | HIF421/HOI | 0.3608 | SGI421 | −0.7815 | \|SGI421\|/(\|SGI421\| + TP4) 0.3339 |
| HIF511 | 2.5127 | HIF511/HOI | 0.3350 | SGI511 | −0.9238 | \|SGI511\|/(\|SGI511\| + TP5) 0.4298 |
| HIF711 | 0.8191 | HIF711/HOI | 0.1092 | SGI711 | 0.0387 | \|SGI711\|/(\|SGI711\| + TP7) 0.0226 |
| HIF721 | 1.5092 | HIF721/HOI | 0.2012 | SGI721 | 0.2850 | \|SGI721\|/(\|SGI721\| + TP7) 0.1456 |

Sixth Embodiment

Figure 6A:
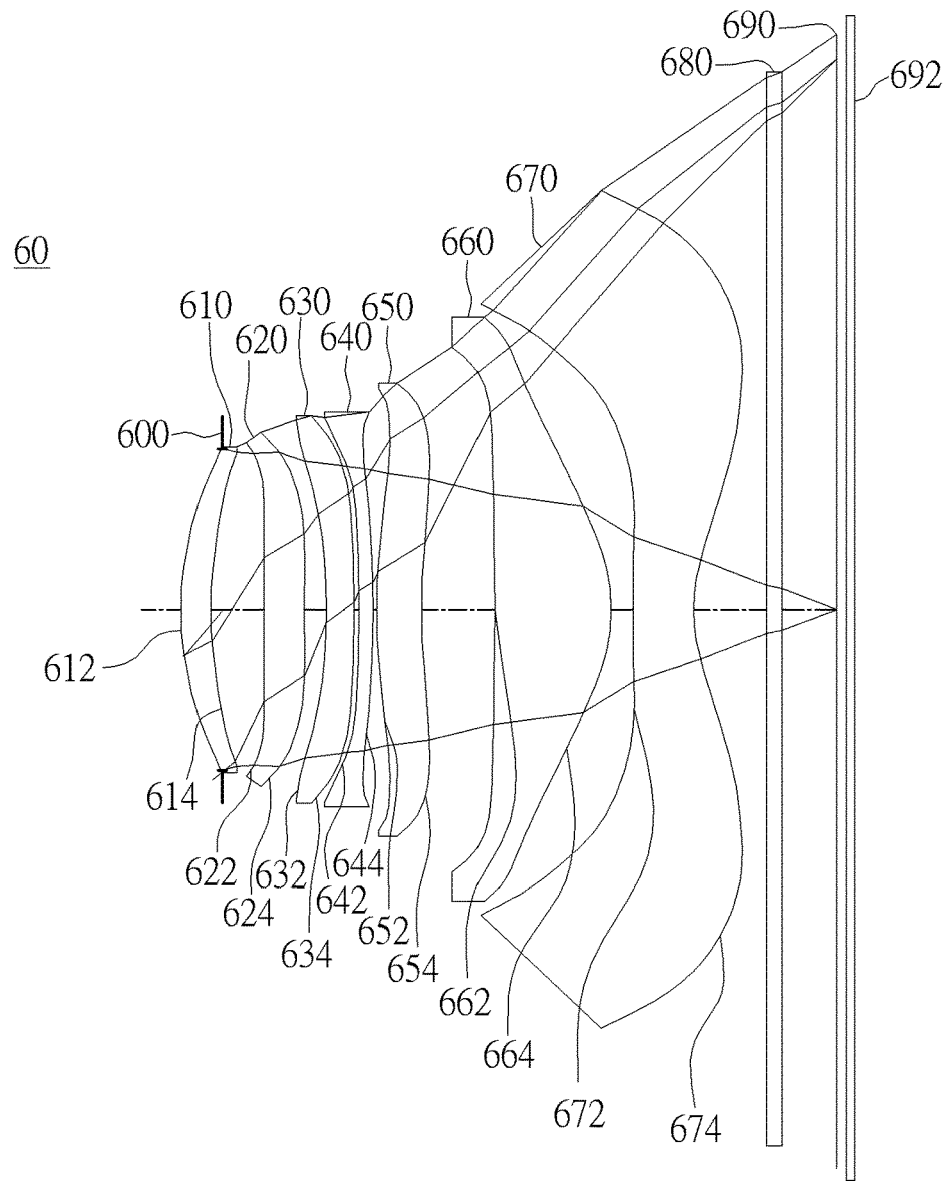
FIG. 6A is a schematic view of the optical image capturing system according to a sixth embodiment of the present disclosure.
Figure 6B:
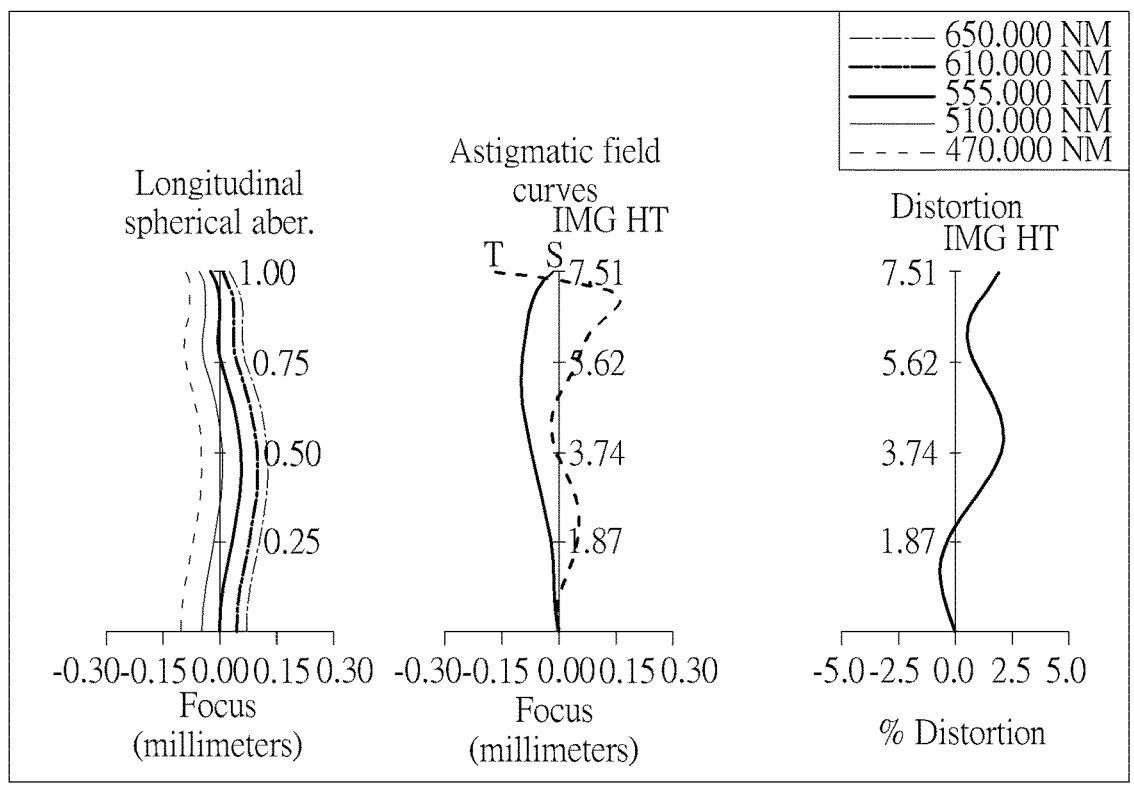
FIG. 6B is a curve diagram illustrating the spherical aberration, astigmatism and optical distortion of the optical image capturing system in the sequence from left to right according to the sixth embodiment of the present disclosure.
Figure 6C:
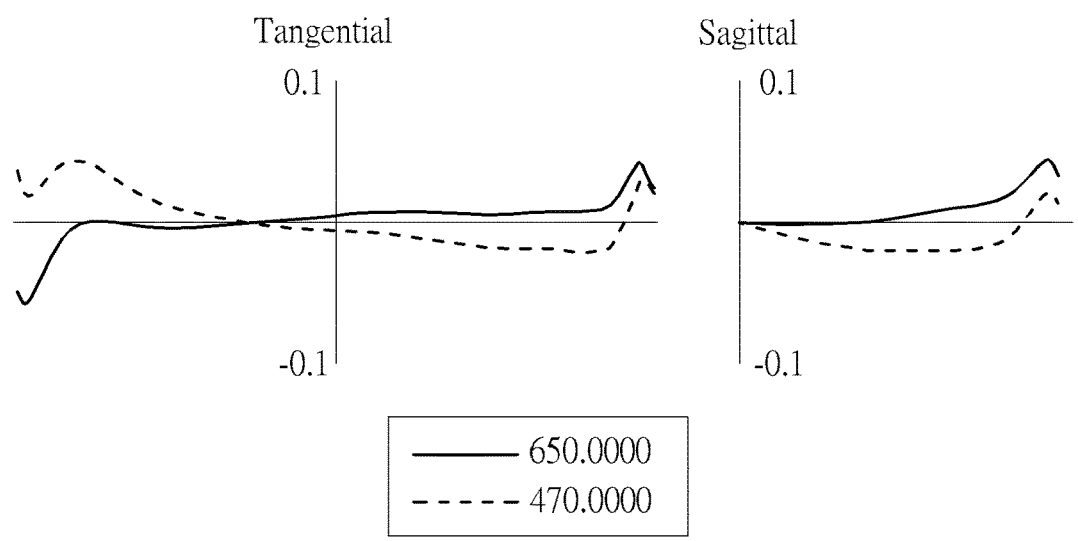
FIG. 6C is a transverse aberration diagram of the longest operation wavelength and the shortest operation wavelength for the tangential fan and the sagittal fan, of which the longest operation wavelength and the shortest operation wavelength pass through the edge of aperture at the position of 0.7 field of view on the image plane, according to the sixth embodiment of the present disclosure.

Please refer to FIGS. 6A and 6B, wherein FIG. 6A is a schematic view of the optical image capturing system according to the sixth embodiment of the present disclosure. FIG. 6B is a curve diagram illustrating the spherical aberration, astigmatism and optical distortion of the optical image capturing system in sequence from left to right according to the sixth embodiment of the present disclosure. FIG. 6C is a transverse aberration diagram at the position of 0.7 field of view on the image plane according to the sixth embodiment of the present disclosure. As shown in FIG. 6A, in the order from an object side to an image side, the optical image capturing system includes an aperture 600, a first lens 610, a second lens 620, a third lens 630, a fourth lens 640, a fifth lens 650, a sixth lens 660, a seventh lens 670, an infrared filter 680, an image plane 690 and an image sensing device 692.

The first lens 610 has positive refractive power and is made of glass material. The first lens 610 has a convex object-side surface 612 and a concave image-side surface 614, wherein both surfaces are aspheric.

The second lens 620 has positive refractive power and is made of plastic material. The second lens 620 has a convex object-side surface 622 and a convex image-side surface 624, wherein both surfaces are aspheric. The object-side surface 622 has one inflection point.

The third lens 630 has negative refractive power and is made of plastic material. The third lens 630 has a concave object-side surface 632 and a convex image-side surface 634, wherein both surfaces are aspheric. The object-side surface 632 has one inflection point.

The fourth lens 640 has positive refractive power and is made of plastic material. The fourth lens 640 has a concave object-side surface 642 and a convex image-side surface 644, wherein both surfaces are aspheric. The object-side surface 642 and the image-side surface 644 each have one inflection point.

The fifth lens 650 has positive refractive power and is made of plastic material. The fifth lens 650 has a convex object-side surface 652 and a concave image-side surface 654, wherein both surfaces are aspheric. The object-side surface 652 and the image-side surface 654 each have one inflection point.

The sixth lens 660 has positive refractive power and is made of plastic material. The sixth lens 660 has a concave object-side surface 662 and a convex image-side surface 664, and the image-side surface 664 has two inflection points. Hence, the optical image capturing system is capable of effectively adjusting an incident angle of rays into the sixth lens 660 from each field of view, thereby correcting aberration.

The seventh lens 670 has negative refractive power and is made of plastic material. The seventh lens 670 has a convex object-side surface 672 and a concave image-side surface 674. The object-side surface 672 and the image-side surface 674 each have one inflection point. In this manner, the back focal length may be reduced to maintain a miniaturized optical image capturing system. Additionally, the optical image capturing system is capable of effectively reducing an incident angle of the off-axis FOV rays, thereby further correcting an off-axis FOV aberration.

The infrared filter 680 is made of glass material and is configured between the seventh lens 670 and the image plane 690. The infrared filter 680 does not affect the focal length of the optical image capturing system.

Table 11 and Table 12 below should be incorporated into the reference of the present embodiment.

TABLE 11

Lens parameters of the sixth embodiment
f(focal length) = 6.1698 mm, f/HEP = 1.4, HAF(half angle of view) = 49.9994 deg

| Surface No. | | Curvature Radius | Thickness (mm) | Material | Refractive Index | Abbe No. | Focal Distance |
|---|---|---|---|---|---|---|---|
| 0 | Object | 1E+18 | 1E+18 | | | | |
| 1 | Aperture | 1E+18 | −0.553 | | | | |
| 2 | Lens 1 | 4.500911205 | 0.392 | Glass | 2.001 | 29.13 | 12.845 |
| 3 | | 6.60004806 | 0.722 | | | | |
| 4 | Lens 2 | 21.43118009 | 0.569 | Plastic | 1.565 | 58.00 | 36.484 |
| 5 | | −582.8674023 | 0.292 | | | | |
| 6 | Lens 3 | −10.23296927 | 0.388 | Plastic | 1.514 | 56.80 | −31.432 |
| 7 | | −28.11725964 | 0.066 | | | | |
| 8 | Lens 4 | −32.97119083 | 0.200 | Plastic | 1.661 | 20.40 | 31.297 |
| 9 | | −12.81091242 | 0.050 | | | | |
| 10 | Lens 5 | 7.227627855 | 0.626 | Plastic | 1.565 | 58.00 | 74.991 |
| 11 | | 8.435584651 | 1.014 | | | | |
| 12 | Lens 6 | −26.78124753 | 1.583 | Plastic | 1.583 | 30.20 | 3.451 |
| 13 | | −1.92306181 | 0.297 | | | | |
| 14 | Lens 7 | 31.90043877 | 0.844 | Plastic | 1.661 | 20.40 | −3.103 |
| 15 | | 1.92234124 | 1.000 | | | | |
| 16 | Infrared filter | 1E+18 | 0.200 | BK_7 | 1.517 | 64.2 | |
| 17 | | 1E+18 | 0.756 | | | | |
| 18 | Image plane | 1E+18 | 0.000 | | | | |

Reference wavelength (d-line) = 555 nm; shield position: none

TABLE 12 aspheric coefficients of the sixth embodiment
Table 12: aspheric coefficients

| Surface No. | 2 | 3 | 4 | 5 | 6 | 7 | 8 |
|---|---|---|---|---|---|---|---|
| k | −1.951182E−01 | 8.820349E−01 | −2.034771E+01 | −5.000000E+01 | 1.263257E+01 | 3.600096E+01 | −2.051215E+00 |
| A4 | −1.143853E−03 | −2.214732E−03 | −9.030595E−03 | −1.505426E−02 | −4.587416E−03 | −6.843971E−03 | −3.155202E−03 |
| A6 | 3.729951E−04 | 5.727926E−04 | −3.556162E−04 | −1.683879E−03 | −8.548739E−04 | 7.316461E−04 | −1.868973E−03 |
| A8 | −8.512713E−05 | −1.873643E−04 | 8.434274E−05 | 5.012636E−04 | 3.701258E−04 | −2.730485E−04 | 1.036823E−04 |
| A10 | 6.173107E−06 | 2.222943E−05 | −3.379892E−05 | −5.372347E−05 | −1.453450E−05 | 1.648691E−05 | 1.094408E−05 |
| A12 | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 | 14 | 15 |
|---|---|---|---|---|---|---|---|
| k | 6.564570E+00 | −5.000000E+01 | −4.464931E+01 | 4.744406E+01 | −4.923982E+00 | −5.000000E+01 | −7.283055E+00 |
| A4 | 2.687112E−03 | −8.318435E−04 | −3.854792E−03 | 2.182093E−03 | −3.626881E−03 | −6.479270E−03 | −4.319787E−03 |
| A6 | −1.868931E−04 | 4.432086E−04 | 6.669318E−05 | −9.867509E−05 | 2.794670E−04 | −5.664857E−04 | 1.286766E−04 |
| A8 | −5.431239E−05 | −1.137859E−04 | −1.633974E−05 | 9.518191E−06 | 2.014791E−05 | 5.728643E−05 | −3.017969E−06 |
| A10 | 1.758571E−05 | 3.648537E−06 | −3.070209E−06 | −1.949438E−06 | −1.664922E−06 | −1.682711E−06 | 5.539802E−09 |
| A12 | 0.000000E+00 | 0.000000E+00 | 0.000000E+00 | 0.000000E+00 | 0.000000E+00 | 0.000000E+00 | 0.000000E+00 |

In the sixth embodiment, the form of the aspheric surface equation therein is presented as that in the first embodiment. Besides, the definition of parameters in the following tables is equivalent to that in the first embodiment, so that the repetitive details are not stated here.

The following values for the conditional expressions may be obtained from the data in Table 11 and Table 12.

| Sixth embodiment (primary reference wavelength = 555 nm) | | | | | |
|---|---|---|---|---|---|
| $|f/f1|$ | $|f/f2|$ | $|f/f3|$ | $|f/f4|$ | $|f/f5|$ | $|f/f6|$ |
| 0.4803 | 0.1691 | 0.1963 | 0.1971 | 0.0823 | 1.7876 |

-continued

| Sixth embodiment (primary reference wavelength = 555 nm) | | | | | |
|---|---|---|---|---|---|
| \|f/f7\| | ΣPPR | ΣNPR | ΣPPR/ΣNPR\| | IN12/f | IN67/f |
| 1.9885 | 2.7437 | 2.1576 | 1.2716 | 0.1171 | 0.0481 |
| \|f1/f2\| | \|f2/f3\| | (TP1 + IN12)/TP2 | | (TP7 + IN67)/TP6 | |
| 0.3521 | 1.1607 | 1.9579 | | 0.7203 | |
| HOS | InTL | HOS/HOI | InS/HOS | ODT % | TDT % |
| 9.0000 | 7.0440 | 1.2000 | 0.9385 | 2.1576 | 1.4472 |
| HVT11 | HVT12 | HVT21 | HVT22 | HVT31 | HVT32 |
| 0.0000 | 0.0000 | 1.0907 | 0.0000 | 0.0000 | 0.0000 |
| HVT61 | HVT62 | HVT71 | HVT72 | HVT72/HOI | HVT72/HOS |
| 0.0000 | 0.0000 | 1.0268 | 3.1994 | 0.4266 | 0.3555 |
| PSTA | PLTA | NSTA | NLTA | SSTA | SLTA |
| 0.020 mm | 0.024 mm | 0.037 mm | −0.050 mm | 0.014 mm | 0.034 mm |

The values pertaining to the outline curve lengths may be obtained from the data in Table 11 and Table 12:

| Sixth embodiment (primary reference wavelength = 555 nm) | | | | | | |
|---|---|---|---|---|---|---|
| ARE | 1/2(HEP) | ARE value | ARE-1/2(HEP) | 2(ARE/HEP) % | TP | ARE/TP (%) |
| 11 | 2.204 | 2.293 | 0.08976 | 104.07% | 0.392 | 584.34% |
| 12 | 2.204 | 2.241 | 0.03779 | 101.71% | 0.392 | 571.09% |
| 21 | 2.204 | 2.237 | 0.03324 | 101.51% | 0.569 | 392.81% |
| 22 | 2.204 | 2.289 | 0.08582 | 103.89% | 0.569 | 402.05% |
| 31 | 2.204 | 2.239 | 0.03517 | 101.60% | 0.388 | 576.67% |
| 32 | 2.204 | 2.238 | 0.03442 | 101.56% | 0.388 | 576.48% |
| 41 | 2.204 | 2.238 | 0.03428 | 101.56% | 0.200 | 1118.89% |
| 42 | 2.204 | 2.209 | 0.00511 | 100.23% | 0.200 | 1104.31% |
| 51 | 2.204 | 2.211 | 0.00771 | 100.35% | 0.626 | 353.17% |
| 52 | 2.204 | 2.206 | 0.00296 | 100.13% | 0.626 | 352.41% |
| 61 | 2.204 | 2.204 | 0.00043 | 100.02% | 1.583 | 139.19% |
| 62 | 2.204 | 2.355 | 0.15101 | 106.85% | 1.583 | 148.70% |
| 71 | 2.204 | 2.214 | 0.01059 | 100.48% | 0.844 | 262.33% |
| 72 | 2.204 | 2.273 | 0.06998 | 103.18% | 0.844 | 269.36% |
| ARS | EHD | ARS value | ARS-EHD | (ARS/EHD) % | TP | ARS/TP (%) |
| 11 | 2.204 | 2.293 | 0.08975 | 104.07% | 0.392 | 584.34% |
| 12 | 2.210 | 2.248 | 0.03792 | 101.72% | 0.392 | 572.71% |
| 21 | 2.273 | 2.322 | 0.04873 | 102.14% | 0.569 | 407.72% |
| 22 | 2.395 | 2.561 | 0.16555 | 106.91% | 0.569 | 449.71% |
| 31 | 2.577 | 2.618 | 0.04072 | 101.58% | 0.388 | 674.40% |
| 32 | 2.629 | 2.764 | 0.13474 | 105.13% | 0.388 | 711.89% |
| 41 | 2.614 | 2.688 | 0.07389 | 102.83% | 0.200 | 1344.01% |
| 42 | 2.673 | 2.693 | 0.02045 | 100.77% | 0.200 | 1346.51% |
| 51 | 2.896 | 2.917 | 0.02077 | 100.72% | 0.626 | 465.91% |
| 52 | 3.072 | 3.206 | 0.13398 | 104.36% | 0.626 | 512.04% |
| 61 | 3.569 | 3.748 | 0.17880 | 105.01% | 1.583 | 236.69% |
| 62 | 3.967 | 4.388 | 0.42182 | 110.63% | 1.583 | 277.15% |
| 71 | 4.068 | 4.878 | 0.81016 | 119.92% | 0.844 | 577.96% |
| 72 | 5.696 | 6.698 | 1.00238 | 117.60% | 0.844 | 793.61% |

The following values may be obtained according to the data in Table 11 and Table 12.

| Values related to inflection point of sixth embodiment (primary reference wavelength = 555 nm) | | | | | | | |
|---|---|---|---|---|---|---|---|
| HIF211 | 0.6369 | HIF211/HOI | 0.0849 | SGI211 | 0.0079 | \|SGI211\|/(\|SGI211\| + TP2) | 0.0137 |
| HIF311 | 1.9361 | HIF311/HOI | 0.2581 | SGI311 | −0.2607 | \|SGI311\|/(\|SGI311\| + TP3) | 0.4017 |
| HIF411 | 2.3709 | HIF411/HOI | 0.3161 | SGI411 | −0.3518 | \|SGI411\|/(\|SGI411\| + TP4) | 0.6376 |
| HIF421 | 1.7502 | HIF421/HOI | 0.2334 | SGI421 | −0.1043 | \|SGI421\|/(\|SGI421\| + TP4) | 0.3427 |
| HIF511 | 1.5428 | HIF511/HOI | 0.2057 | SGI511 | 0.1156 | \|SGI511\|/(\|SGI511\| + TP5) | 0.1558 |
| HIF521 | 1.0772 | HIF521/HOI | 0.1436 | SGI521 | 0.0545 | \|SGI521\|/(\|SGI521\| + TP5) | 0.0800 |
| HIF621 | 2.2109 | HIF621/HOI | 0.2948 | SGI621 | −0.7760 | \|SGI621\|/(\|SGI621\| + TP6) | 0.3289 |
| HIF622 | 3.1845 | HIF622/HOI | 0.4246 | SGI622 | −1.2376 | \|SGI622\|/(\|SGI622\| + TP6) | 0.4387 |
| HIF711 | 0.6044 | HIF711/HOI | 0.0806 | SGI711 | 0.0048 | \|SGI711\|/(\|SGI711\| + TP7) | 0.0057 |
| HIF721 | 1.2594 | HIF721/HOI | 0.1679 | SGI721 | 0.2719 | \|SGI721\|/(\|SGI721\| + TP7) | 0.2437 |

Although the present disclosure is disclosed via the aforementioned embodiments, those embodiments do not serve to limit the scope of the present disclosure. A person skilled in the art may perform various alterations and modifications to the present disclosure without departing from the spirit and the scope of the present disclosure. Hence, the scope of the present disclosure should be defined by the following appended claims.

Despite the fact that the present disclosure is specifically presented and illustrated with reference to the exemplary embodiments thereof, it should be obvious to a person skilled in the art that, various modifications to the forms and details of the present disclosure may be performed without departing from the scope and spirit of the present disclosure defined by the following claims and equivalents thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical image capturing system, from an object side to an image side, comprising:
    a first lens with refractive power;
    a second lens with refractive power;
    a third lens with refractive power;
    a fourth lens with refractive power;
    a fifth lens with refractive power;
    a sixth lens with refractive power;
    a seventh lens with refractive power; and
    an image plane;
    wherein the optical image capturing system comprises seven lenses with refractive power, at least one of the seven lenses is made of glass materials, the optical image capturing system has a maximum image height HOI on the image plane perpendicular to an optical axis, at least one of the first lens, the second lens, the third lens, the fourth lens, the fifth lens, the sixth lens, and the seventh lens has positive refractive power, a focal length of the first lens, the second lens, the third lens, the fourth lens, the fifth lens, the sixth lens, and the seventh lens is denoted as f1, f2, f3, f4, f5, f6 and f7 respectively, a focal length of the optical image capturing system is denoted as f, an entrance pupil diameter of the optical image capturing system is denoted as HEP, a distance on the optical axis from an object-side surface of the first lens to the image plane is denoted as HOS, a distance on the optical axis from the object-side surface of the first lens to an image side surface of the seventh lens is denoted as InTL, half of a maximum angle of view of the optical image capturing system is denoted as HAF, an outline curve starting from an intersection point of the optical axis and any surface of any one of the seven lenses, travelling along an outline of the surface, and ending at a coordinate point on the surface which has a vertical height of ½ entrance pupil diameter from the optical axis, has an outline curve length denoted as ARE, and conditions as follows are satisfied: 1.0≤f/HEP≤10, 0 deg<HAF≤100 deg, and 0.9≤2(ARE/HEP)≤2.0;
    wherein an outline curve starting from an intersection point of the optical axis and an object-side surface of the seventh lens, travelling along an outline of the object-side surface, and ending at a coordinate point on the surface which has a vertical height of ½ entrance pupil diameter from the optical axis, has an outline curve length denoted as ARE71; an outline curve starting from an intersection point of the optical axis and the image-side surface of the seventh lens, travelling along an outline of the image-side surface, and ending at a coordinate point on the surface that has a vertical height of ½ entrance pupil diameter from the optical axis, has an outline curve length denoted as ARE72; a central thickness of the seventh lens on the optical axis is denoted as TP7, and conditions as follows are satisfied: 0.05≤ARE71/TP7≤35, and 0.05≤ARE72/TP7≤35.

2. The optical image capturing system of claim 1, wherein a condition as follows is satisfied: 0.5≤HOS/HOI≤1.9.

3. The optical image capturing system of claim 1, wherein among at least two of the first lens, the second lens, the third lens, the fourth lens, the fifth lens, the sixth lens, and the seventh lens, at least one inflection point is present on at least one surface of each of the at least two lenses.

4. The optical image capturing system of claim 1, further comprising an aperture, wherein a distance from the aperture to the image plane on the optical axis is defined as InS, and a condition as follows is satisfied: 0.2≤InS/HOS≤1.1.

5. The optical image capturing system of claim 1, wherein a TV distortion for image formation in the optical image capturing system is TDT, the optical image capturing system has a maximum image height HOI on the image plane perpendicular to the optical axis, a transverse aberration of a longest operation wavelength of a positive direction tangential fan of the optical image capturing system passing through an edge of the entrance pupil and incident at a position of 0.7 HOI on the image plane is denoted as PLTA, a transverse aberration of a shortest operation wavelength of the positive direction tangential fan of the optical image capturing system passing through the edge of the entrance pupil and incident at the position of 0.7 HOI on the image plane is denoted as PSTA, a transverse aberration of the longest operation wavelength of a negative direction tangential fan of the optical image capturing system passing through the edge of the entrance pupil and incident at the position of 0.7 HOI on the image plane is denoted as NLTA, a transverse aberration of the shortest operation wavelength of the negative direction tangential fan of the optical image capturing system passing through the edge of the entrance pupil and incident at the position of 0.7 HOI on the image plane is denoted as NSTA, a transverse aberration of the longest operation wavelength of a sagittal fan of the optical image capturing system passing through the edge of the entrance pupil and incident at the position of 0.7 HOI on the image plane is denoted as SLTA, a transverse aberration of the shortest operation wavelength of the sagittal fan of the optical image capturing system passing through the edge of the entrance pupil and incident at the position of 0.7 HOI on the image plane is denoted as SSTA, and conditions as follows are satisfied: PLTA≤100 μm, PSTA≤100 μm, NLTA≤100 μm, NSTA≤100 μm, SLTA≤100 μm, SSTA≤100 μm, and |TDT|<100%.

6. The optical image capturing system of claim 1, wherein a maximum effective half diameter of any surface of any one of the seven lenses is denoted as EHD, an outline curve starting from the intersection point of the optical axis and any surface of any one of the seven lenses, travelling along an outline of the surface, and ending at a point which is defined as the maximum effective half diameter, has an outline curve length denoted as ARS, and a condition as follows is satisfied: 0.9≤ARS/EHD≤2.0.

7. The optical image capturing system of claim 1, wherein an outline curve starting from an intersection point of the optical axis and an object-side surface of the sixth lens, travelling along an outline of the object-side surface, and ending at a coordinate point on the surface which has a vertical height of ½ entrance pupil diameter from the optical axis, has an outline curve length denoted as ARE61; an outline curve starting from an intersection point of the optical axis and the image-side surface of the sixth lens, travelling along an outline of the image-side surface, and ending at a coordinate point on the surface that has a vertical height of ½ entrance pupil diameter from the optical axis, has an outline curve length denoted as ARE62; a central thickness of the sixth lens on the optical axis is denoted as TP6, and conditions as follows are satisfied: 0.05≤ARE61/TP6≤35, and 0.05≤ARE62/TP6≤35.

8. The optical image capturing system of claim 1, wherein the image plane may be a flat surface or a curved surface.

9. An optical image capturing system, from an object side to an image side, comprising:
   a first lens with positive refractive power;
   a second lens with refractive power;
   a third lens with refractive power;
   a fourth lens with refractive power;
   a fifth lens with refractive power;
   a sixth lens with refractive power;
   a seventh lens with refractive power; and
   an image plane;
   wherein the optical image capturing system comprises seven lenses with refractive power, at least one of the seven lenses is made of glass materials, the optical image capturing system has a maximum image height HOI on the image plane perpendicular to an optical axis;
   wherein among at least two of the first lens, the second lens, the third lens, the fourth lens, the fifth lens, the sixth lens, and the seventh lens, at least one inflection point is present on at least one surface of each of the at least two lenses;
   wherein at least one of the first lens, the second lens and the third lens has positive refractive power, at least one of the fourth lens, the fifth lens, the sixth lens, and the seventh lens has positive refractive power, a focal length of the first lens, the second lens, the third lens, the fourth lens, the fifth lens, the sixth lens, and the seventh lens is denoted as f1, f2, f3, f4, f5, f6 and f7 respectively, a focal length of the optical image capturing system is denoted as f, an entrance pupil diameter of the optical image capturing system is denoted as HEP, a distance on the optical axis from an object-side surface of the first lens to the image plane is denoted as HOS, a distance on the optical axis from the object-side surface of the first lens to an image side surface of the seventh lens is denoted as InTL, half of a maximum angle of view of the optical image capturing system is denoted as HAF, an outline curve starting from an intersection point of the optical axis and any surface of any one of the seven lenses, travelling along an outline of the surface, and ending at a coordinate point on the surface which has a vertical height of ½ entrance pupil diameter from the optical axis, has an outline curve length denoted as ARE, and conditions as follows are satisfied: 1.0≤f/HEP≤10, 0 deg<HAF≤60 deg, 0.5≤HOS/HOI≤1.8, and 0.9≤2(ARE/HEP)≤2.0;
   wherein a distance between the sixth lens and the seventh lens on the optical axis is denoted as IN67, and a condition as follows is satisfied: 0<IN67/f≤5.

10. The optical image capturing system of claim 9, wherein at least one surface of at least one of the first lens, the second lens, and the third lens has at least one critical point.

11. The optical image capturing system of claim 9, wherein the first lens has a convex object-side surface on the optical axis, and the second lens has a convex image-side surface on the optical axis.

12. The optical image capturing system of claim 9, wherein a maximum effective half diameter of any surface of any one of the seven lenses is denoted as EHD, an outline curve starting from the intersection point of the optical axis and any surface of any one of the seven lenses, travelling along an outline of the surface, and ending at a point which is defined as the maximum effective half diameter, has an outline curve length denoted as ARS, and a condition as follows is satisfied: 0.9≤ARS/EHD≤2.0.

13. The optical image capturing system of claim 9, wherein a transverse aberration of a longest operation wavelength of a positive direction tangential fan of the optical image capturing system passing through an edge of the entrance pupil and incident at a position of 0.7 HOI on the image plane is denoted as PLTA, a transverse aberration of a shortest operation wavelength of the positive direction tangential fan of the optical image capturing system passing through the edge of the entrance pupil and incident at the position of 0.7 HOI on the image plane is denoted as PSTA, a transverse aberration of the longest operation wavelength of a negative direction tangential fan of the optical image capturing system passing through the edge of the entrance pupil and incident at the position of 0.7 HOI on the image plane is denoted as NLTA, a transverse aberration of the shortest operation wavelength of the negative direction tangential fan of the optical image capturing system passing through the edge of the entrance pupil and incident at the position of 0.7 HOI on the image plane is denoted as NSTA, a transverse aberration of the longest operation wavelength of a sagittal fan of the optical image capturing system passing through the edge of the entrance pupil and incident at the position of 0.7 HOI on the image plane is denoted as SLTA, a transverse aberration of the shortest operation wavelength of the sagittal fan of the optical image capturing system passing through the edge of the entrance pupil and incident at the position of 0.7 HOI on the image plane is denoted as SSTA, and conditions as follows are satisfied: PLTA≤100 μm, PSTA≤100 μm, NLTA≤100 μm, NSTA≤100 μm, SLTA≤100 μm, and SSTA≤100 μm.

14. The optical image capturing system of claim 9, wherein a distance between the first lens and the second lens on the optical axis is denoted as IN12, and a condition as follows is satisfied: 0<IN12/f≤60.

15. The optical image capturing system of claim 9, wherein a distance between the sixth lens and the seventh lens on the optical axis is denoted as IN67, a central thickness of the sixth lens and a central thickness of the seventh lens on the optical axis is denoted as TP6 and TP7 respectively, and a condition as follows is satisfied: 0.1≤(TP7+IN67)/TP6≤50.

16. The optical image capturing system of claim 9, wherein a distance between the first lens and the second lens on the optical axis is denoted as IN12, a central thickness of the first lens and a central thickness of the second lens on the optical axis is denoted as TP1 and TP2 respectively, and a condition as follows is satisfied: 0.1≤(TP1+IN12)/TP2≤50.

17. The optical image capturing system of claim 9, wherein at least one of the first lens, the second lens, the third lens, the fourth lens, the fifth lens, the sixth lens, and the seventh lens may be set as a light filtering element capable of filtering wavelengths less than 500 nm.

18. An optical image capturing system, from an object side to an image side, comprising:

an aperture;

a first lens with positive refractive power, the first lens being made of glass materials;

a second lens with refractive power;

a third lens with refractive power;

a fourth lens with refractive power;

a fifth lens with refractive power;

a sixth lens with refractive power;

a seventh lens with refractive power; and an image plane;

wherein a distance from the aperture to the image plane on the optical axis is defined as InS, the optical image capturing system comprises seven lenses with refractive power, the optical image capturing system has a maximum image height HOI on the image plane perpendicular to an optical axis, at least one of the first lens, the second lens and the third lens has positive refractive power, at least one of the fourth lens, the fifth lens, the sixth lens, and the seventh lens has positive refractive power;

wherein among at least two of the first lens, the second lens, the third lens, the fourth lens, the fifth lens, the sixth lens, and the seventh lens, at least one inflection point is present on at least one surface of each of the at least two lenses;

wherein a focal length of the first lens, the second lens, the third lens, the fourth lens, the fifth lens, the sixth lens, and the seventh lens is denoted as f1, f2, f3, f4, f5, f6 and f7 respectively, a focal length of the optical image capturing system is denoted as f, an entrance pupil diameter of the optical image capturing system is denoted as HEP, a distance on the optical axis from an object-side surface of the first lens to the image plane is denoted as HOS, a distance on the optical axis from the object-side surface of the first lens to an image side surface of the seventh lens is denoted as InTL, half of a maximum angle of view of the optical image capturing system is denoted as HAF, an outline curve starting from an intersection point of the optical axis and any surface of any one of the seven lenses, travelling along an outline of the surface, and ending at a coordinate point on the surface which has a vertical height of ½ entrance pupil diameter from the optical axis, has an outline curve length denoted as ARE, and conditions as follows are satisfied: 1.0≤f/HEP≤10, 0 deg<HAF≤100 deg, 0.5≤HOS/HOI≤1.6, 0.9≤InS/HOS≤1.1, and 0.9≤2(ARE/HEP)≤2.0;

wherein an outline curve starting from an intersection point of the optical axis and an object-side surface of the sixth lens, travelling along an outline of the object-side surface, and ending at a coordinate point on the surface which has a vertical height of ½ entrance pupil diameter from the optical axis, has an outline curve length denoted as ARE61; an outline curve starting from an intersection point of the optical axis and the image-side surface of the sixth lens, travelling along an outline of the image-side surface, and ending at a coordinate point on the surface that has a vertical height of ½ entrance pupil diameter from the optical axis, has an outline curve length denoted as ARE62; a central thickness of the sixth lens on the optical axis is denoted as TP6, and conditions as follows are satisfied: 0.05≤ARE61/TP6≤35, and 0.05≤ARE62/TP6≤35.

19. The optical image capturing system of claim 18, wherein at least one surface of at least one of the first lens, the second lens, and the third lens has at least one critical point, the first lens has a convex object-side surface on the optical axis, and the second lens has a convex image-side surface on the optical axis.

20. The optical image capturing system of claim 18, wherein a condition as follows is satisfied: HOI≥5 mm.

21. The optical image capturing system of claim 18, wherein an outline curve starting from an intersection point of the optical axis and an object-side surface of the seventh lens, travelling along an outline of the object-side surface, and ending at a coordinate point on the surface which has a vertical height of ½ entrance pupil diameter from the optical axis, has an outline curve length denoted as ARE71; an outline curve starting from an intersection point of the optical axis and the image-side surface of the seventh lens, travelling along an outline of the image-side surface, and ending at a coordinate point on the surface that has a vertical height of ½ entrance pupil diameter from the optical axis, has an outline curve length denoted as ARE72; a central thickness of the seventh lens on the optical axis is denoted as TP7, and conditions as follows are satisfied: 0.05≤ARE71/TP7≤35, and 0.05≤ARE72/TP7≤35.

22. The optical image capturing system of claim 18, further comprising an image sensing device and a driving module, wherein the image sensing device is configured at the image plane, and the driving module may be coupled with the seven lenses so as to displace the seven lenses.

* * * * *